(12) United States Patent
Trumper

(10) Patent No.: US 7,437,980 B2
(45) Date of Patent: Oct. 21, 2008

(54) FLUX-BIASED ELECTROMAGNETIC FAST TOOL SERVO SYSTEMS AND METHODS

(75) Inventor: David L. Trumper, Plaistow, NH (US)

(73) Assignee: Massachusetts Institute of Technology, Cambridge, MA (US)

( * ) Notice: Subject to any disclaimer, the term of this patent is extended or adjusted under 35 U.S.C. 154(b) by 688 days.

(21) Appl. No.: 10/858,482

(22) Filed: Jun. 1, 2004

(65) Prior Publication Data
US 2005/0056125 A1    Mar. 17, 2005

Related U.S. Application Data

(63) Continuation-in-part of application No. 10/448,336, filed on May 29, 2003, now Pat. No. 7,275,468.

(60) Provisional application No. 60/383,956, filed on May 29, 2002.

(51) Int. Cl.
*H02K 41/00* (2006.01)
*B23B 29/16* (2006.01)

(52) U.S. Cl. .......................................... 82/157; 310/12

(58) Field of Classification Search ................... 82/1.1, 82/157, 162, 170; 402/113–119; 310/12
See application file for complete search history.

(56) References Cited

U.S. PATENT DOCUMENTS 2,323,324 A    7/1943  Clifford
2,746,332 A    5/1956  Smith
4,373,404 A    2/1983  Heinz ..................... 74/424.8 B (Continued)

FOREIGN PATENT DOCUMENTS

DE    41 13 667    4/1991

(Continued)

OTHER PUBLICATIONS

Davidson, P., et al., "A New Symmetric Scanning Tunneling Microscope Design," J. Vac. Sci, Technol. A 6(2), Mar./Apr. 1988 p. 380-382.

(Continued)

*Primary Examiner*—Willmon Fridie
(74) *Attorney, Agent, or Firm*—Peter A. Nieves; Sheehan, Phinney, Bass & Green, P.A.

(57) ABSTRACT

A high bandwidth rotary fast tool servo provides tool motion in a direction nominally parallel to the surface-normal of a workpiece at the point of contact between the cutting tool and workpiece. Three or more flexure blades having all ends fixed are used to form an axis of rotation for a swing arm that carries a cutting tool at a set radius from the axis of rotation. An actuator rotates a swing arm assembly such that a cutting tool is moved in and away from the lathe-mounted, rotating workpiece in a rapid and controlled manner in order to machine the workpiece. A pair of position sensors provides rotation and position information for a swing arm to a control system. A control system commands and coordinates motion of the fast tool servo with the motion of a spindle, rotating table, cross-feed slide, and in-feed slide of a precision lathe.

66 Claims, 50 Drawing Sheets

U.S. PATENT DOCUMENTS

| | | | | |
|---|---|---|---|---|
| 4,428,704 A | | 1/1984 | Kolokhe | 408/156 |
| 4,528,533 A | | 7/1985 | Montagu | 335/230 |
| 4,590,828 A | | 5/1986 | Sullivan | 82/24 R |
| 4,634,191 A | | 1/1987 | Studer | 310/90.5 |
| 4,797,039 A | | 1/1989 | Bosek | 407/87 |
| 4,813,829 A | | 3/1989 | Koppelmann | 409/136 |
| 4,878,787 A | | 11/1989 | Hunt | 408/181 |
| 4,986,151 A | | 1/1991 | Horn | |
| 4,987,526 A | | 1/1991 | Slocum et al. | 364/167.01 |
| 5,196,745 A | * | 3/1993 | Trumper | 310/12 |
| 5,294,854 A | | 3/1994 | Trumper | 310/90.5 |
| 5,417,130 A | | 5/1995 | Dorsch | 82/1.11 |
| 5,467,675 A | | 11/1995 | Dow et al. | 82/1.11 |
| 5,625,267 A | | 4/1997 | Gregory | 318/625 |
| 5,631,618 A | | 5/1997 | Trumper et al. | 335/299 |
| 5,647,321 A | | 7/1997 | Ichikawa et al. | 123/399 |
| 5,699,621 A | * | 12/1997 | Trumper et al. | 33/1 M |
| 5,718,154 A | | 2/1998 | Council, Jr. | 82/1.11 |
| 5,719,543 A | | 2/1998 | Berling | 335/229 |
| 5,809,855 A | | 9/1998 | Francia | |
| 5,823,720 A | | 10/1998 | Moore | 408/204 |
| 5,825,112 A | | 10/1998 | Lipo et al. | 310/181 |
| 6,062,778 A | | 5/2000 | Szuba et al. | 408/156 |
| 6,092,447 A | | 7/2000 | Schlitters | |
| 6,170,367 B1 | * | 1/2001 | Keller et al. | 82/1.11 |
| 6,237,452 B1 | | 5/2001 | Ludwick et al. | 82/12 |
| 6,323,483 B1 | | 11/2001 | Cleveland et al. | 250/306 |
| 6,356,391 B1 | | 3/2002 | Gardiner et al. | 359/628 |
| 6,457,379 B1 | | 10/2002 | Mirone | 74/552 |
| 6,523,443 B1 | * | 2/2003 | Hof et al. | 82/1.4 |
| 7,089,835 B2 | | 8/2006 | Bryan | |
| 2002/0036748 A1 | | 3/2002 | Chapoy et al. | 351/160 R |
| 2002/0057497 A1 | | 5/2002 | Gardiner et al. | 359/625 |
| 2002/0057564 A1 | | 5/2002 | Campbell et al. | 362/31 |

FOREIGN PATENT DOCUMENTS

| | | |
|---|---|---|
| EP | 0 354 639 | 2/1990 |
| EP | 0 439 425 B1 | 4/1993 |
| EP | 0 786 309 | 7/1997 |
| JP | 11-309646 | 4/1998 |
| SU | 914188 | 5/1980 |
| SU | 984794 | 7/1980 |
| WO | 03/101666 | 12/2003 |

OTHER PUBLICATIONS

Goto, T., et al., "Development of a Rotary Fast Tool Servo for Ultraprecision Grinding of Silicon Wafer," Proc. Of $2^{nd}$ euspen International Conference, Turin, Italy, May 27-31, 2001, p. 790-793.

Ludwick, S. J. et al., "Calibration and Control of a Rotary Fast Tool Servo," Proceedings of ASPE Fourteenth Annual Conference, Oct. 1999.

McKinney, M., "The Many Facets of Diamond Turning," Laser Focus World, Oct. 2001.

"Machining a Biconic Mirror," http://airy.pec.ncsu.edu/PEC/research/projects/biconic/index.html, Abstract only, Oct. 21, 2002.

Popham, V.W., et al., "Variable Gap-Reluctance Linear Motor With Application to Linear Resonance Compressors," ASME, New York, Nov. 11-16, 2001.

"Rotary Fast-Tool Servo for Diamond Turning of Asymmetric Optics," http://web.mit.edu/prnc/www/Newprojects/FastTool/fast-tool.html, Oct. 21, 2002.

Gutierrez, H., et al., "Fabrication of Non-Rotationally symmetric Surfaces Using a Magnetically Levitated Fast-Tool Servo," http://airy.pec.ncsu.edu/PEC/publications/annual_reports/acutation/1997/97gutierrez.html, Abstract only, Oct. 21, 2002.

Hameyer, K. & Nienhaus M., "Electromagnetic Actuators—Current Developments and Examples," Paper Presented at the $8^{th}$ International Conference on New Actuators—Actuator 2002, Bremen, Germany (Jun. 2002).

Kaji, S., et al., "Ultraprecision Grinding of Large Silicon Wafer Using a Rotary Fast Tool Servo," Proc. Of $2^{nd}$ euspen International Conference, Turin, Italy, May 27-31, 2001 p. 802-805.

Rivin, E.I. "Properties and Prospective Applications of Ultra Thin Layered Rubber-Metal Laminates for Limited Travel Bearings," *Tribology Int.* 1983, vol. 18, No. 1.

Ludwick, S., "Design of a Rotary Fast Tool Servo for Ophthalmic Lens Production," http://www.me.gatech.edu/me/events/seminars/Ludwick.html, Abstract only, Oct. 21, 2002.

* cited by examiner

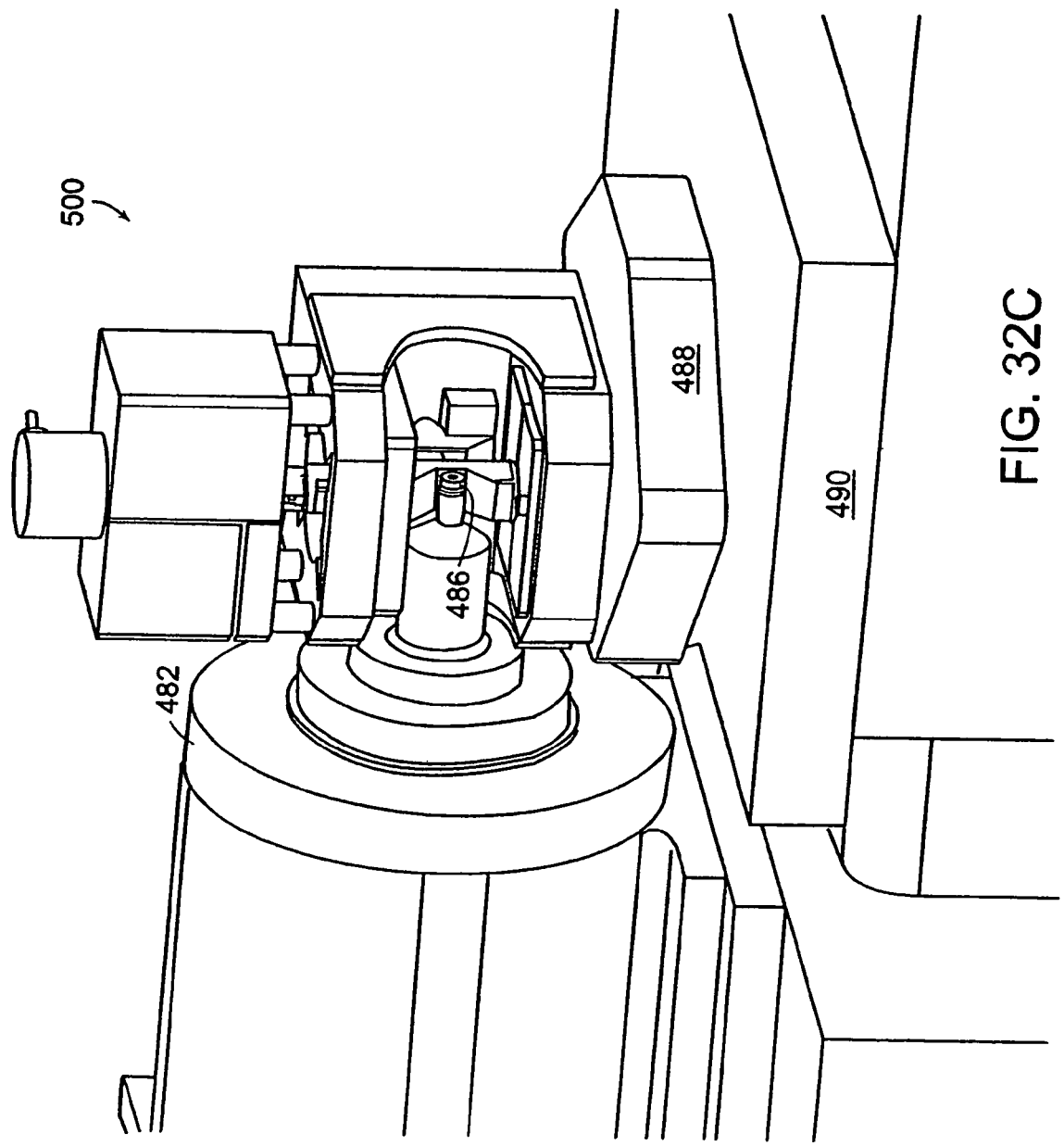

End view on AA'

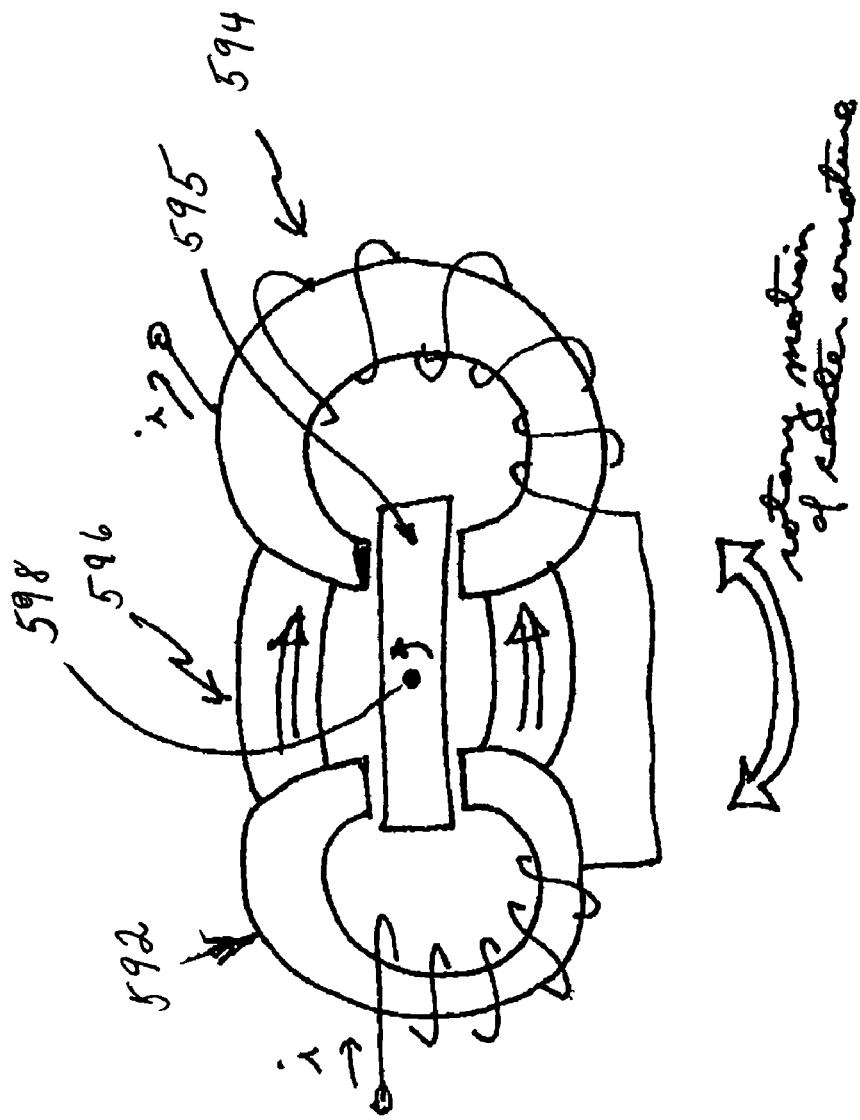

Top view

Side view

Face view of stator

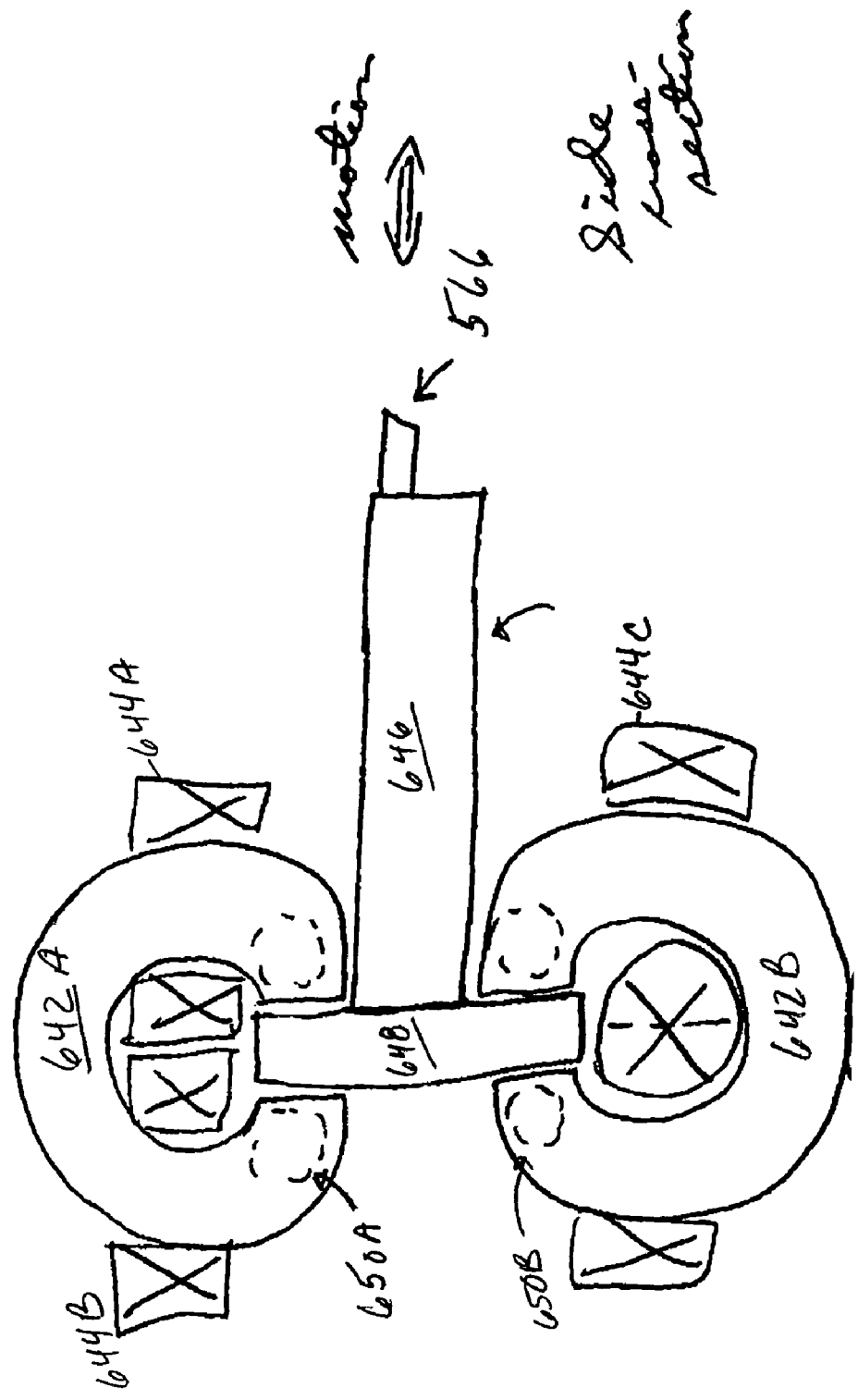

FLUX-BIASED ELECTROMAGNETIC FAST TOOL SERVO SYSTEMS AND METHODS

CROSS REFERENCES TO RELATED APPLICATIONS

The present application is a continuation-in-part of U.S. patent application Ser. No. 10/448,336, filed May 29, 2003 now U.S. Pat. No. 7,275,468, which claims the benefit of U.S. Provisional Application No. 60/383,956, filed on May 29, 2002. The entire contents of the above application are incorporated herein by reference.

BACKGROUND OF THE INVENTION

A fast tool servo is a well-known device that can be added to a new or existing machine tool to provide an additional axis of motion between the cutting tool and a workpiece. A fast tool servo most notably distinguishes itself by its ability to move the tool at a much higher bandwidth, that is at a high speed of controlled, repetitive motion, on its axis relative to the other machine tool axes, with accuracy equal to or better than that of the other tool axes. Fast tool servos fall into two broad categories: rotary and linear. A rotary fast tool servo produces relative motion between the cutting tool and a workpiece by rotation of a swing arm that carries the tool at a fixed radius from the axis of rotation. A linear fast tool servo produces relative motion between the cutting tool and a workpiece by producing a linear translation of the tool.

A rotary fast tool servo is preferred in certain precision machining applications that are intolerant to the reaction force developed by a linear fast tool servo. For instance, in an application where it is desired to produce a textured surface on a spherical-shaped workpiece a fast tool servo is mounted on a rotary table that allows the tool to engage the workpiece, which is mounted to a spindle, at all points from its "pole" to its "equator". A rotary-type mechanism oriented with its rotation axis parallel to the rotary table generates a reaction torque on the rotary table, which can be allowed to float as a reaction mass or be locked and allowed to transmit the torque to the machine structure. In the later case the machine structure experiences a disturbance torque whose value does not depend on the angle of the rotary table. In contrast, a linear fast tool servo generates a reaction force on the rotary table. This is generally not a problem when the rotary table is positioned so that the reaction force is parallel to the direction of travel of the slide carrying the rotary table. However, when the rotary table is positioned so that a component of the reaction force is perpendicular to the direction of travel of that slide, that force component is transmitted by the slide to the machine structure as a disturbance. To the extent that the tool/workpiece interaction is affected by disturbances to the machine structure, a linear fast tool servo will produce errors in the desired surface texture as a function of "latitude" on a spherical workpiece.

Current fast tool servo technology does not support sufficient bandwidth to meet certain manufacturing goals and is also not sufficiently fast to machine certain types of materials, for example, some plastics, properly. It is desirable to have a method and apparatus for a rotary fast tool servo having a higher bandwidth than currently available systems.

SUMMARY OF THE INVENTION

The present invention is directed to a fast tool servo system that improves the accuracy and speed to enable and meet manufacturing goals for, for example, fabricating three-dimensional surface features. The embodiments of the present invention provide a high level of bandwidth and precision control to form short spatial wavelength features, for example, 50 micron long features with 5 micron peak to valley dimensions at 10 kHz or more. In a preferred embodiment, the rotary fast tool servo system includes a cutting element mounted to a reciprocating arm that is driven by an actuator. The arm is preferably mounted to the fast tool servo base by flexures on at least one side of the cutting element. Each flexure preferably includes orthogonally positioned flexure elements that extend from the arm to the base. The arm can be oriented vertically, horizontally, or in any other desired orientation and can be rotated, driven linearly or along any desired paths. The flexures serve to guide movement of the tool during cutting. The workpiece can be mounted on the spindle of a precision lathe which can rotate the workpiece during operation.

In a preferred embodiment, the system has an additional actuator to adjust the tool position relative to the workpiece and can employ coarse and fine adjustments. Sensors can be used to measure position, displacement and/or rotation of system elements and provide feedback control signals. Damping elements can be added to adjust the dynamic performance for certain applications.

The embodiments of the present invention relate to a system for a high bandwidth rotary fast tool servo, and in a preferred embodiment provides tool motion in a direction nominally parallel to the surface-normal of a workpiece at the point of contact between the cutting tool and workpiece. In one embodiment, the invention provides ±25 microns of tool motion with ±0.025 micron (±25 nm) of accuracy when operating at a frequency of at least 2000 Hz, while producing negligible reaction forces and torques on the machine tool on which the fast tool servo is mounted. The fast tool servo device of the present invention can achieve a bandwidth of at least approximately two to ten times that of current commercially available systems. Consequently, the embodiments of the present invention can increase production rates by at least two to ten times in manufacturing processes that utilize fast tool servos.

A preferred embodiment of the present invention includes a high bandwidth rotary fast tool servo device, having a base, a cutting tool, a rotatable swing arm to hold the cutting tool at a fixed radius from an axis of rotation, and at least three flexures attached to the swing arm and extending radially from the swing arm relative to the base, the flexures being positioned such that rotation of the rotatable arm flexes the flexures. The first, the second and the third flexures have an angular separation from each other and support the rotatable swing arm in the base and establish an axis of rotation for the swing arm.

The device further includes a fourth flexure attached to the swing arm and extending radially from the swing arm relative to the base, the fourth flexure can be co-linear with one of the other flexures. In an alternate preferred embodiment, a pair of flexures can be co-linear and can be formed from a single blade. The device also includes the swing arm being driven by an actuator. A controller is included in the device.

In accordance with another aspect of the invention, a method of machining a part from a workpiece includes the steps of rotating a workpiece on a spindle, providing a cutting tool carried by a swing arm and offset from a rotational axis of the swing arm, supporting the swing arm and establishing a rotation axis for the swing arm with a plurality of flexures wherein both ends of the flexures are substantially fixed, rotating the swing arm for moving the cutting tool into and out of engagement with the workpiece and establishing relative motion between the workpiece and the cutting tool to form the part. In alternate embodiments, either the workpiece or the rotational axis of the swing arm carrying a cutting tool can be stationary while the other moves in a plane relative to the stationary piece. In an embodiment both the workpiece and the cutting tool can travel along at least two axes.

The method of machining includes rotating the workpiece at a speed in excess of 300 revolutions per minute. Further, the workpiece can rotate in a range of between 10 and 10,000 revolutions per minute. The method of machining includes the actuator moving the swing arm at a frequency of at least 1500 cycles per second. The cutting tool can have a full stroke length of 5 microns or a stroke length of ±2.5 microns for a rotation frequency of approximately 2 kHz, for example. A full stroke length of 50 microns or a stroke length of ±25 microns can be achieved in a preferred embodiment.

In accordance with another aspect of the invention, a method of controlling relative motion between a workpiece and a cutting tool of a fast tool servo includes the steps of providing a machine tool with a cross-slide and an in-feed slide, determining with at least one sensor the rotation of a workpiece spindle of the machine and the workpiece carried by the workpiece spindle, determining with at least one sensor the position of the cross-slide of the machine, determining with at least one sensor the position of the in-feed slide of the machine, determining with at least one sensor the position of a cutting edge carried by a swing arm of the fast tool servo relative to the portion of a machine tool that the fast tool servo is attached to, and moving the machine tool with the workpiece and the cutting edge of the fast tool servo relative to each other to form a part. The method further includes the steps of providing a base unit of the machine tool for holding the rotatable spindle, determining the position of the base unit, the base unit movable in at least one of an in-slide or cross-slide directions; and providing the position of the base unit and the rotational position of the workpiece spindle to a precision lathe controller and servo controller. The method can also include the steps of determining with at least one sensor the rotational position of the swing arm, and providing the position of the swing arm to a fast tool servo controller. The method further includes the steps of synthesizing angular velocity of the swing arm from the position sensor, providing additional sensors associated with one of the swing arm and the actuator, and providing information from the additional sensors to the fast tool servo controller to determine the exact position and the rotation of the swing arm.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 32B and 32C are views illustrating a lathe with a workpiece and a rotary tool servo system in accordance with a preferred embodiment of the present invention.

FIGS. 38A and 38B illustrate a permanent magnet biased actuator for producing linear motion and rotary motion, respectively;

FIGS. 47A and 47B illustrate a radial configuration of flux-biased coils used in conjunction with rotational fast tool servos;

DETAILED DESCRIPTION OF THE INVENTION

Figure 1:
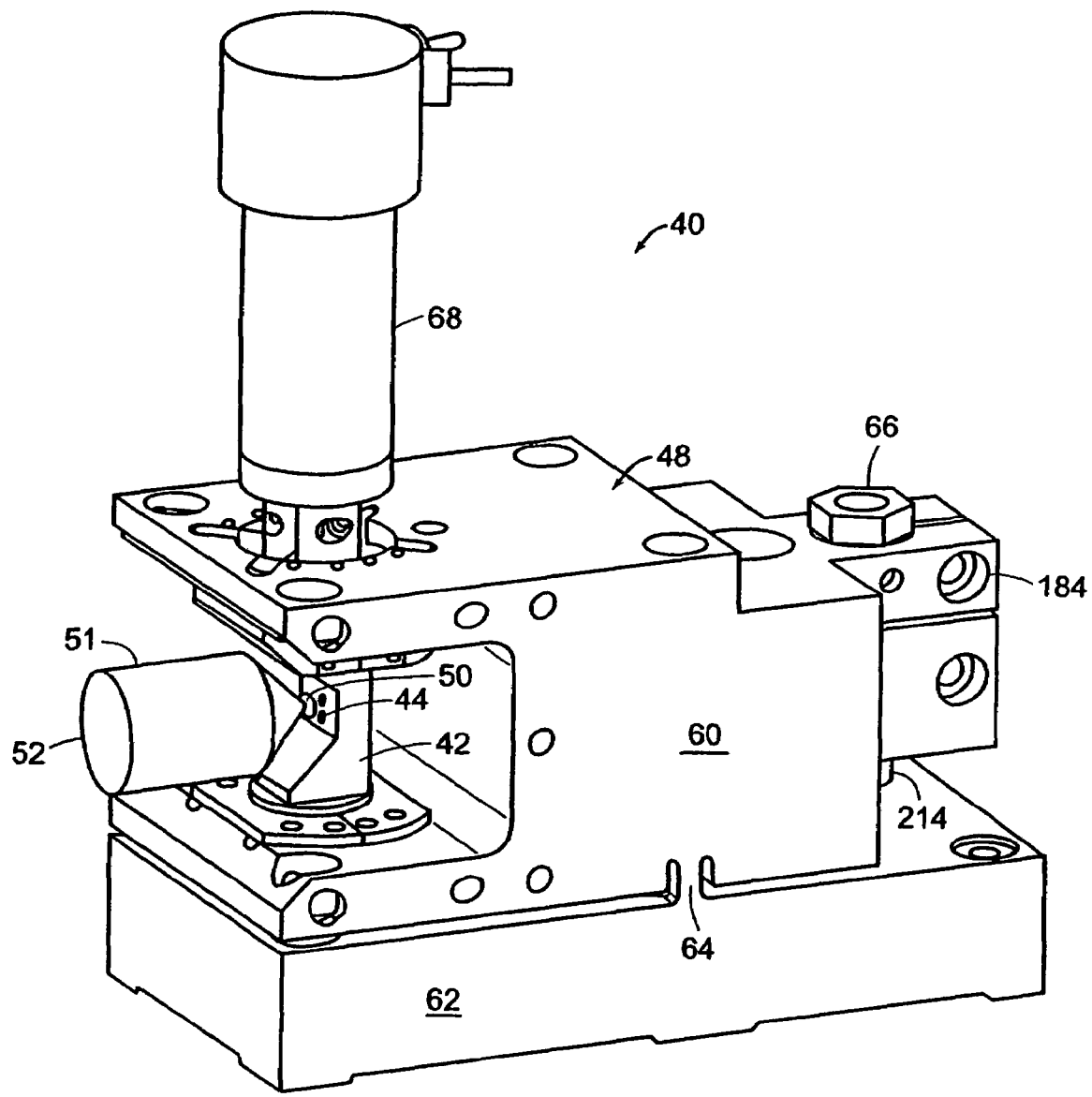
FIG. 1 is an isometric projection of the rotary fast tool servo assembly in accordance with a preferred embodiment of the present invention.

Referring to the drawings in detail, a high bandwidth rotary fast tool servo system is illustrated in accordance with a preferred embodiment of the present invention designated generally as 40. In a preferred embodiment, the high bandwidth rotary fast tool servo provides tool motion in a direction nominally parallel to the surface-normal of a workpiece at the point of contact between the cutting tool and workpiece.

Figure 5:
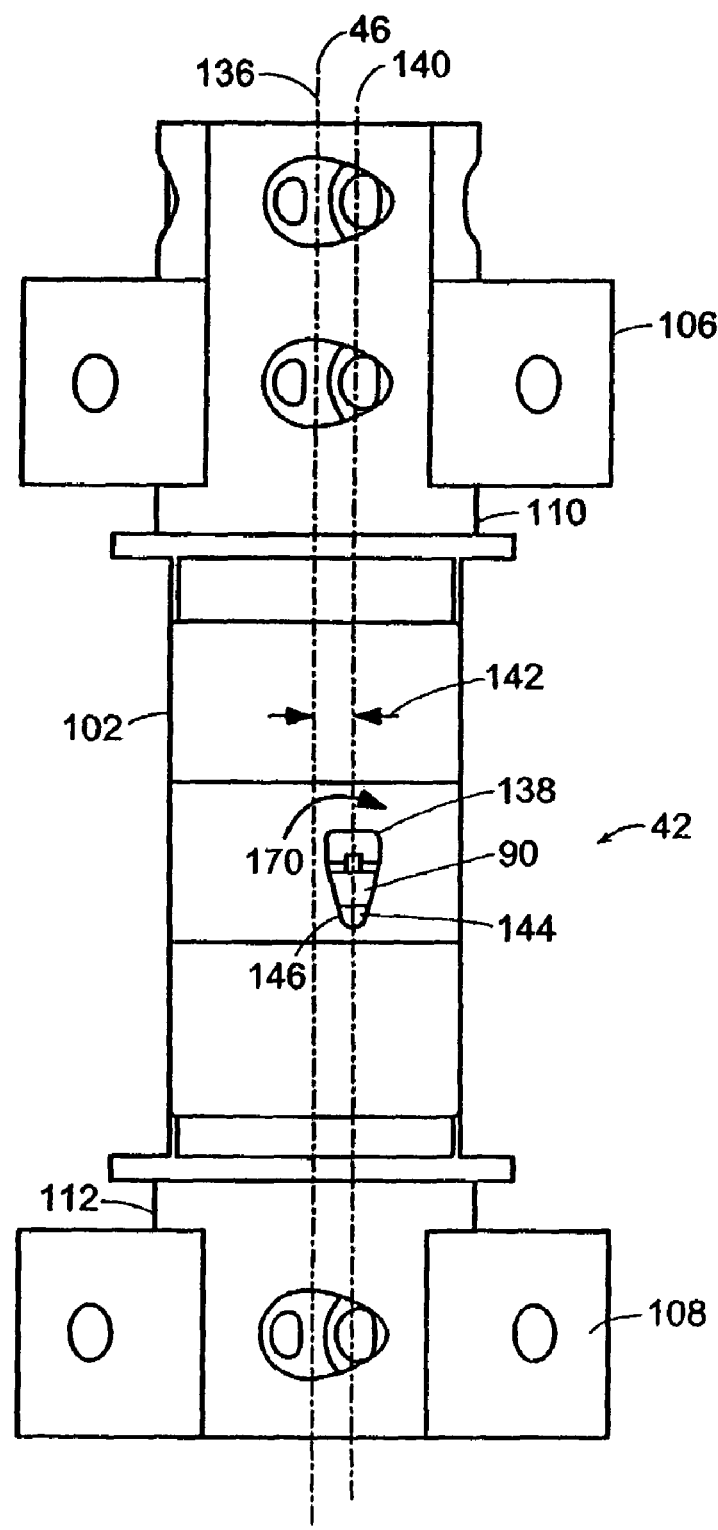
FIG. 5 is a front view sketch of the swing arm assembly of FIG. 4.

FIG. 1 shows the high bandwidth rotary fast tool servo 40 having a swing arm assembly 42 holding a cutting tool 44 to machine a workpiece 50. The cutting tool 44 is offset from the axis of rotation 46, as best seen in FIG. 5, of the swing arm assembly 42. The workpiece 50 is held typically by a workpiece holder 51 that attaches to a lathe spindle at surface 52. The swing arm assembly 42 is supported in a base 48 having an upper portion 60 and a lower portion 62. The upper portion 60 and lower portion 62 are connected by a flexure hinge 64. The upper portion 60 of the base 48 has a differential screw assembly 66. An actuator 68 is connected to the top of the swing arm assembly 42.

In operation, the actuator 68 rotates the swing arm assembly 42 such that the cutting tool 44 is moved into and away from the lathe-mounted, rotating workpiece 50 in a rapid and controlled manner in order to machine the workpiece. In an alternate embodiment the swing arm assembly 42 and the moving member of the actuator 68 are integrated and are one and the same and carry the cutting tool 44. The differential screw assembly 66 together with the flexure hinge 64 provide accurate cutting tool positioning in a direction nominally tangent to the surface-normal of a workpiece at the point of contact between the cutting tool and workpiece and nominally parallel to the axis of rotation of the swing arm assembly by enabling the upper portion 60 of the base 48 to be repositioned in a fine-grained manner with respect to the lower portion 62 of the base 48.

Figure 2A:
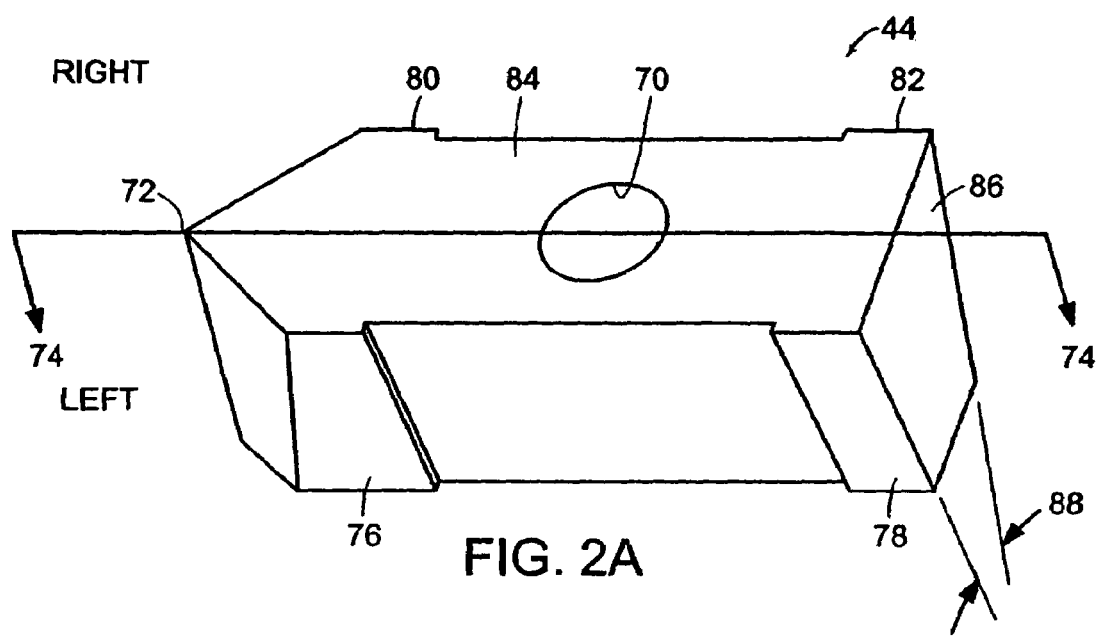
FIG. 2A is an isometric projection of a cutting tool according to principles of the preferred embodiments of the present invention.

FIG. 2A shows a first embodiment of the cutting tool according to principles of the present invention. The cutting tool 44 has a threaded hole 70, a cutting edge 72, a right/left plane of symmetry 74 that divides the tool into right and left halves, a left first mating surface 76 and a left second mating surface 78, a right first mating surface 80 and a right second mating surface 82, a top surface 84, and a back surface 86. The left first and second mating surfaces 76 and 78 and the right first and second mating surfaces 80 and 82 form a taper angle 88 bisected by the right/left plane of symmetry 74. The left first and second mating surfaces 76 and 78 and the right first and second mating surfaces 80 and 82 mate with the swing arm 102 of the swing arm assembly 42 as described hereinafter with respect to FIG. 5. The threaded hole 70 is substantially parallel to and nominally centered on the plane of symmetry 74.

In one preferred embodiment, the cutting edge 72 is a diamond. Alternatives for the cutting edge 72 can be various materials including cubic boron nitride, tungsten carbide, high speed steel, and other materials used for precision machining metals, plastics, ceramics, glasses and foams.

Figure 2B:
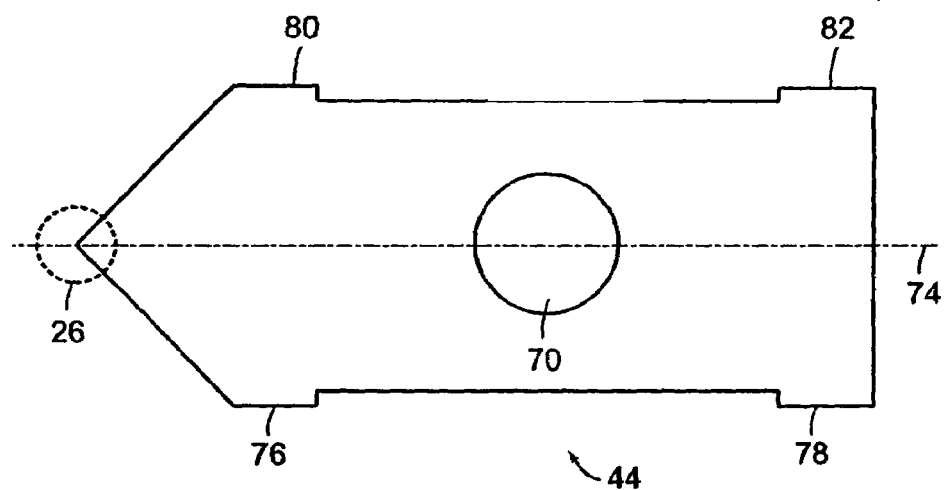
FIG. 2B is a top view of the cutting tool of FIG. 2A in accordance with a preferred embodiment of the present invention.
Figure 2C:
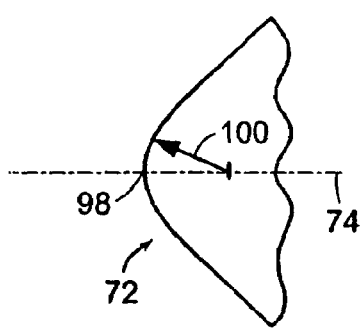
FIG. 2C illustrates an enlargement of the cutting tool cutting edge in accordance with a preferred embodiment of the present invention.

FIG. 2B is a top view of the cutting tool 44 of FIG. 2A in accordance with a preferred embodiment of the present invention. An enlargement of the cutting edge 72 is shown in FIG. 2C. A center point 98 on the cutting edge 72 lies in the plane of symmetry 74 of the cutting tool 44 as best seen in FIG. 2C. The cutting tool edge 72 has a radius of curvature 100 that lies in a plane that is substantially perpendicular to the plane of symmetry 74 of the cutting tool 44 and nominally in the plane of the top surface 84 of the cutting tool. In alternative embodiments the plane containing the radius of curvature can form a substantial angle with the top surface 84 of the cutting tool.

Figure 3:
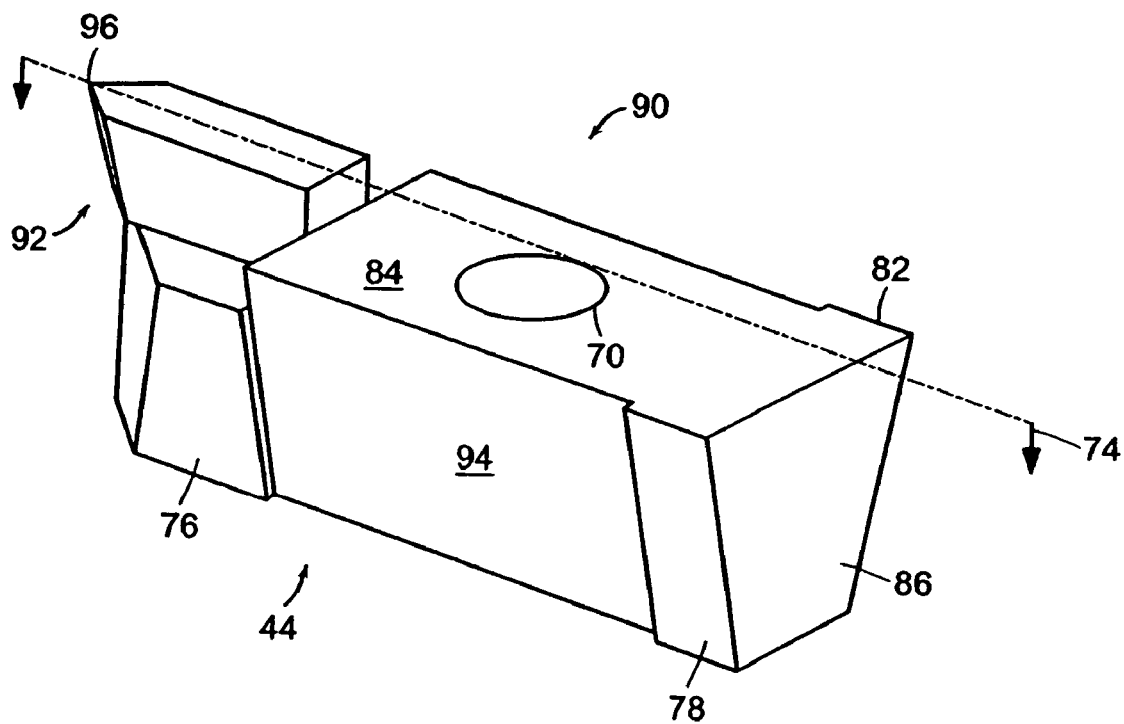
FIG. 3 is an isometric projection of an alternative embodiment of the cutting tool of FIG. 2A.
Figure 4:
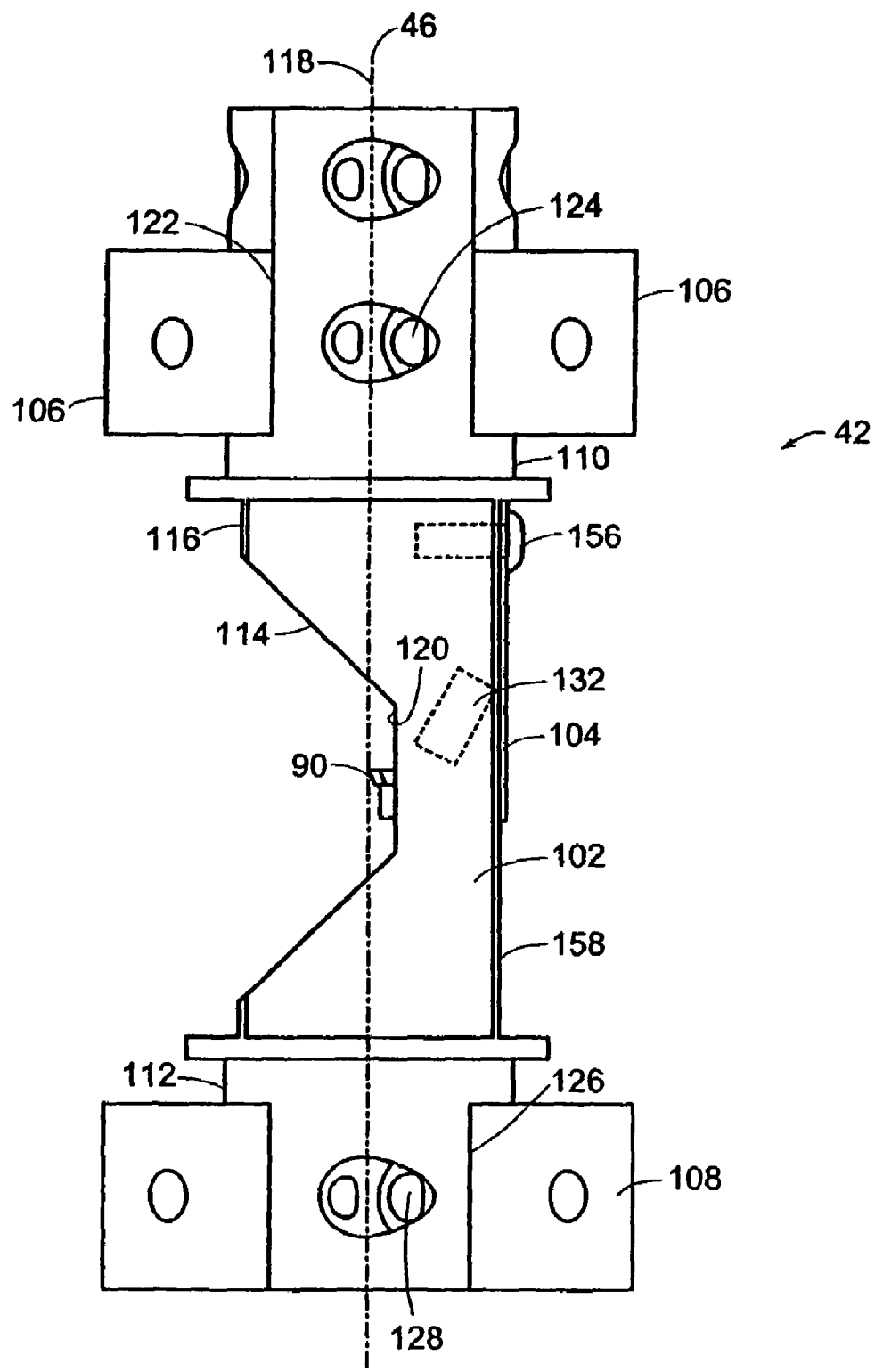
FIG. 4 is a side view sketch of a swing arm assembly of FIG. 1.

FIG. 3 shows an alternative embodiment of the cutting tool of FIG. 2A. The cutting tool 90, instead of being a single piece, has a cutting portion 92 set into a holder 94. The cutting portion 92 has a cutting edge 96. The holder 94 has left and right first and second mating surfaces 76, 78, 80 and 82 to mate with the swing arm assembly 42 as seen in FIG. 4. The holder 94 also has the threaded hole 70 substantially parallel to and nominally centered on the plane of symmetry 74.

In an alternate embodiment of the cutting tool, the cutting portion 92 is bonded directly to the swing arm 102 shown in FIG. 4, without the use of a holder 94. Bonding methods include, but are not limited to, epoxying, braising, soldering and diffusion bonding.

FIG. 4 is a left side view of the swing arm assembly 42 illustrated in FIG. 1. The swing arm assembly 42 has a swing arm 102, a tool clamp flexure 104, an upper pair of flexure blades 106, and a lower pair of flexure blades 108. The flexure blades are referred to herein as flexures and are pliant, extending members. The upper pair of flexures 106 and the lower pair of flexures 108 constrain the swing arm 102 in all degrees of freedom except rotation around an axis of rotation 46 that is nominally coincident with the long axis of the swing arm 102. In other preferred embodiments, the axis of rotation may be offset from but substantially parallel to the long axis of the swing arm. The swing arm 102 has an upper hub 110 and a lower hub 112. The swing arm 102 has a workpiece clearance cut 114 that is nominally midway between the upper hub 110 and the lower hub 112. The clearance cut 114 extends from a front face 116 of the swing arm 102 through the axis of rotation 46 and slightly beyond. A front/back plane 118 extends through the axis of rotation and parallel to the front face 116. The swing arm 102 has a back clearance surface 120 that is parallel to and spaced from the front/back plane 118. The clearance cut 114 allows the cutting tool edge 72 or 96 and a small portion of the cutting tool 44 or 90 to protrude from the back clearance surface 120 of the swing arm 102, and allows a workpiece to extend into the swing arm 102 as much as practicable.

In an alternate embodiment, one set of three flexures are attached to the swing arm and extend radially from the swing arm. The three flexures support the rotatable swing arm in the base and establish an axis of rotation for the swing arm. Those skilled in the art can appreciate that an embodiment of the present invention using two sets of flexures spaced apart on the swing arm so that the cutting tool is between the two sets, provides the swing arm with structural support at two opposite ends. In contrast, a single set of flexures at only one end of the swing arm provides a structural support that is less rigid. Decreasing the number of flexures from four to three also reduces the stiffness of the tool relative to the base. Preferred embodiments include a trade-off analysis to determine the number of flexures used. The trade-off in choosing three, four or more flexures and one or two sets of flexures involves considering the reduction of stiffness versus the reduction in moving mass and increase in the work space volume around the tool. To maintain a constant stiffness level at the tool, reducing the number of flexures requires increasing their dimension or choosing a material with a higher stiffness. Reducing the number of sets from two sets to one set of flexures (for example, by removing the lower flexures 108) requires the same trade-off analysis, increasing the bending stiffness of the swing arm and possibly decreasing the length of the flexures. The material of the flexures can include, without limitation, steel, beryllium-based alloys and materials that have a high fatigue strength to stiffness ratio. The material of the swing arm can include, without limitation, aluminum, steel, beryllium and composite materials that have a high stiffness to weight ratio.

The central portion of the upper flexure blade pair 106 is fixed to the swing arm 102 by bonding the flexure blades in a pair of upper slots 122 in the upper hub 110, and can be further secured by tightening a plurality of upper slot screws 124. The central portion of the lower flexure blade pair 108 is fixed to the swing arm 102 by bonding the flexure blades in a pair of lower slots 126 in the lower hub 112, and can be further secured by tightening a plurality of lower slot screws 128. A tool clamp screw 132 carried by the swing arm 102 works with the tool clamp flexure 104 to fix the cutting tool 44 or 90 in the swing arm 102.

FIG. 5 is a front view of the swing arm assembly 42 of FIG. 4 holding the cutting tool 90 of FIG. 3. The swing arm 102 has a right/left plane of symmetry 136 that contains the swing arm axis of rotation 46 and is perpendicular to the front/back plane 118, shown in FIG. 4. The swing arm 102 has a slot 138 that receives the cutting tool 90. The slot 138 has a plane of symmetry 140 that divides the slot 138 into right and left halves. The slot 138 is located in the swing arm 102 approximately midway between the upper hub 110 and the lower hub 112. The slot plane of symmetry 140 is parallel to the right/left plane of symmetry 136 and is offset from the swing arm axis of rotation 46 by a distance equal to an offset radius 142.

Figure 6:
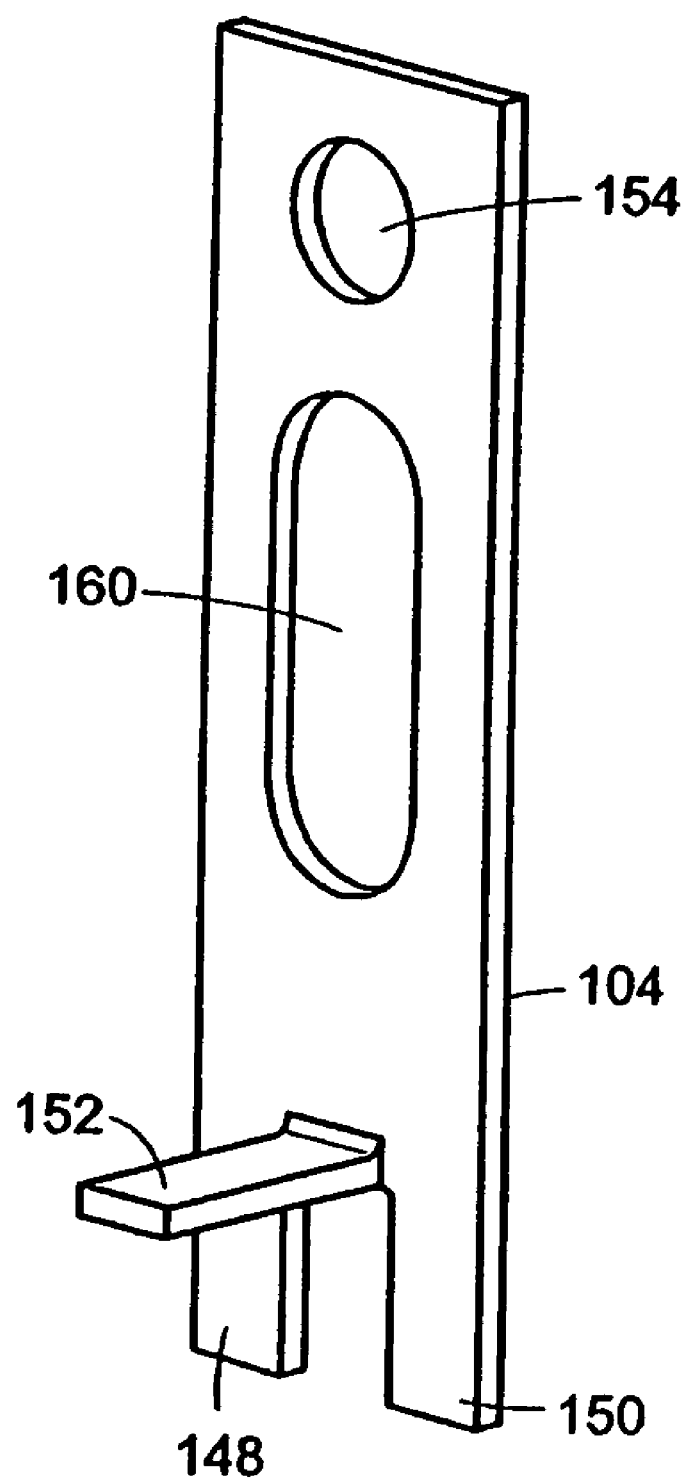
FIG. 6 is an isometric projection of a tool clamp flexure of the swing arm assembly of FIG. 4.

The cutting tool 90 is located in the swing arm 102 by mating four surfaces 76, 78, 80 and 82 on the cutting tool 90, which form a taper angle 88, to a pair of surfaces 144 and 146 in the swing arm slot 138, and mating the back surface 86 of the cutting tool 90 with a pair of back blades 148 and 150 as shown in FIG. 6 of the tool clamp flexure 104.

It can be appreciated by those skilled in the art that the holding force and alignment between a tool and a tool holder can be improved by providing the tool with a taper angle that mates with a receiving feature in a tool holder. The present embodiment improves upon this method by creating four mating areas on the tool for contact between the tool and the slot. Those skilled in the art will recognize that the discontinuity of the mating surface 76 and 78 and of the mating surface 80 and 82 by the recess in between the two portions provides four distinct areas of contact between the cutting tool 90 and the receiving surfaces 144 and 146 of the swing arm slot 138. This results in improved mating and alignment of the cutting tool 90 with the swing arm slot 138, compared to a design that utilizes simpler continuous surfaces on the cutting tool 90.

When the cutting tool 90 is held in the swing arm 102, the cutting tool plane of symmetry 74 and the swing arm slot 138 plane of symmetry 140 are coincident, and the cutting tool top surface 84 is nominally perpendicular to the swing arm axis of rotation 46. Furthermore, the center point 98 on the cutting tool edge 96 is offset from the swing arm right/left plane of symmetry 136 by a distance equal to the offset radius 142, and the center point 98 lies nominally in the swing arm front/back plane 118, as seen in FIG. 4. In alternate embodiments the center point 98 lies in front of or behind the swing arm front/back plane 118.

FIG. 6 shows the tool clamp flexure 104. The tool clamp flexure 104 has a front blade 152 that is interposed between the first back blade 148 and the second back blade 150 and is substantially perpendicular to the back blades 148 and 150. The tool clamp flexure 104 has a hole 154 for receiving a fastener 156 to secure the tool clamp flexure 104 to the swing arm back surface 158 as seen in FIG. 4. The tool clamp flexure 104 also has an access slot 160. The access slot 160 allows access to the tool clamp screw 132.

Figure 7:
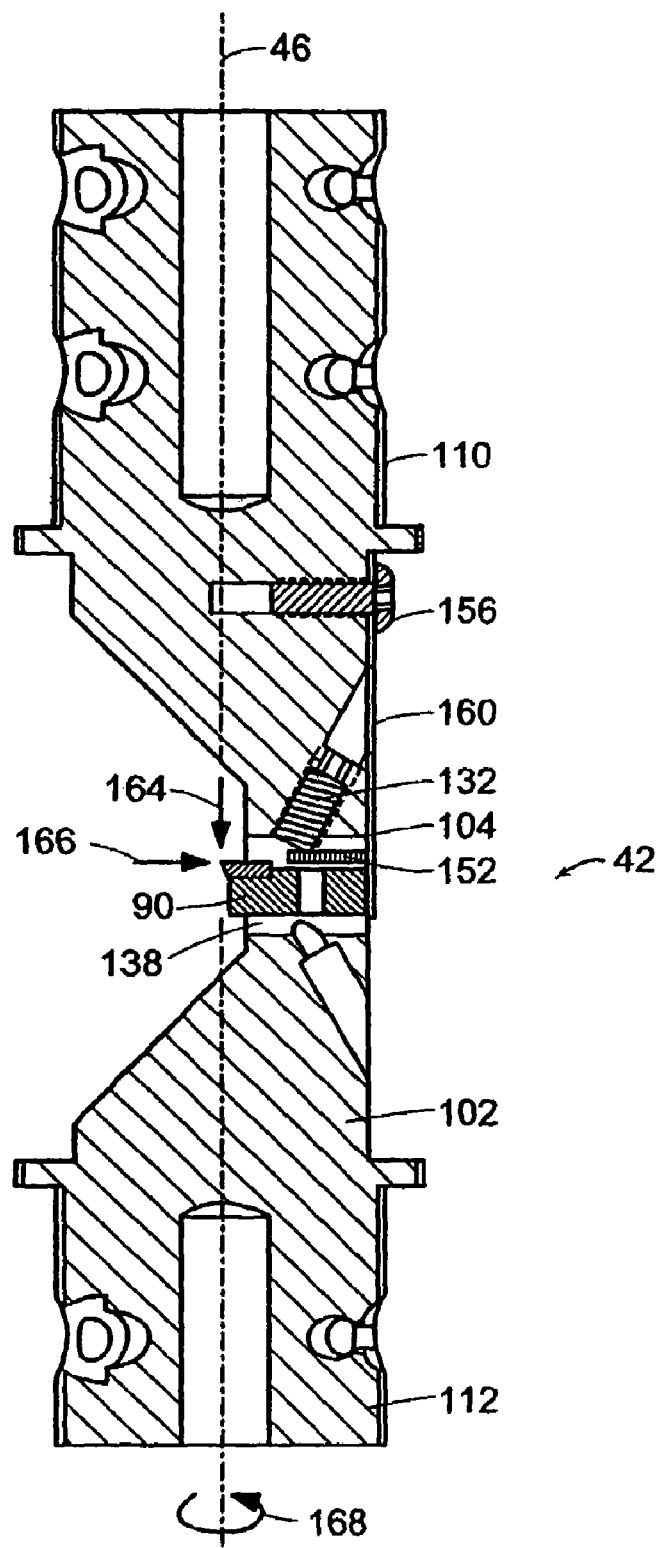
FIG. 7 is a side cross-sectional view of the swing arm assembly of FIG. 4.

FIG. 7 is a side cross-sectional view of the swing arm assembly 42. In operation, the tool clamp flexure 104 is located on the swing arm 102 such that the cutting tool 90 is located under the front blade 152 of the tool clamp flexure 104. The tool clamp screw 132 which is accessible through the flexure slot 160, pushes on the front blade 152 of the tool clamp flexure 104 causing the front blade 152 to deflect and contact the cutting tool top surface 84, forcing the cutting tool 90 downward in the swing arm slot 138. In an alternative embodiment a screw engages the threaded hole 70 in the cutting tool 90 to draw down the cutting tool 90 into the swing arm slot 138.

When the cutting tool edge 96 and workpiece 50 contact each other during use, a cutting force 164 and a thrust force 166 develops between the two bodies. The cutting force 164 is in a direction substantially parallel to the swing arm axis of rotation 46. The thrust force 166 is in a direction substantially perpendicular to the swing arm axis of rotation 46. Both the cutting force 164 and the thrust force 166 lie substantially in the plane of symmetry 140 of the slot 138 shown in FIG. 5. The cutting force 164 and thrust force 166 are opposed by the upper pair of flexure blades 106 and the lower pair of flexure blades 108, as seen in FIG. 5. Still referring to FIG. 7, the thrust force 166, in this example, also produces a torque 168 by acting at a distance equal to the off-set radius 142 from the swing arm axis of rotation 46. The torque 168 is opposed by a torque produced by the actuator 68 as shown in FIG. 1.

Figure 8:
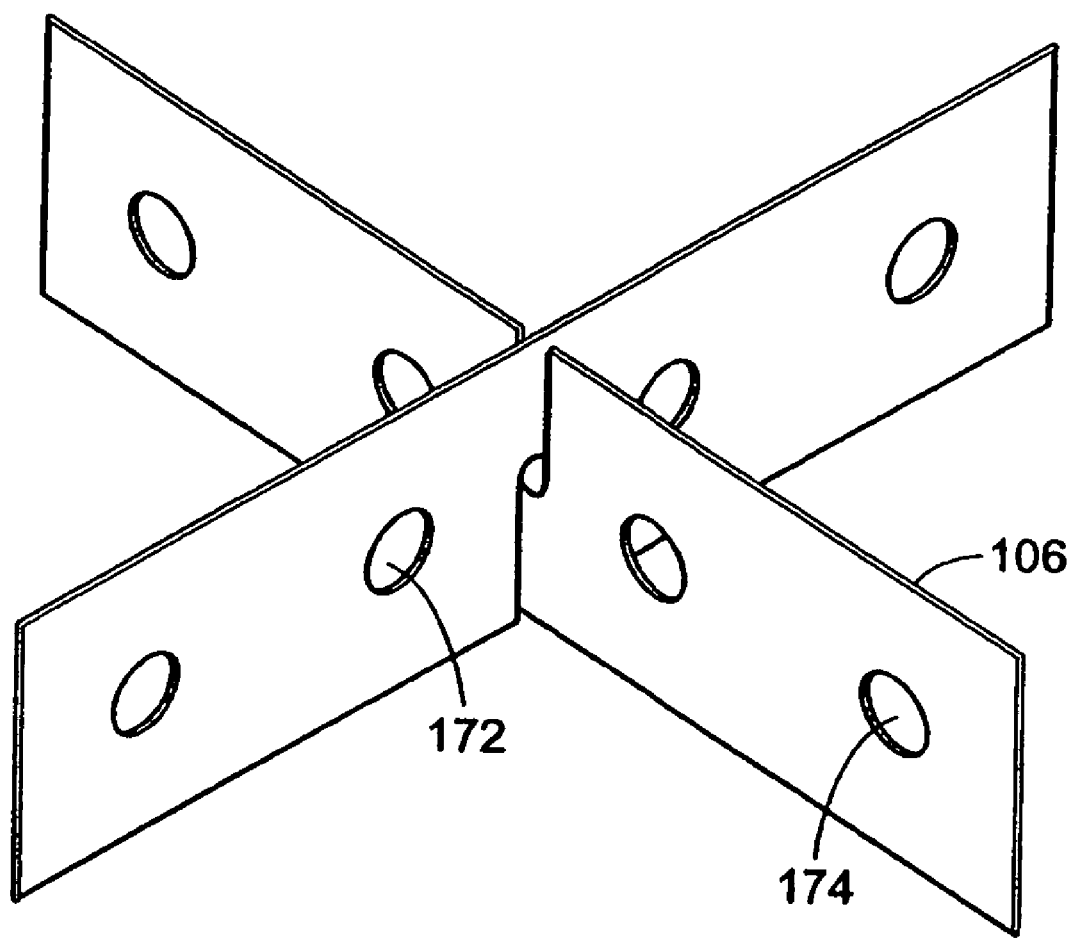
FIG. 8 is an isometric projection of a pair of flexures of the swing arm assembly of FIG. 4.

FIG. 8 shows the pair of upper flexure blades 106. The lower flexure blades 108 are similarly constructed in this embodiment. Each pair of flexure blades 106 and 108 has a first flexure blade and a second flexure blade positioned substantially perpendicular to each other. Each of the blades 106 has a plurality of holes 172 and 174. The outer holes 174 are used for securing the flexure blades 106 to the swing arm base 48. The inner holes 172 allow for the upper slot screws 124 to pass from one portion of the upper hub 110 to another portion of the hub for securing the flexure blades 106 in the slots 122. The hole in the flexure blade through which the screw passes provides adequate clearance so there is no interference with the tension.

Figure 9:
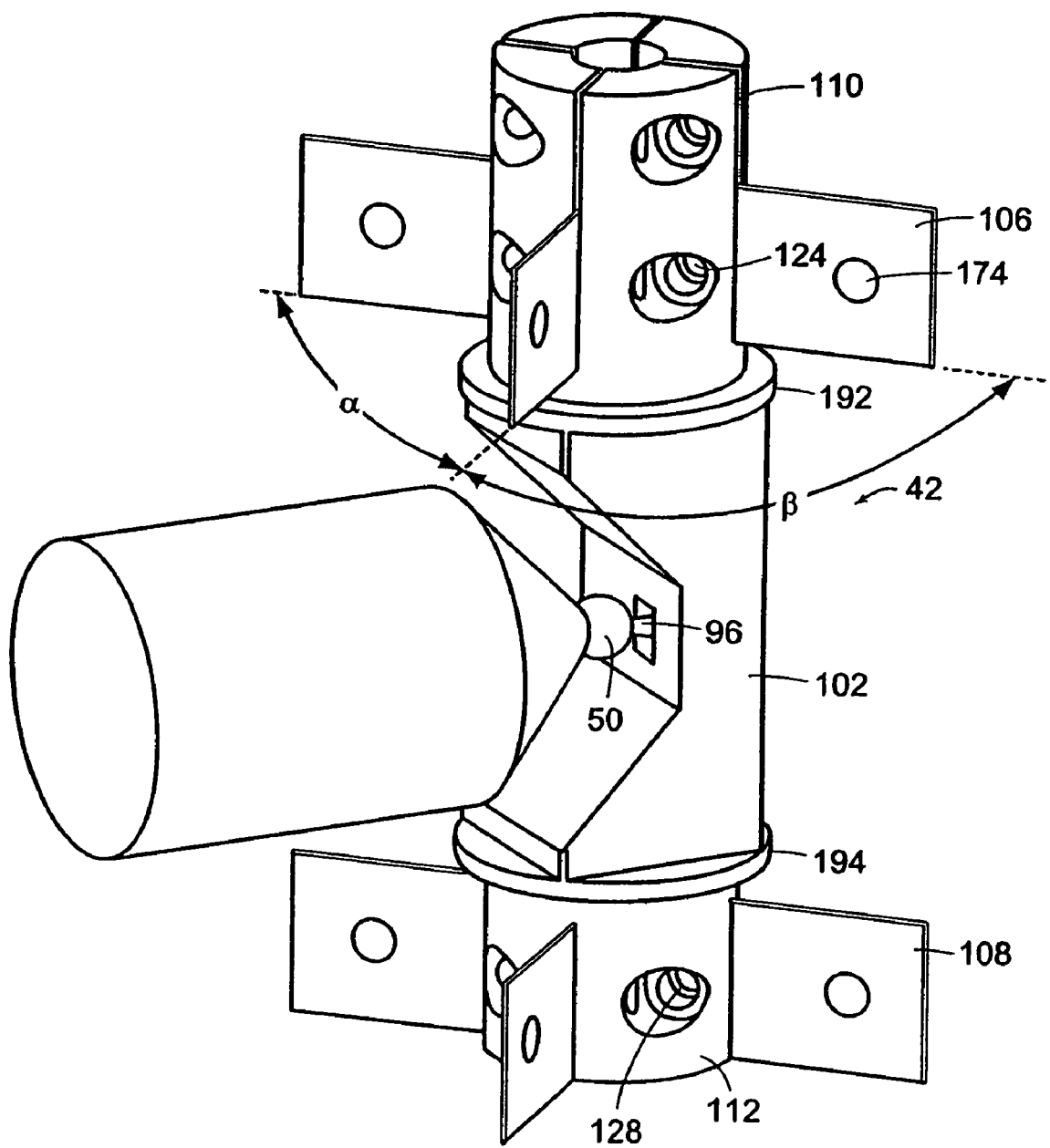
FIG. 9 is an isometric projection of the swing arm assembly of FIG. 4 illustrating two pairs of flexures of FIG. 8 and a workpiece in accordance with a preferred embodiment of the present invention.

FIG. 9 shows the swing arm assembly 42 and the workpiece 50. The swing arm assembly 42 has the upper pair of flexures or flexure blades 106 in the upper hub 110 and the lower pair of flexures or flexure blades 108 in the lower hub 112. In the swing arm assembly 42, the upper and lower pairs of flexure blades or elements 106 and 108 are oriented at an angle of forty-five degrees from the swing arm right/left plane of symmetry 136, as shown in FIG. 5, so as to maximize the open space between the workpiece 50 and the swing arm base 48, as best seen in FIG. 1.

The central portion of the pair of the upper flexure blades 106 is fixed to the swing arm 102 by bonding the flexure blades 106 in the upper slots 122 in the upper hub 110, and can be further secured by tightening the upper slot screws 124. The upper slot screws 124 pass through holes 172 of the upper flexure blades 106. The central portion of the pair of the lower flexure blades 108 is fixed to the swing arm 102 by bonding the flexure blades in the lower slots 126 in the lower hub 112, and can be further secured by tightening the lower slot screws 128. Those skilled in the art will recognize that by properly tightening the screws 124 and 128, the bonded joint can be preloaded in compression to the extent necessary to avoid stress reversal in the bonded joint during use of the embodiments of the present invention. It is well known that stress reversal and tension/compression cycles, reduce the fatigue life of a mechanical component.

Rotation of the swing arm 102 relative to the base 48 causes an out-of-plane bending in the upper and lower pairs of flexure blades 106 and 108. The in-plane stiffness of each flexure blade, when combined as a system of upper and lower pairs of flexure blades 106 and 108, constrains the swing arm 102 in five of six possible degrees of freedom, leaving free rotation around the swing arm axis of rotation 46 shown in FIG. 5. That is, the upper pair of flexure blades 106 and lower pair of flexure blades 108 support and constrain the swing arm 102 as a fixed-end/fixed-end beam with a single degree of freedom of rotation around the swing arm axis of rotation 46. Those skilled in the art will recognize that the swing arm 102 is actually over-constrained by the upper and lower pairs of flexure blades 106 and 108 in the sense that the blades will resist large rotations that would require them to stretch substantially. This is acceptable in the embodiments of the present invention since the swing arm 102 is subjected to relatively small rotation angles around the swing arm axis of rotation 46. Since the cutting edge 96 is located inside of the virtual cylinder formed by joining the upper hub 110 and lower hub 112, and is spaced a small distance (i.e. the offset radius 142) from the swing arm axis of rotation 46, the bending moment on the swing arm 102 from the cutting force 164 as represented by 170 in FIG. 5, is kept within a tolerable range. In an alternate preferred embodiment, the cutting edge 96 is located outside of the virtual cylinder formed by joining the upper hub 110 and lower hub 112, and is spaced a larger distance (i.e. the offset radius 142) from the swing arm axis of rotation 46.

One skilled in the art will recognize that the swing arm 102 and flexure blades 106 and 108 can be manufactured as a single unit by machining a single piece of material using a variety of methods including wire electro-discharge machining, and will also recognize that the swing arm 102, flexure blades 106 and 108, and a portion or all of the base 48 can be manufactured as a single unit by machining a single piece of material with the above described methods.

As described hereinbefore, preferred embodiments can include as a minimum, one set of three flexures that are disposed on the swing arm and extend radially from the swing arm. The blades are disposed around the swing arm in an angular relationship as illustrated in FIG. 9 of angle $\alpha$ or $\beta$ between the blades. The angles $\alpha$ and $\beta$ can be optimized such that the flexures keep the center line of the rotating piece fixed. In an embodiment, the three flexures form a T-shape wherein angles $\alpha=\beta=90°$. In another preferred embodiment, the angles $\alpha$ and $\beta$ are non-equidistant but are optimized to increase the work space around the tool while providing the desired amount of support and stiffness at the tool to resist the cutting forces developed between the tool and the workpiece.

Figure 10:
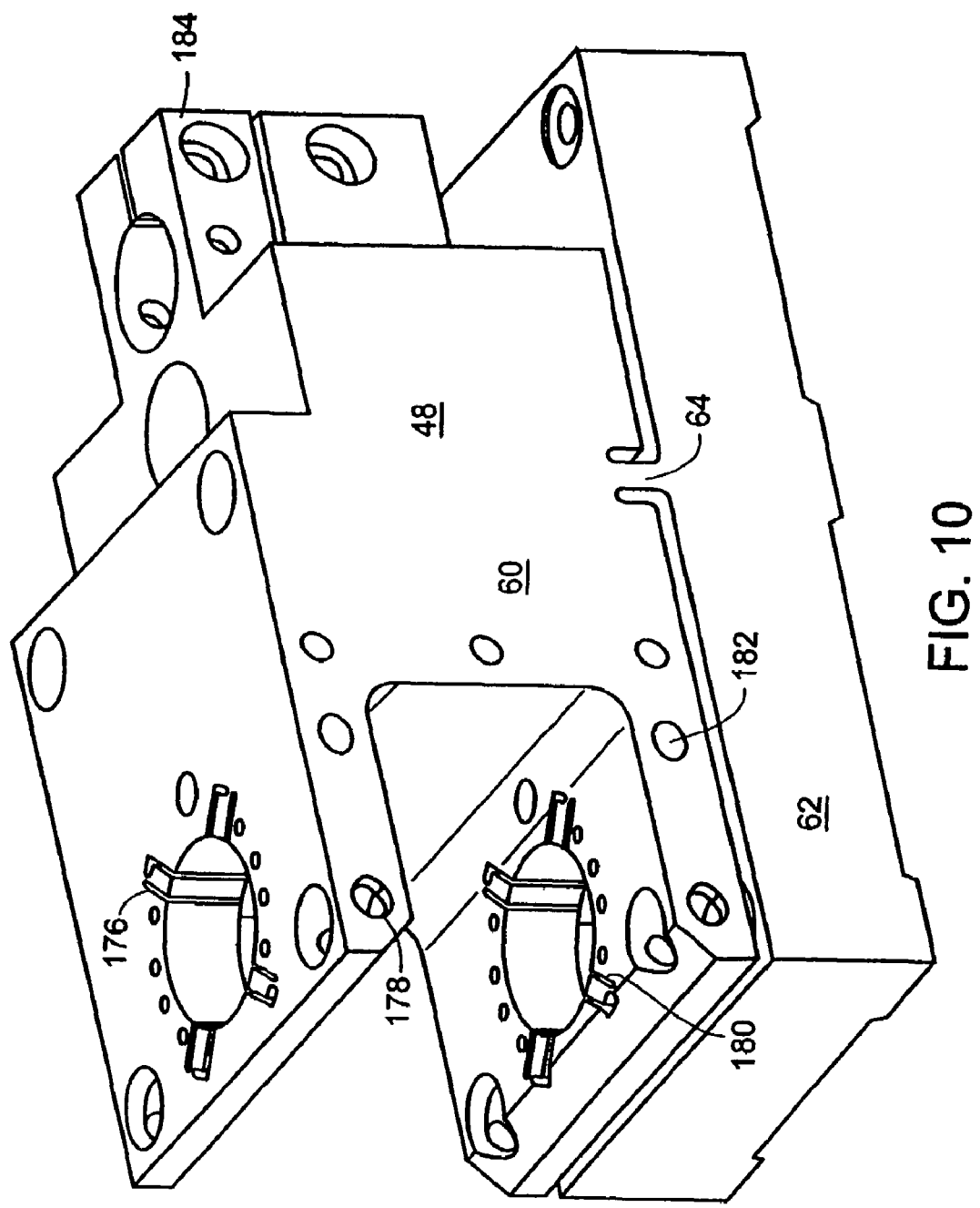
FIG. 10 is an isometric projection of the swing arm base of FIG. 1.

The swing arm base 48 is shown in FIG. 10 in accordance with a preferred embodiment of the present invention. The outer ends of the pair of the upper flexure blades 106 are fixed to the swing arm base 48 by bonding the flexure blades 106 in a plurality of base upper slots 176, and can be further secured by tightening a plurality of base upper slot screws 178. The outer ends of the pair of the lower flexure blades 108 are fixed to the swing arm base 48 by bonding the flexure blades in a plurality of base lower slots 180, and can be further secured by tightening the base lower slot screws 182. Those skilled in the art will recognize that by properly tightening the screws 178 and 182 the bonded joint can be preloaded in compression to the extent necessary to avoid stress reversal in the bonded joint during use of the invention. It is well known that stress reversal, tension/compression cycles, reduces the fatigue life of a mechanical component.

The upper and lower pairs of flexure blades 106 and 108 as seen in FIG. 9, are preloaded into tension during assembly of the flexure blade pairs with the swing arm 102 and the swing arm base 48. Those skilled in the art will recognize that the performance of the flexure blades is improved by having a certain amount of preload tension in the blades during use. The swing arm 102 and the swing arm base 48 are made of materials that have a similar coefficient of thermal expansion (CTE-1). The upper and lower pairs of flexure blades 106 and 108 are made of a material that has a higher coefficient of thermal expansion (CTE-2). In an embodiment, the swing arm 102 and swing arm base 48 are made of steel, and beryllium-copper is used for the pairs of flexure blades 106 and 108, resulting in a difference in coefficient of thermal expansion of approximately 3 parts per million per degree Fahrenheit. Initial assembly of the upper and lower pairs of flexure blades 106 and 108 with the swing arm 102 and the swing arm base 48 is performed at the ambient temperature that the fast tool servo will be used at, and is nominally room temperature. The upper and lower pairs of flexure blades 106 and 108 are bonded to the swing arm 102 and swing arm base 48 at a temperature above the ambient use temperature. The choice of temperature during the bonding process depends on the materials chosen for the swing arm 102, base 48, and the pairs of flexure blades 106 and 108, and the desired level of tension preload in the flexure blades. These parameters can be chosen to allow a bonding temperature in the range of the ambient temperature that the fast tool servo will be used to many hundreds of degrees Fahrenheit, thus accommodating bonding methods ranging from elevated temperature-cure adhesives to soldering and brazing. Because CTE-2 is greater than CTE-1, a tensile force is developed in the upper and lower pairs of flexure blades 106 and 108 when the temperature of the bonded assembly is returned to the ambient use temperature.

Still referring to FIG. 10, the flexure hinge 64 is shown between the upper portion 60 of the base 48 and the lower portion 62 of the base 48. As indicated with respect to FIG. 1, the differential screw assembly 66 has a tip 214, as shown in FIG. 1, that is carried by a block assembly 184 in the upper portion 60 and engages the lower portion 62 of the base 48. The rotation of the screw 66 is used in a method of adjusting the position of the cutting edge relative to the workpiece. Further, both the plurality of base upper slots 176 and the plurality of base lower slots 180 are located on the upper portion 60 of the base 48.

Figure 11:
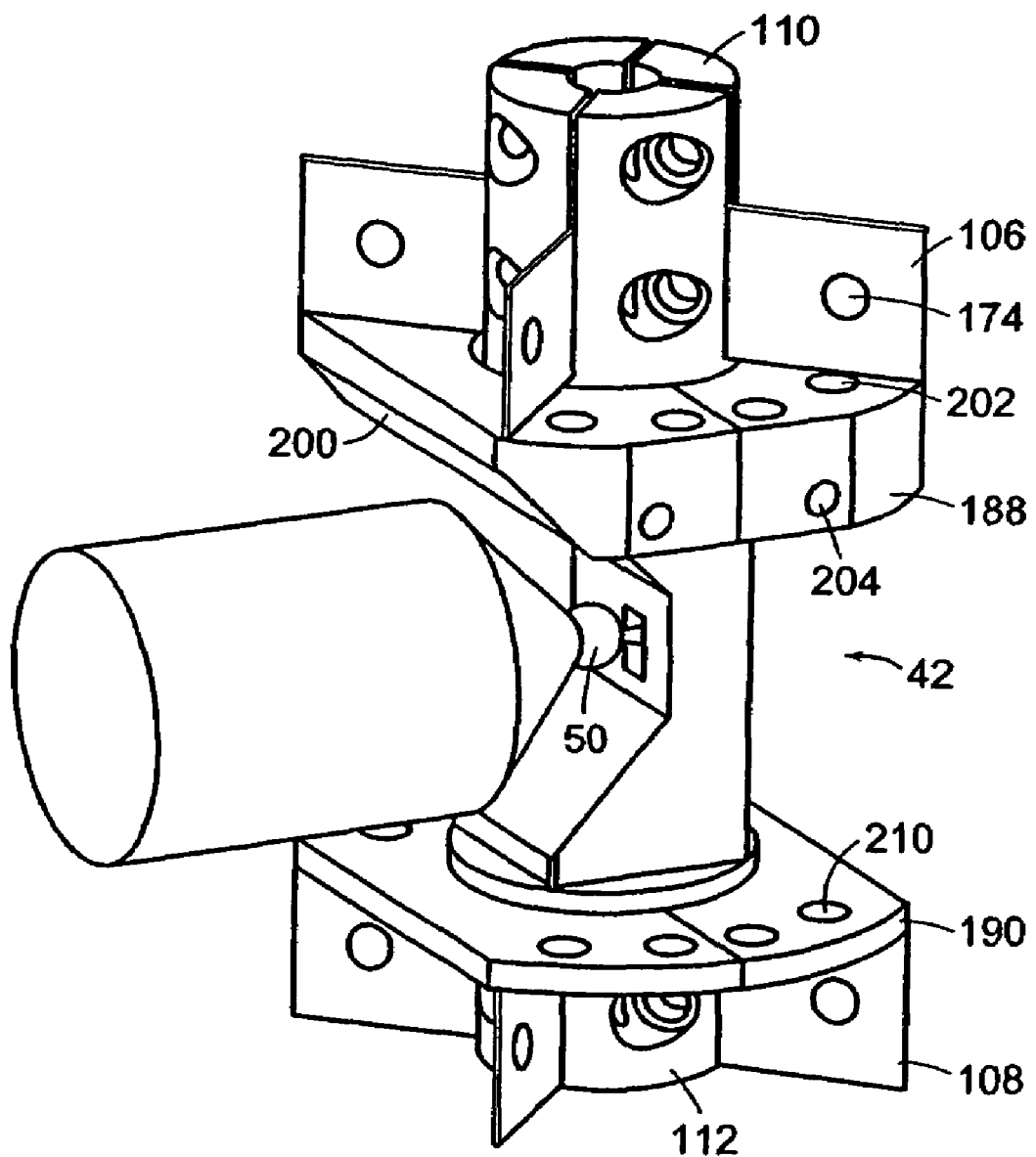
FIG. 11 is an isometric projection of the swing arm assembly of FIG. 4 with two pairs of flexures of FIG. 8, a workpiece, and chip shields in accordance with a preferred embodiment of the present invention.
Figure 12:
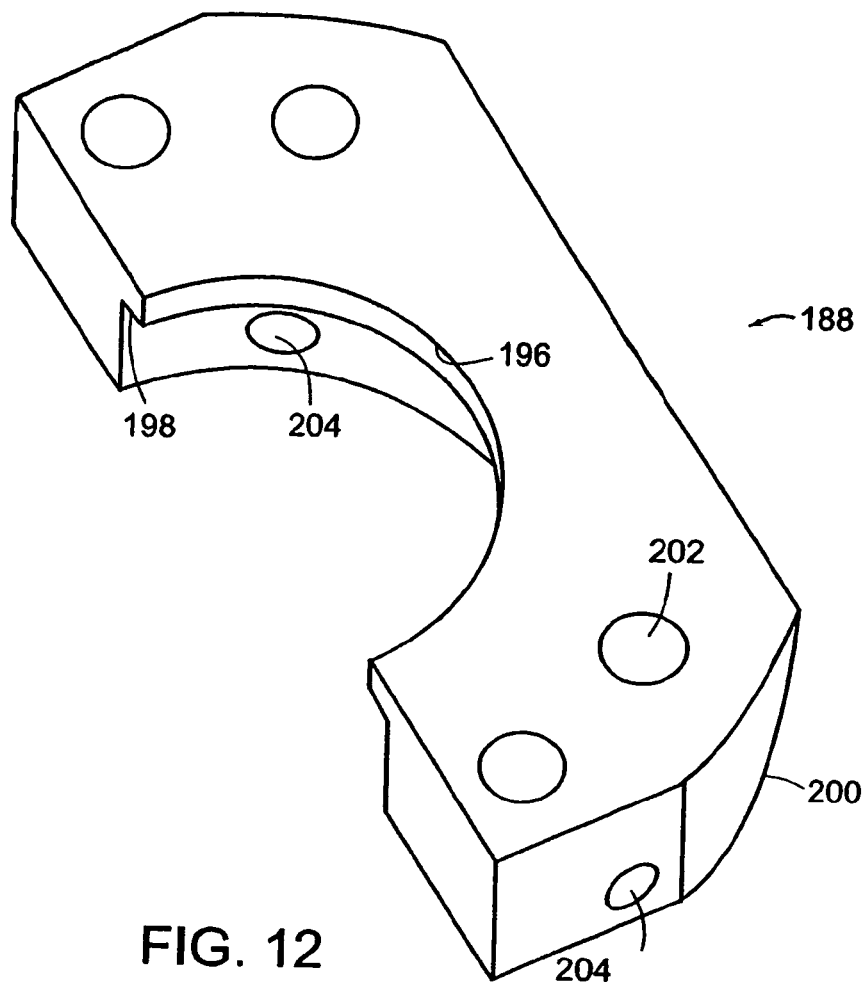
FIG. 12 is a perspective view of the upper chip shield of FIG. 11.
Figure 13:
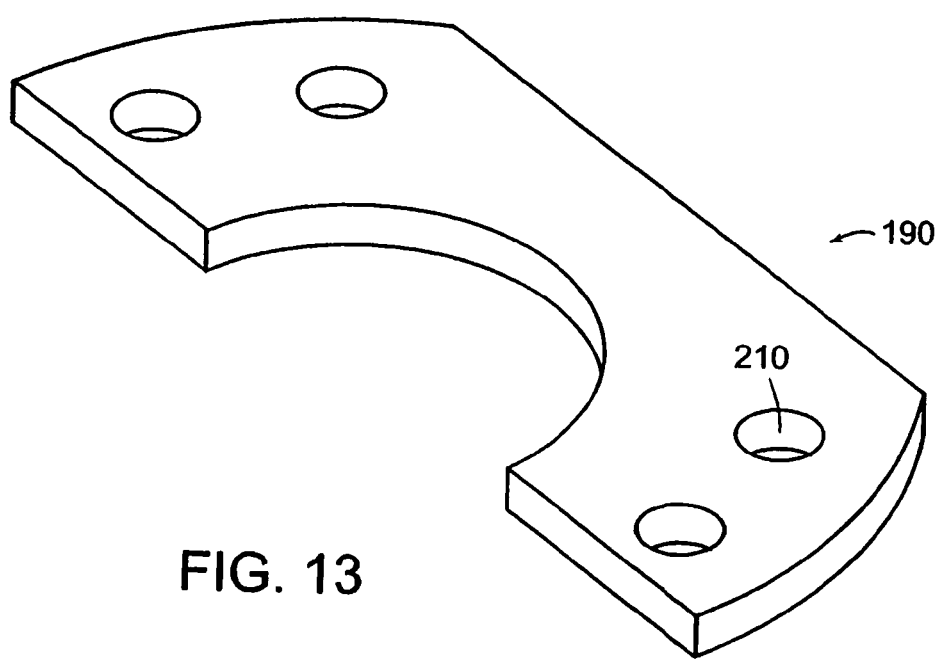
FIG. 13 is a perspective view of the lower chip shield of FIG. 11.

FIG. 11 shows the swing arm assembly 42 with the workpiece 50. The swing arm assembly 42 has an upper chip shield 188 and a lower chip shield 190 that protects the flexure blades 106 and 108 set in the upper hub 110 and lower hub 112 of the swing arm assembly 42 when the swing arm assembly 42 is secured to the base 48 as shown in FIG. 1. The upper chip shield 188 also shown in FIG. 12, is mounted below the upper flexure blades 106. The lower chip shield 190 also shown in FIG. 13, is mounted above the lower flexure blades 108.

The swing arm 102 has an upper skirt 192, as best shown in FIG. 9, and a lower skirt 194 to prevent debris generated during use from entering and accumulating between the swing arm 102 and the base 48 in the areas near the upper and lower pairs of flexure blades 106 and 108. The upper chip shield 188 mounts to the swing arm base 48 and engages the upper skirt 192 to form a simple labyrinth seal above the upper skirt 192. The lower chip shield 190 mounts to the swing arm base 48 and engages the lower skirt 194 to form a simple labyrinth seal below the lower skirt 194.

The upper chip shield 188 is formed of two pieces. One of the pieces is shown in FIG. 12 and has a lip 196 that forms an annular groove 198 that receives the upper skirt 192 of the swing arm 102. In addition, the upper chip shield 188 has a tapered edge 200 on the front portion to increase the clearance for the workpiece 50 and the workpiece holder 51. The upper chip shield 188 has a plurality of vertical holes 202 for receiving fasteners to secure the upper chip shield 188 to the base 48. In addition, the upper chip shield 188 has a plurality of horizontal holes 204 through which the hard stops 212 as seen in FIG. 14 extend.

The lower chip shield 190 is formed of two identical pieces. One of the pieces is shown in FIG. 13. The lower chip shield 190 has a plurality of holes 210 for receiving fasteners to secure the lower chip shield 190 to the base 48.

Figure 14:
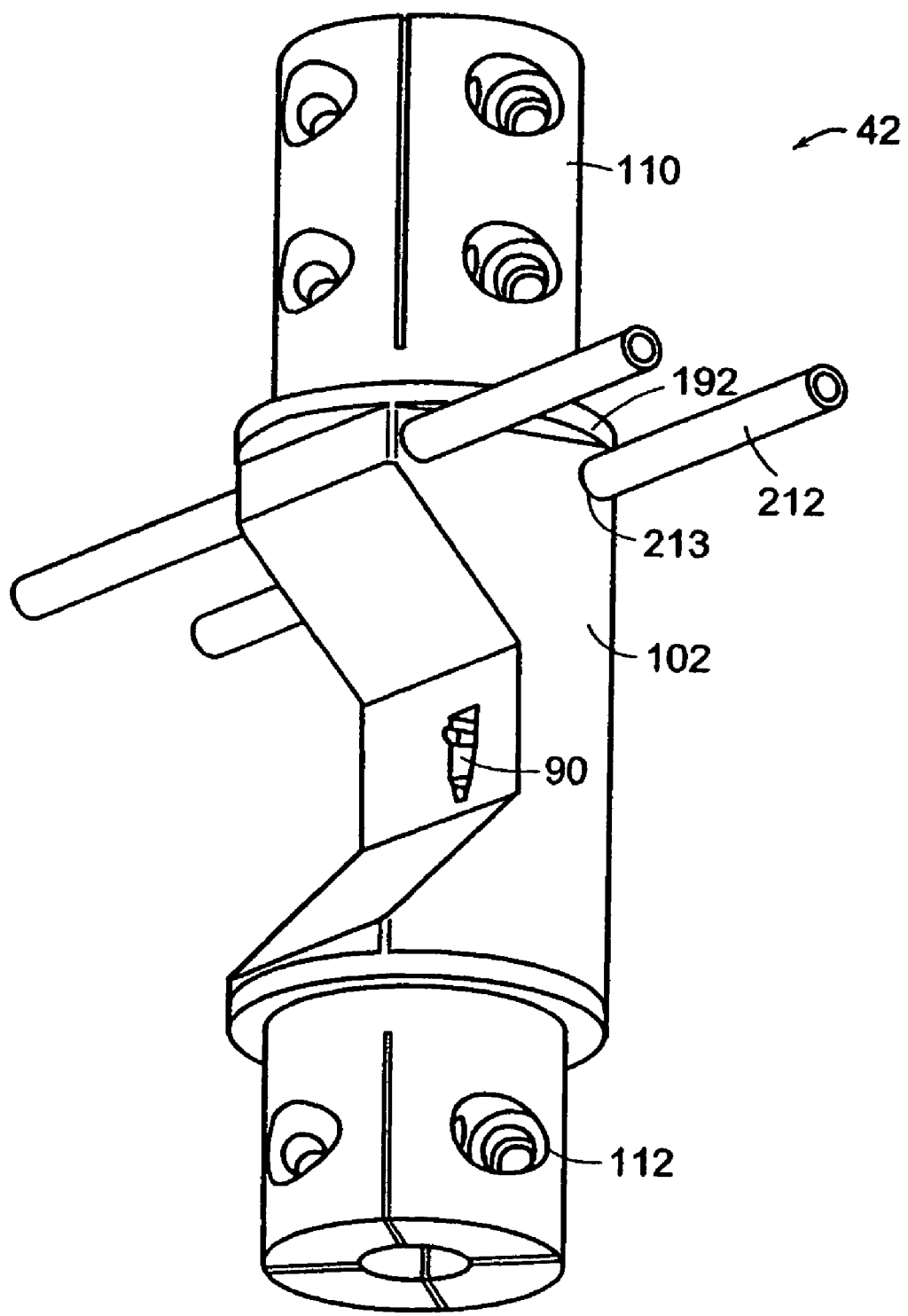
FIG. 14 is a perspective view of the swing arm assembly of FIG. 4 with hard stops.

FIG. 14 shows the swing arm assembly 42 with four hard stops 212. The hard stops 212 are located near the swing arm 102 below the upper skirt 192 and extend outward from the swing arm 102 substantially perpendicular to the swing arm right/left plane of symmetry 136. The upper chip shield 188, as seen in FIG. 12, has a thickened cross-section to accept the hard-stops 212. A small gap 213 between an end of each hard stop 212 and the swing arm 102 allows normal rotation of the swing arm. The hard stops 212 act in pairs to limit the rotation angle of the swing arm 102 to prevent damage to the upper and lower pairs of flexure blades 106 and 108. Excessive rotation of the swing arm 102 causes closure of a pair of gaps 213 that limits rotation of the swing arm.

Figure 15:
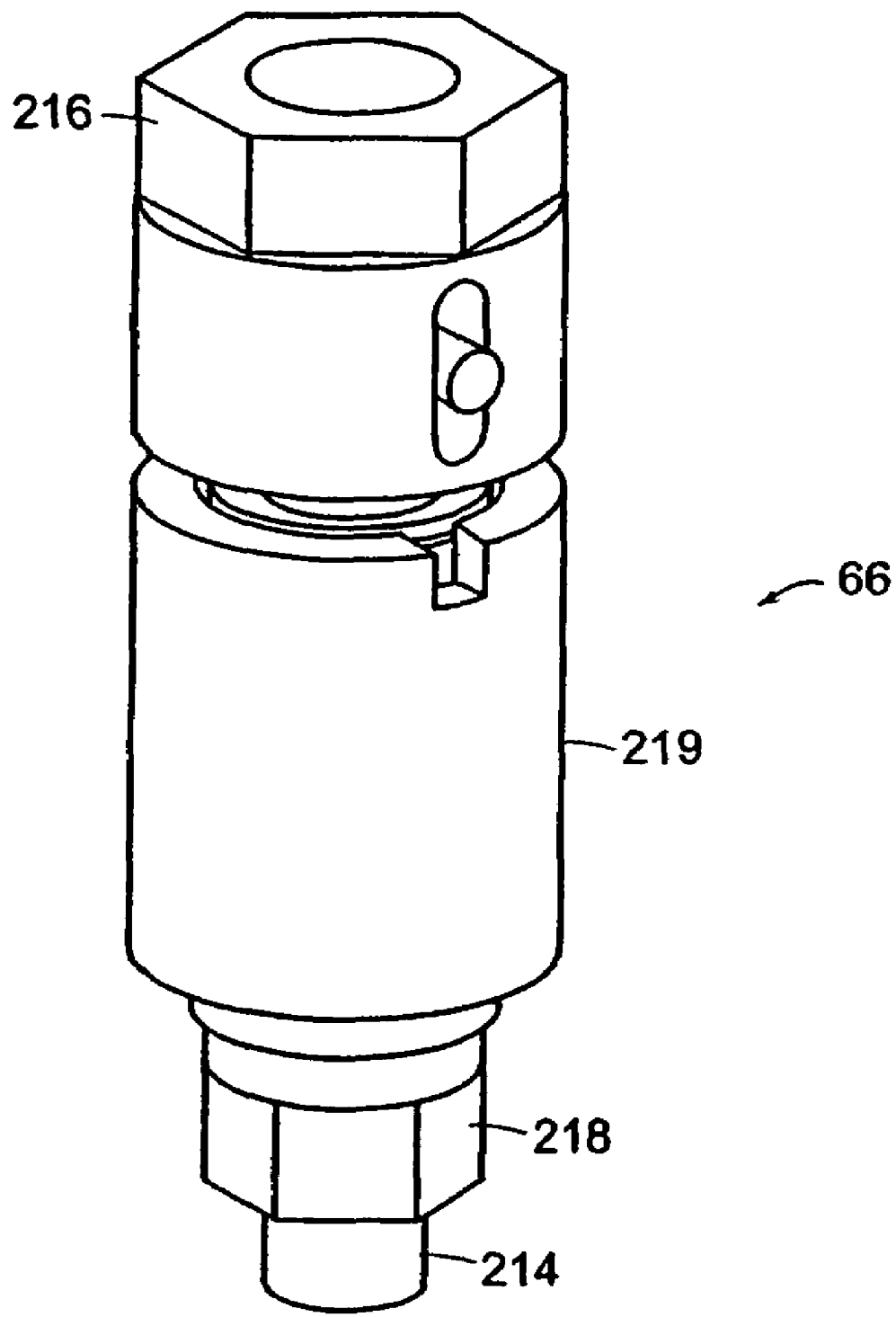
FIG. 15 is a perspective view of a differential screw assembly in accordance with a preferred embodiment of the present invention.

FIG. 15 is a perspective view of the differential screw assembly 66. The differential screw assembly 66 has a tip 214, a coarse adjustment screw 216, a fine adjustment screw 218, and a housing 219. The interface between the tip 214 and the fine adjustment screw 218 consists of a set of machined threads having a thread pitch P-1. The interface between the fine adjustment screw 218 and the housing 219 consists of a set of machined threads having a thread pitch P-2. In operation, the differential screw assembly 66 is mounted in the upper portion 60 of the swing arm base 48 with the tip 214 in contact with the lower portion 62 of the swing arm base 48.

Figure 16A:
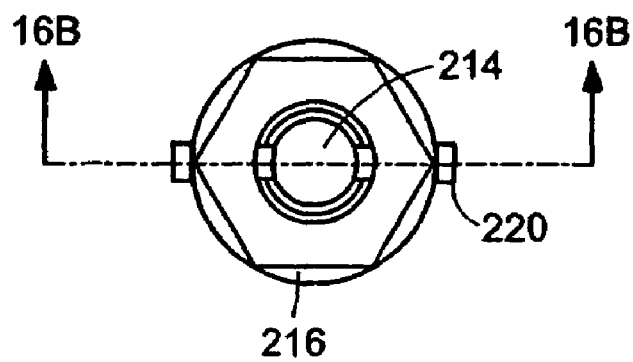
FIG. 16A is a top view of the differential screw assembly of FIG. 15.
Figure 16B:
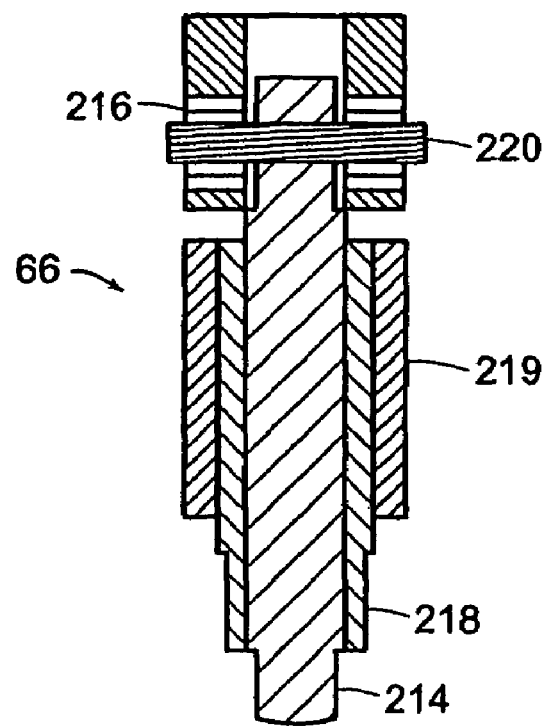
FIG. 16B is a cross-sectional view of the differential screw assembly taken along the line 16B-16B of FIG. 16A.

FIG. 16A is a top view of the differential screw assembly 66. FIG. 16B is a side cross-sectional view of the differential screw assembly 66 taken along the line 16B-16B of FIG. 16A. The extension of the tip 214 of the differential screw 66 is adjusted using the coarse adjustment screw 216 and the fine adjustment screw 218. Turning the coarse adjustment screw 216 transmits rotation through pin 220 to the tip 214 while the fine adjustment screw 218 is stationary. Locking the coarse adjustment screw 216 and rotating the fine adjustment screw 218 causes motion in one direction between the coarse adjustment screw 216 and fine adjustment screw 218, and motion in the opposite direction between the fine adjustment screw 218 and the housing 219, while the pin 220 prevents rotation of the tip 214. The motion of the tip 214 relative to the housing 219 is related to the difference in the thread pitches P-1 and P-2.

Figure 17:
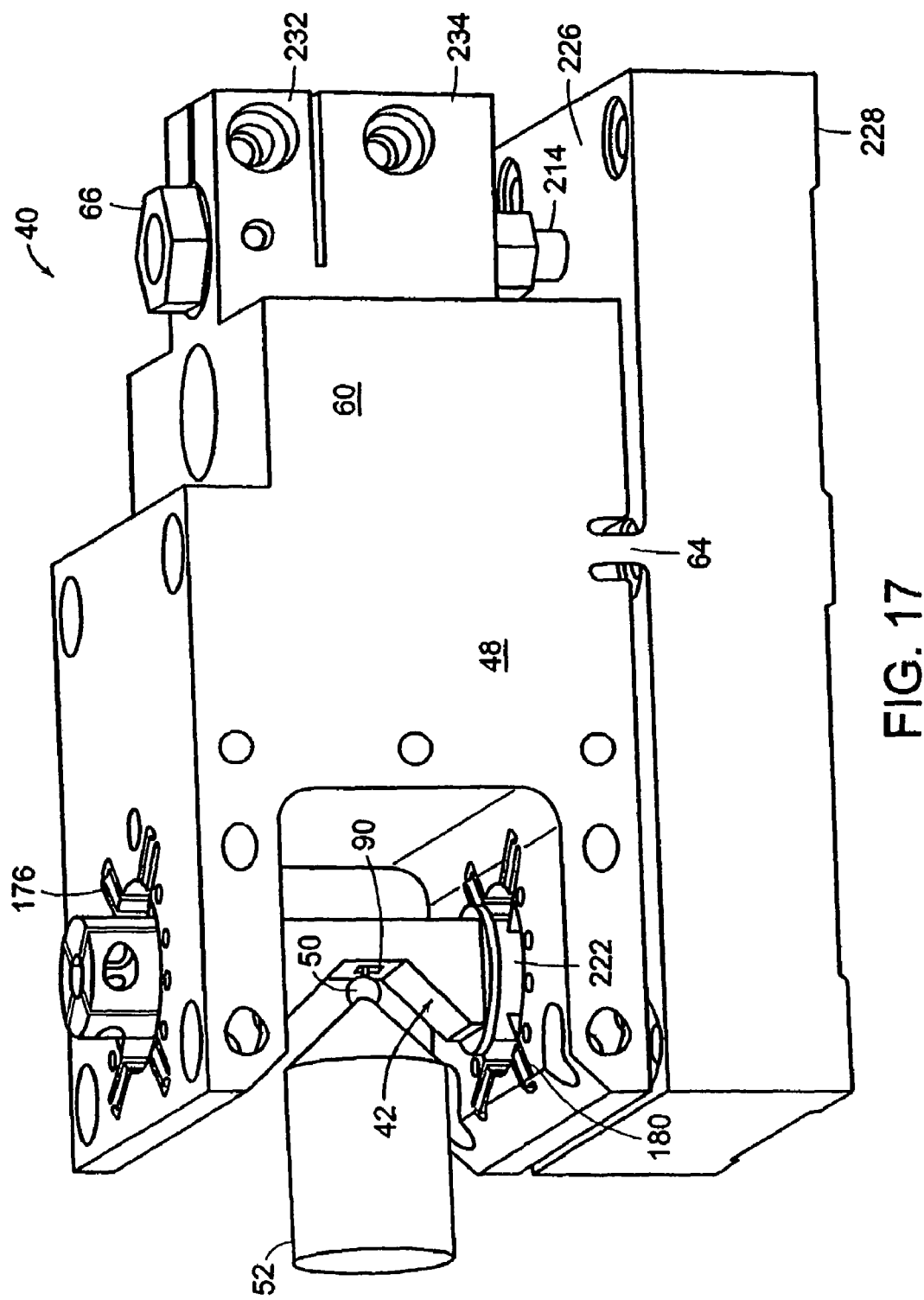
FIG. 17 is a perspective view of the rotary fast tool servo assembly of FIG. 1 without the actuator.

FIG. 17 shows the rotary fast tool servo assembly 40 without the actuator 68. The workpiece 50 is also shown. The swing arm assembly 42 is mounted in the upper portion 60 of the base 48. The base 48 has a pair of essentially concentric circular openings 222 to receive the swing arm assembly 42. Each of the two openings 222 has the plurality of slots 176 and 180 to receive the flexure blades extending radially from the swing arm 42.

Figure 18:
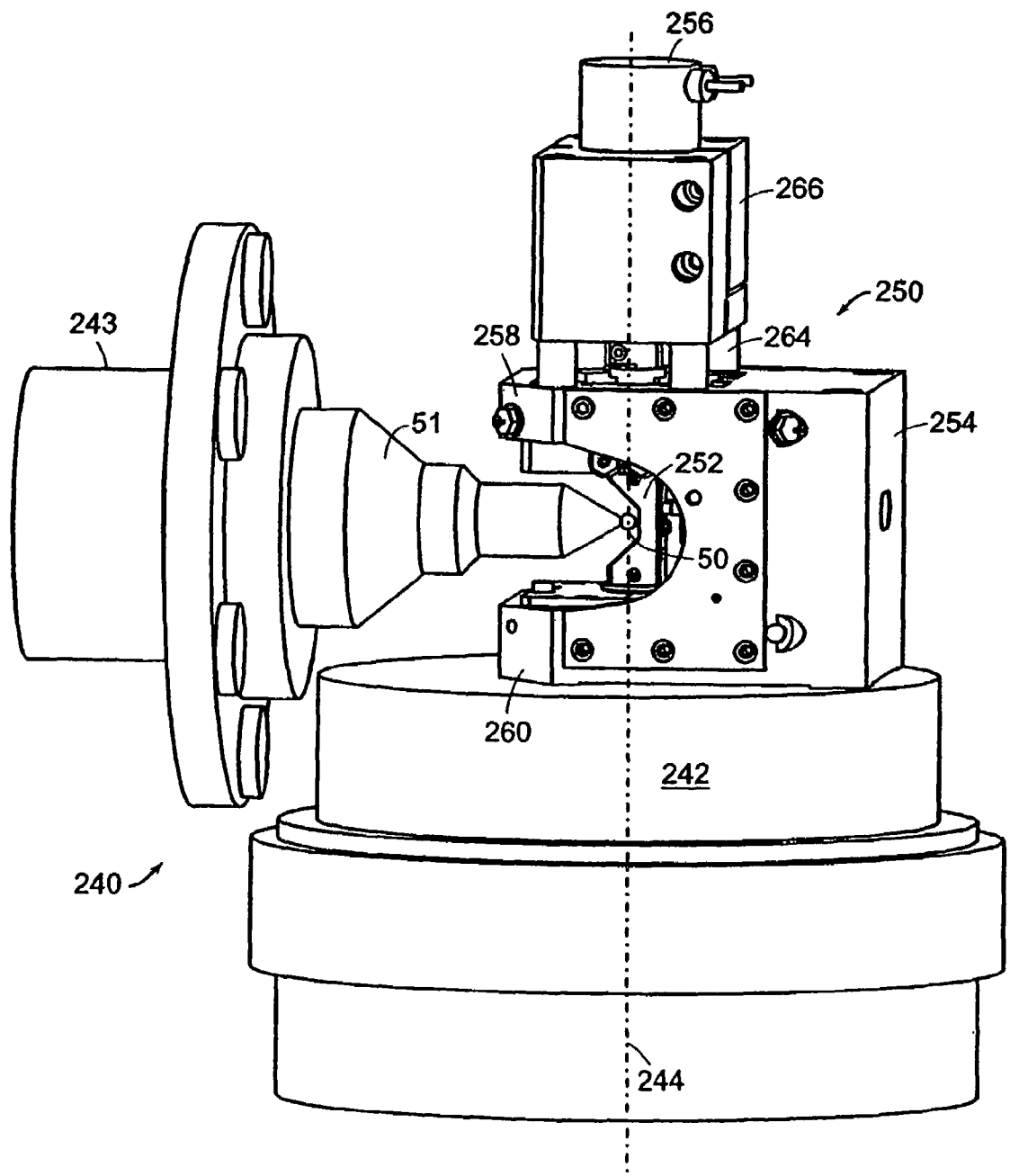
FIG. 18 is a side view of a workpiece on a spindle of a lathe with a rotary fast tool servo of an alternative embodiment on a rotary base according to the invention.

The differential screw assembly 66 is mounted in the upper portion 60 of the base 48. The upper portion 60 of the base 48 is joined to lower portion 62 of the base 48 by the flexure hinge 64. The flexure hinge 64 extends across the swing arm base from the left side of the base 48 to the right such that flexing of the flexure hinge 64 causes up/down repositioning of the cutting tool 90. By rotating the upper portion 60 of the base 48 about the flexure hinge 64, the cutting tool is adjusted vertically relative to the workpiece using the differential screw assembly 66. The lower portion 62 provides a surface 226 for the tip 214 of the differential screw assembly 66 to contact. The lower portion 62 has a mounting surface 228 for attaching the rotary fast tool servo assembly 40 to a machine tool 240, as seen in FIG. 18.

A preload spring maintains contact between the tip 214 of the differential screw assembly 66 and the surface 226 of the lower base 62. Adjustments of the coarse adjustment screw and fine adjustment screw cause the tip 214 to bear against the surface 226 of the lower base 62 causing a rotation of the upper portion 60 of the swing arm base 48 around an axis that is parallel to the long axis of the flexure hinge 64 and substantially at the center of the flexure hinge. This rotation of the upper portion 60 of the swing arm base 48 causes the cutting tool edge 96 to change elevation relative to the workpiece 50.

In a preferred embodiment of the present invention, a one degree rotation of the coarse adjustment screw 216 causes a 5 μm change in elevation of the cutting tool edge 96. An upper clamping feature 232 in the swing arm base 48 allows for enabling and disabling of the coarse adjustment screw 216. In a preferred embodiment, a one degree rotation of the fine adjustment screw 218 causes a 0.021 μm (21 nm) change in elevation of the cutting tool edge 96. A lower clamping feature 234 in the swing arm base 48 is used to hold the differential screw assembly 66 in the upper portion 60 of the swing arm base.

In the present embodiment of the rotary fast tool servo, the differential screw assembly 66 provides a ±1.27 mm of change in elevation of the cutting tool edge 96. Alternative embodiments of differential screw assemblies are available that provide other greater or lesser changes in elevation of the cutting tool edge 96.

In a preferred embodiment of the rotary fast tool servo 40, the swing arm 102 is configured to couple an actuator 68 which is mounted to the upper portion 60 of the swing arm base 48 with a thermally insulating spacer. The thermally insulating spacer, as shown in the next embodiments restricts the flow of heat from the actuator 68 into the swing arm base 48. An enclosure, as shown in the next embodiment, around the actuator 68 allows for the controlled removal of the heat generated by the actuator during use, helping to prevent the heat from entering the rest of the machine by thermal conduction, convection, and radiation.

Different methods for aligning the axis of rotation of the actuator 68 to the swing arm axis of rotation 46 are possible. One method includes precision machining of the mounting surfaces on the interface hardware between the actuator 68 and the upper portion 60 of the swing arm base 48, and precise alignment of the interface hardware to the swing arm axis of rotation 46 during assembly. Another method includes using a flexible coupling to accommodate misalignment between the actuator 68 and the swing arm 48. A flexible coupling is a well-known device used in the art for transmitting torque between two bodies while accommodating a misalignment between those bodies due to relaxed manufacturing and assembly tolerances.

Damping mechanisms, such as discussed with respect to the next embodiments, can be added between the swing arm 104 and the swing arm base 48 to improve the dynamic performance of the fast tool servo. The areas near the upper skirt 192, lower skirt 194, upper hub 110, and lower 112 are possible locations for installing damping mechanisms.

Displacement and rotation sensors, such as discussed with respect to the next embodiments, can be added between the swing arm 102 and the swing arm base 48 to provide real-time measurement data on the location and angular orientation of the swing arm relative to the swing arm base during operation of the fast tool servo. The areas near the upper skirt 192, lower skirt 194, and between the back surface 158 of the swing arm 102 and the swing arm base 48 are possible locations for installing displacement and rotation sensors. Additionally, the actuator 256 can be equipped with rotation sensors to provide real-time measurement data on the location and angular orientation of the swing arm 102 relative to the swing arm base 48.

Referring to FIG. 18, an alternative fast tool servo system 250 is shown in accordance with a preferred embodiment of the present invention. The fast tool servo 250 has a swing arm assembly 252, a base 254, and an actuator 256. The base 254 of the fast tool servo 250 is located on a rotating table 242 of the machine tool 240, such as an auxiliary spindle on a two-axis precision lathe. The rotating table 242 rotates about an axis of rotation 244 which is not coincident with the axis of rotation of the swing arm. Depending on the radius of curvature of the workpiece, the axis of rotation of the rotating table can be located inside or outside of the workpiece. For example, the workpiece shown in FIG. 18 can have the rotating table axis pass through the center of the small, spherical workpiece. To generate a surface on the workpiece that has a radius of curvature larger than the diameter of that workpiece, the axis of rotation can be located outside the workpiece. The workpiece 50 is retained by a workpiece holder 51 attached to a spindle 243 on the machine tool 240.

The base 254 has an upper portion 258 and a lower portion 260 which overlie and underlie, respectively, the predominant portion of the swing arm assembly 252. The actuator 256 is coupled to the swing arm assembly 252. The actuator 256 is mounted to the upper portion 258 of the base 254 with a plurality of thermally insulated spacers 264. The thermally insulating spacers 264 restrict the flow of heat from the actuator 256 into the base 254. In addition, the fast tool servo 250 has an enclosure 266 around the actuator 256 that allows for controlled removal of heat generated by the actuator 256 during use, helping to minimize and preferably prevent the heat from entering the rest of the fast tool servo system by thermal conduction, convection, and radiation.

Figure 19:
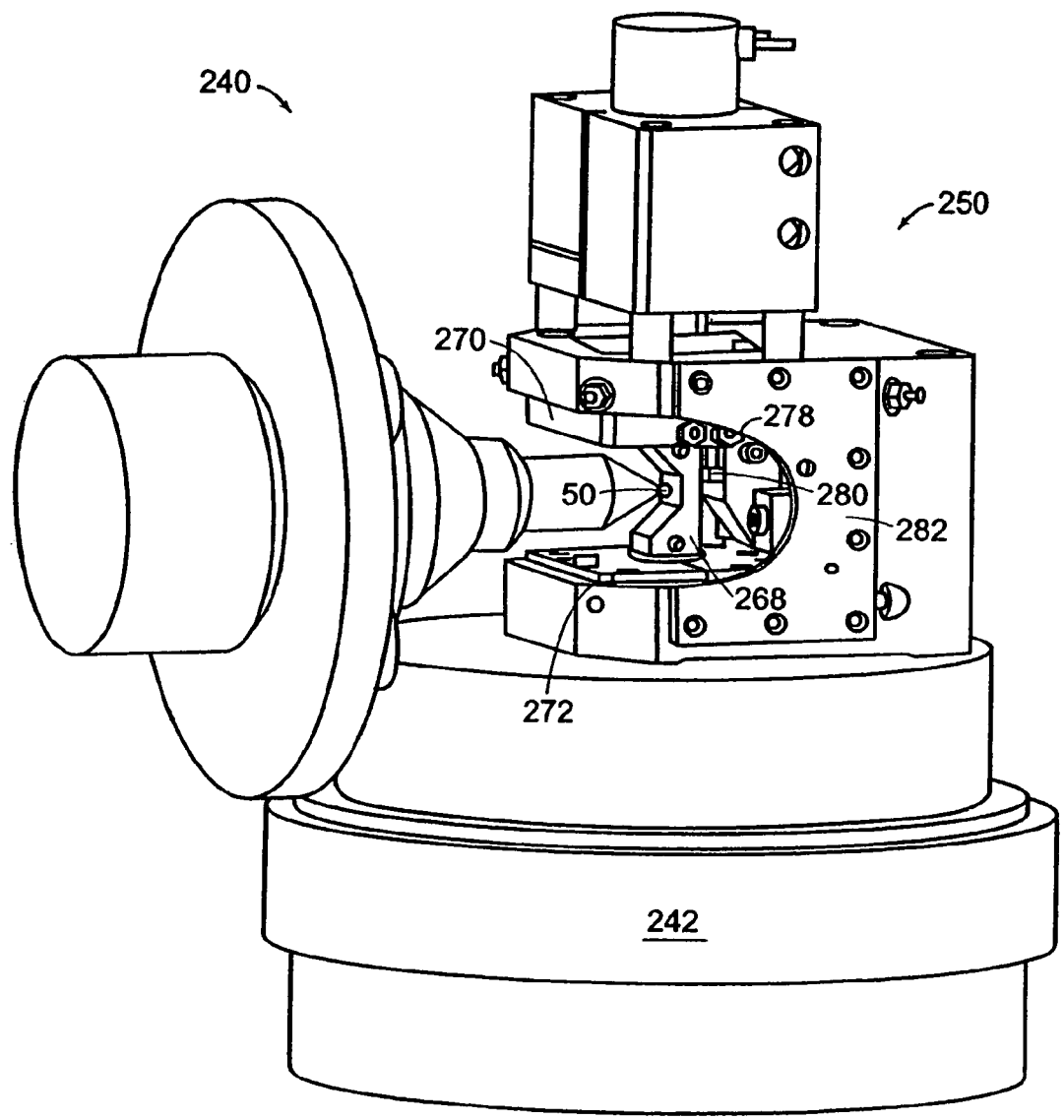
FIG. 19 is a view of a workpiece on a spindle with a rotary fast tool servo on a rotary base in accordance with a preferred embodiment of the present invention.
Figure 20:
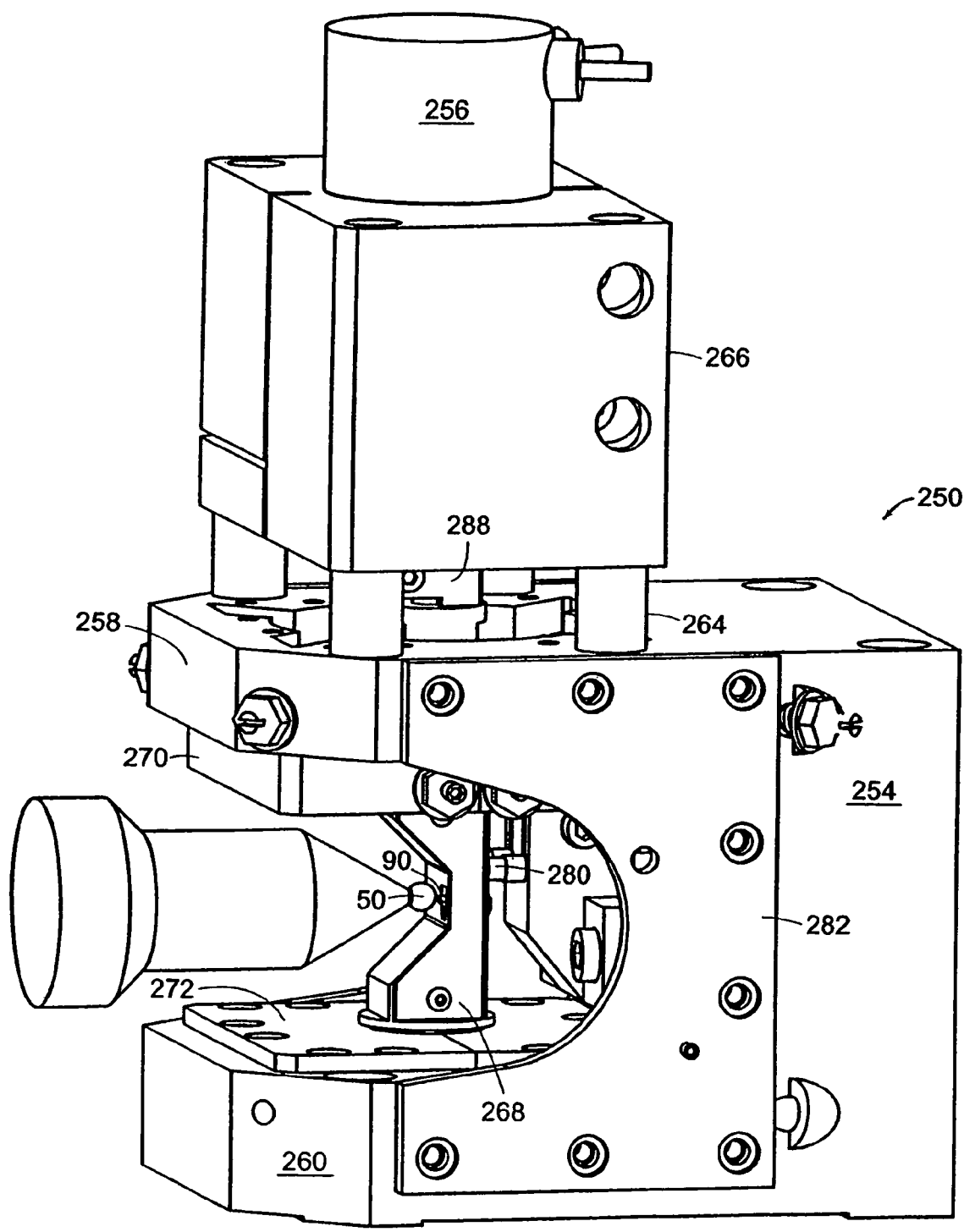
FIG. 20 is a skewed view of a rotary fast tool servo with a workpiece on a workpiece holder in accordance with a preferred embodiment of the present invention.

Another view of the fast tool servo 250 on the rotating table 242 of the machine tool 240 is shown in FIG. 19 in accordance with a preferred embodiment of the present invention. As best seen in FIG. 20, the cutting tool 90 is shown engaging the workpiece 50. As in the previous environment, the cutting tool 90 is carried in a slot 139 (best seen in FIG. 21) in a swing arm 268 of the swing arm assembly 252. In addition similar to the previous embodiment, the fast tool servo 250 has an upper chip shield 270 and a lower chip shield 272 that protect the flexure blades from being interfered with by chips or debris coming off of the workpiece 50 during the machining process.

The motion of the swing arm 268 of the swing arm assembly 252 is measured by a pair of sensors 280. The motion of the swing arm 268 is limited by a plurality of hard stops 278 as described hereinbefore. The sensors 280 are shown behind the swing arm 252, and can be better seen in FIG. 20.

Figure 22:
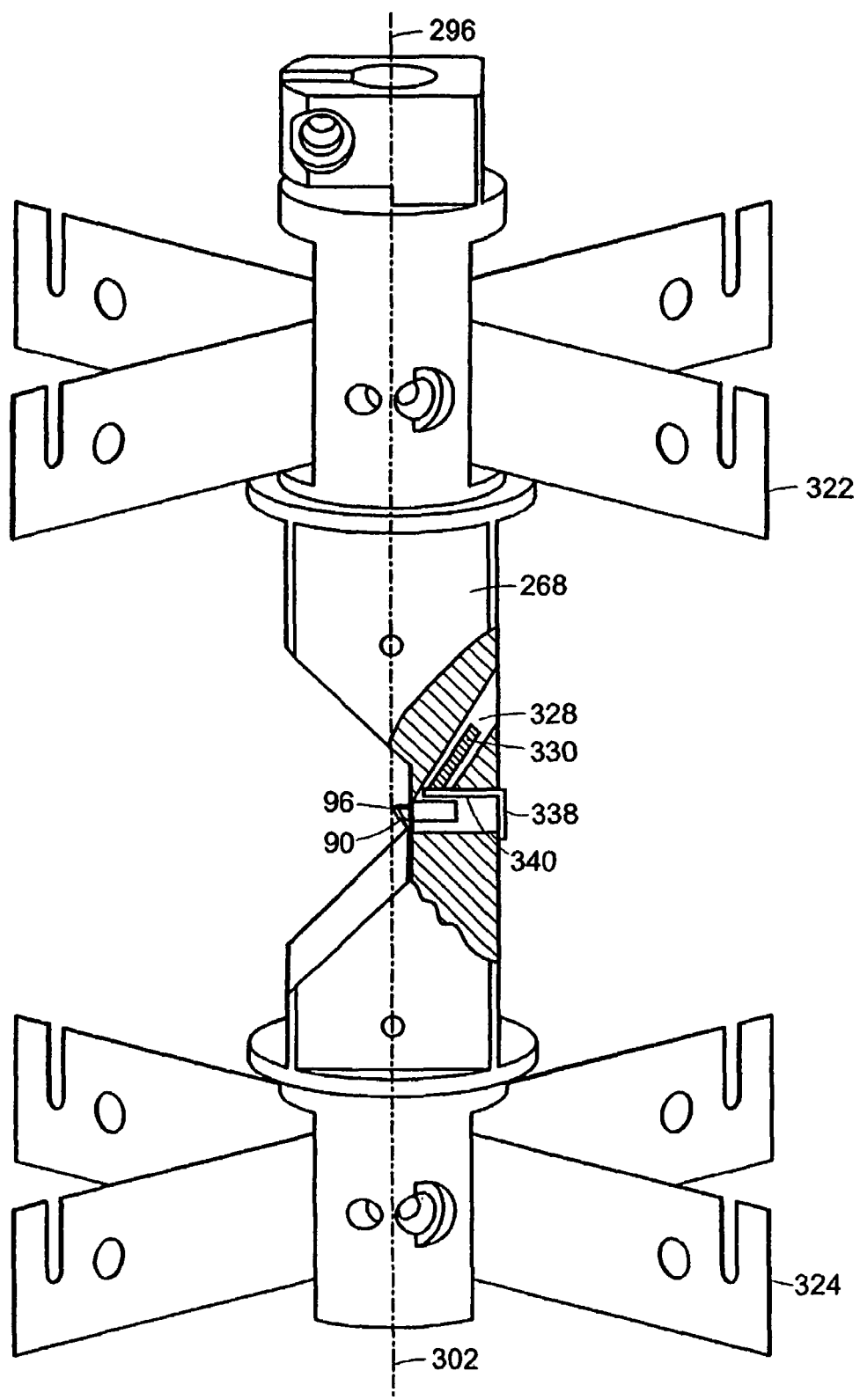
FIG. 22 is a sectional view of the swing arm with a cutting tool and retention mechanism in accordance with a preferred embodiment of the present invention.

FIG. 20 is a view of the fast tool servo 250 without showing the rotating table 242 of the machine 240 upon which it sits. The sensors 280 in this embodiment are a pair of eddy current sensors that measure rotation of the swing arm 268 around its centerline 296, and translation of the swing arm in a direction perpendicular to its front/back plane 302 as seen in FIG. 22. It is recognized that the sensors 280 that determine the rotation of the swing arm 268 can be other sensors such as, for example, but not limited to, capacitance gauges or other types of sensors capable of measuring small mechanical displacements that change at high frequency. In addition, the fast tool servo 250 has a pair of panels or side stiffeners 282 that extend from the upper base portion 258 to the lower portion 260 and provide for stiffening.

Figure 28:
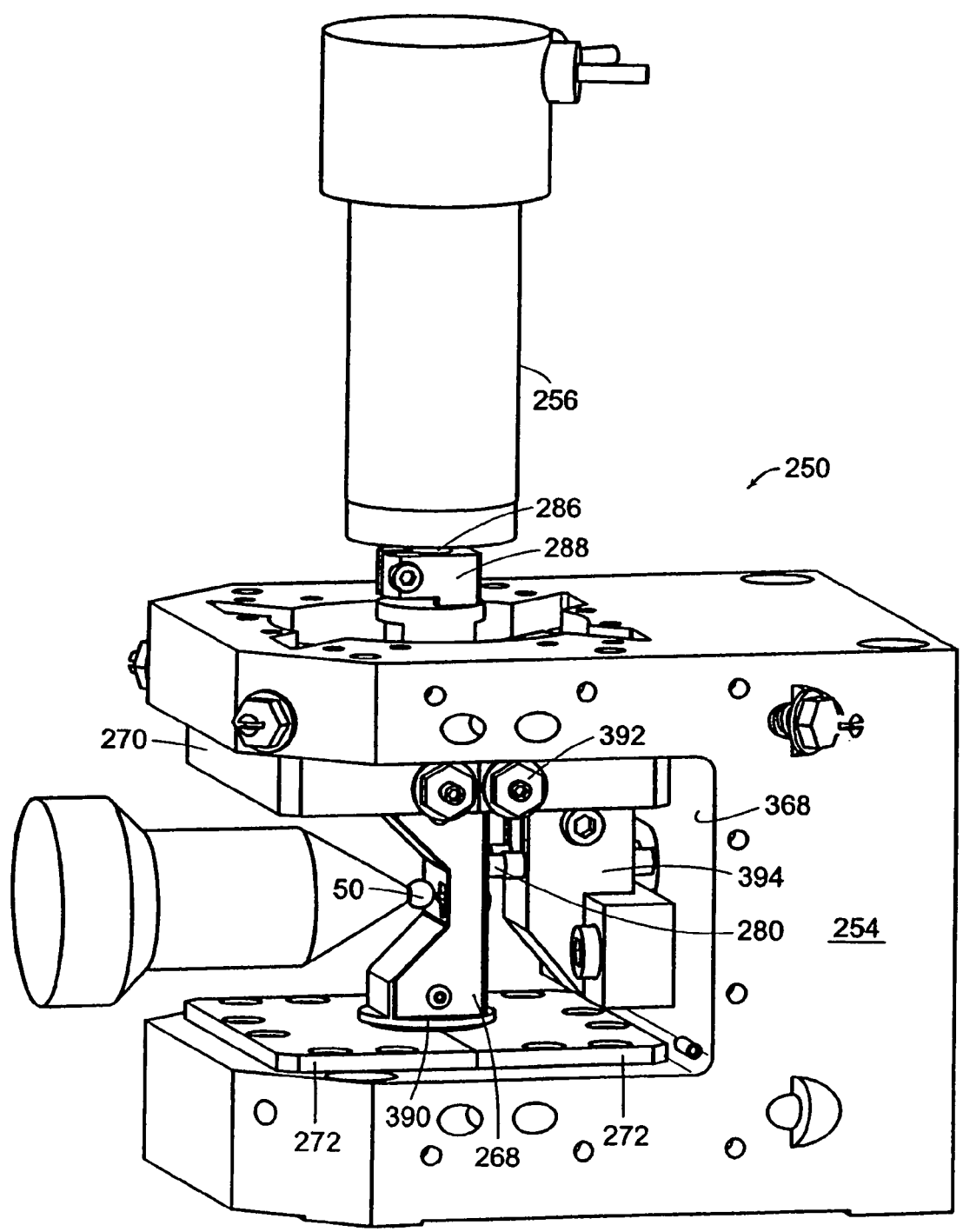
FIG. 28 is a side perspective view of the rotary fast tool servo system showing an actuator connected to the swing arm in accordance with a preferred embodiment of the present invention.

The actuator 256 is shown to be mounted to the upper portion 258 of the base 254. The thermally insulating spacers 264 support and thermally insulate the actuator 256 from the base 254 therein restricting the flow of heat from the actuator 256 into the base 254. In addition, the actuator 256 is surrounded by the enclosure 266 that allows for controlled removal of heat generated by the actuator 256 during use. The interface between the actuator 256 and the swing arm assembly 252 can be seen. The actuator 256 has an output shaft 286, as best seen in FIG. 28, which extends downwardly and is received by a clamp 288 on the swing arm assembly 252, as best seen in FIG. 21.

Figure 21:
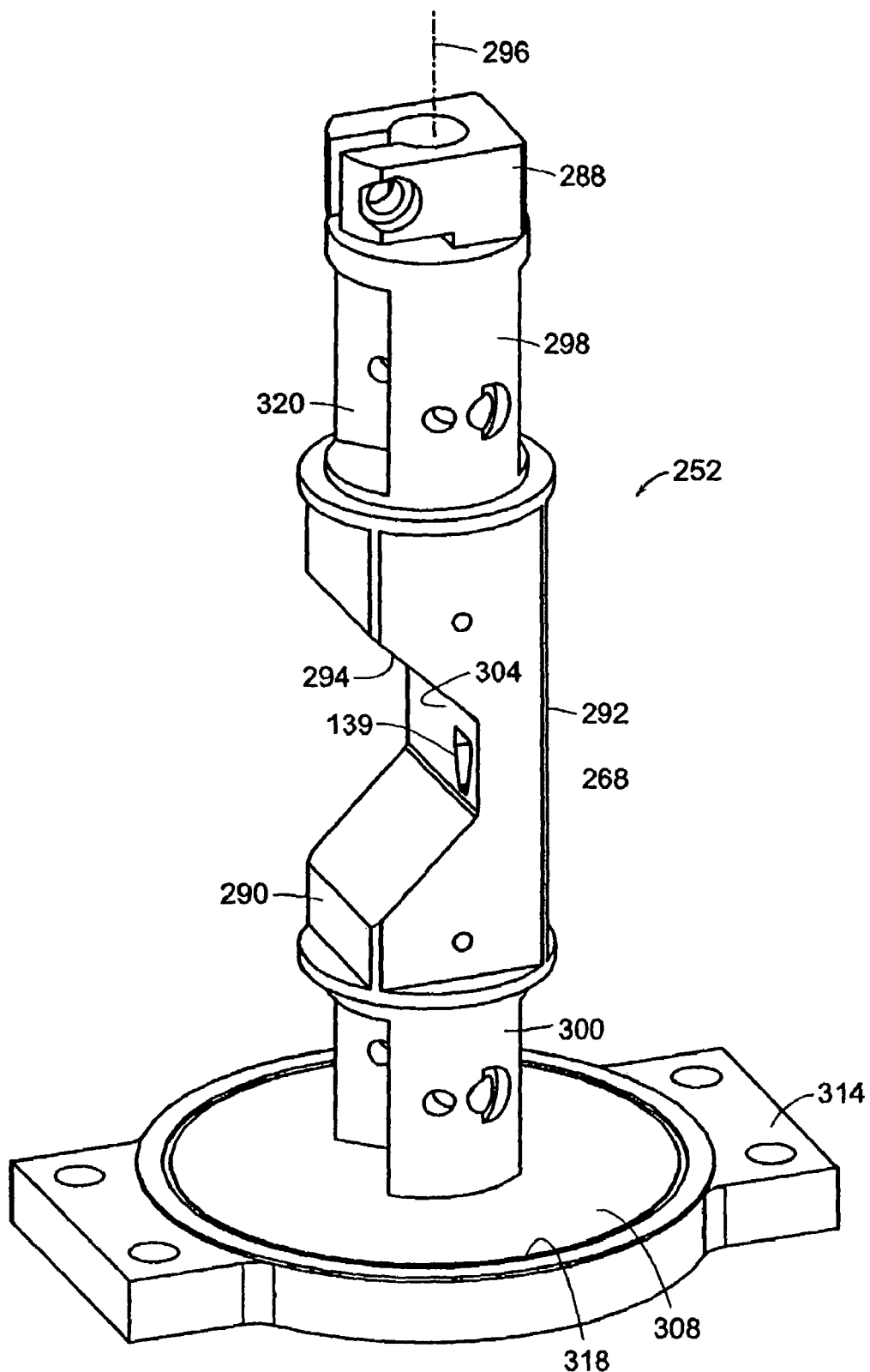
FIG. 21 is a perspective view of a swing arm with a damper plate in accordance with a preferred embodiment of the present invention.

Referring to FIG. 21, the swing arm assembly 252 has a swing arm 268 that has a front face 290, a rear face 292, and a clearance cut 294. The swing arm 268 has an axis of rotation 296 that nominally coincides with the long axis of the swing arm. The swing arm 268 has an upper hub 298 and a lower hub 300. The clearance cut 294 is located approximately midway between the upper hub 298 and the lower hub 300. The clearance cut 294 extends from the front face 290 of the swing arm 268 through the axis of rotation and slightly beyond. A front/back plane 302, as best seen in FIG. 22, extends through the axis of rotation 296 and is parallel to the front face 290. A back clearance surface 304 of the swing arm 268 is parallel to and spaced from the front/back plane 302. The clearance cut 294 allows the cutting tool edge 96 and a small portion of the cutting tool 90 to protrude from the back clearance surface 304 of the swing arm 268, as seen in FIG. 22, and allows the workpiece to extend into the swing arm 268 as much as possible.

As will be described in further detail hereinafter, the fast tool servo system 250 has several mechanisms for damping of motion. There is a desire to dampen the motion so that unintentional motion does not propagate. With respect to this, the fast tool servo system 250 has a damping plate 308 that is secured to the lower hub 300 of the swing arm 268. The damping plate 308 is interposed between the lower portion 260 of the base 254 and a bottom plate 314. The bottom plate 314 has a circular groove 318 that receives the damping plate 308.

A viscous fluid such as grease, or a viscoelastic material, is constrained between the damping plate 308 and the lower portion 260 of the base 254 and the bottom plate 314. Rotation of the swing arm 268 causes relative motion between the damping plate 308 and the lower portion 260 of the base 254 and the bottom plate 314, producing a shear force in the grease or viscoelastic material that dissipates energy associated with rotation of the swing arm 268.

In an alternate embodiment damping of unwanted motion between the swing arm 268 and the base 254 is accomplished by the relative motion of an electrically conducting plate carried by one through a magnetic field that is referenced to the other resulting in eddy current losses in the plate.

As in the previous embodiments, the swing arm 268 is secured to the base 254 by a plurality of flexure blades. The lower and upper hubs 300 and 298 each have a pair of sectors of a cylinder or pie slice shaped grooves 320 for receiving the flexure blades, as seen in FIGS. 21-24.

Figure 23:
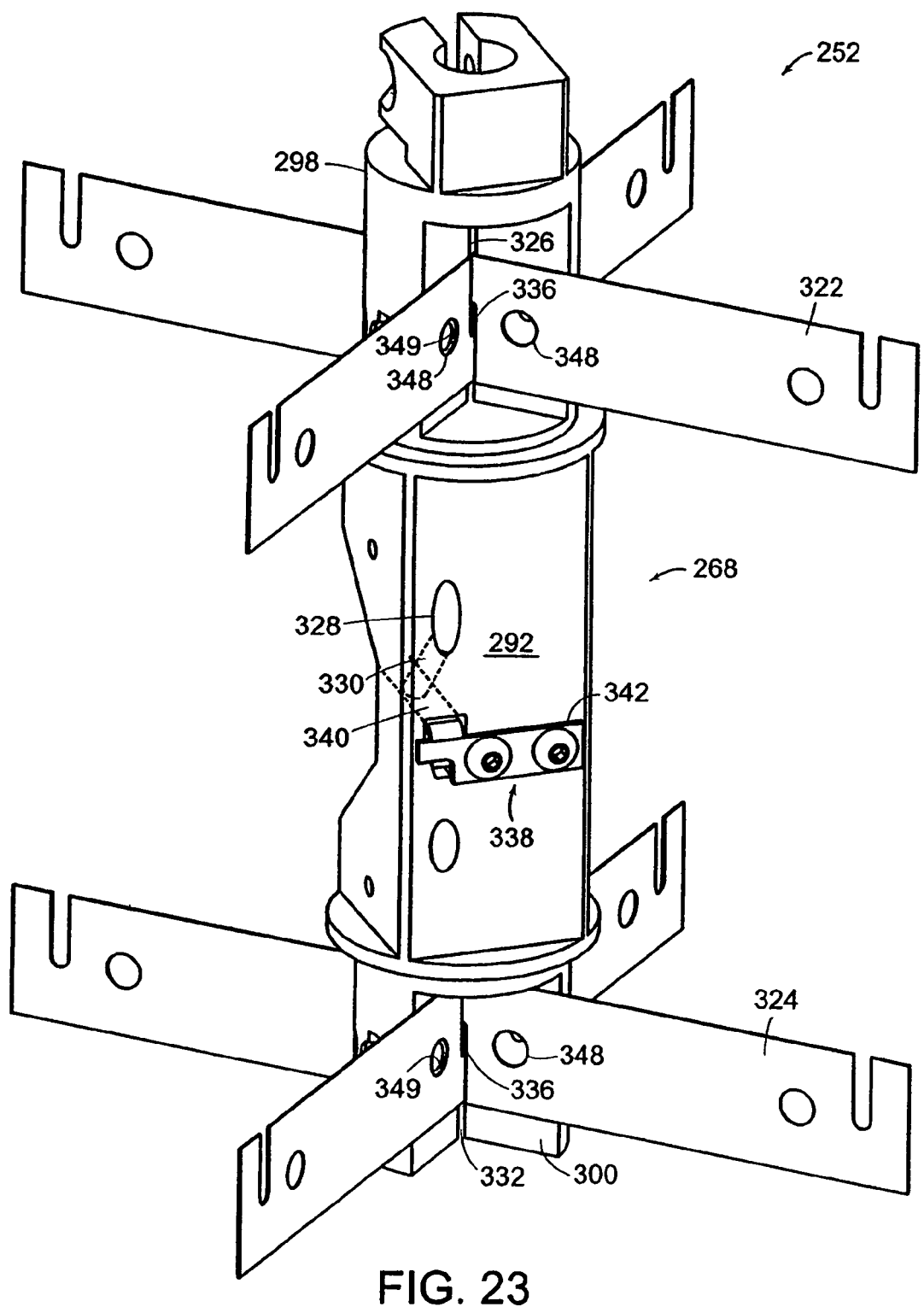
FIG. 23 is a rear view of the swing arm showing the tool clamp flexure of the retention mechanism in accordance with a preferred embodiment of the present invention.

Referring to FIG. 22, the swing arm assembly 252 has a pair of upper flexure blades 322 and a pair of lower flexure blades 324 secured to the swing arm 268. The pair of upper flexure blades 322 intersect each other at a groove 336 in each blade at a slot 326 in the upper hub as best seen in FIG. 23. The pair of lower flexure blades 324 intersect in a similar manner.

Still referring to FIG. 22, the swing arm 268 is shown with a portion broken away. The swing arm has a bore 328 for receiving a screw 330 for retaining the cutting tool 90 as described below with reference to FIG. 23. The center point 98 as best seen in FIG. 2C on the cutting tool edge 96 lies nominally in the front/back plane 302 of the swing arm.

Referring to FIG. 23, a back perspective view of the swing arm assembly 252 is shown. The lower pair of flexure blades 324 are positioned in the lower hub 300 by sliding them up into a slot 332 in the lower hub 300. The upper pair of flexure blades 322 are slid into position one at a time into the slot 326 in the upper hub 298 wherein the blade extending from the left front to the right rear in FIG. 23 is inserted first in position and the other blade is slid above and slid down such that the center grooves slots 336 engage. The center slots 336 are similar to that shown in FIG. 8 as related to the first embodiment.

The swing arm assembly 252 has a tool clamp flexure 338 that has a forward arm 340 as seen in FIG. 22 that is biased by the screw 330 into engagement with the cutting tool 90. Referring back to FIG. 23, the tool clamp flexure 338 has a back 342 that is secured to the rear face 292 of the swing arm 268. The screw 330 provides for biasing the forward arm 340 to secure the tool similar to the arrangement in FIG. 7 as related to the first embodiment. In the alternative, a screw can pull the cutting tool 90 in a downward direction using the lower hole.

Figure 24:
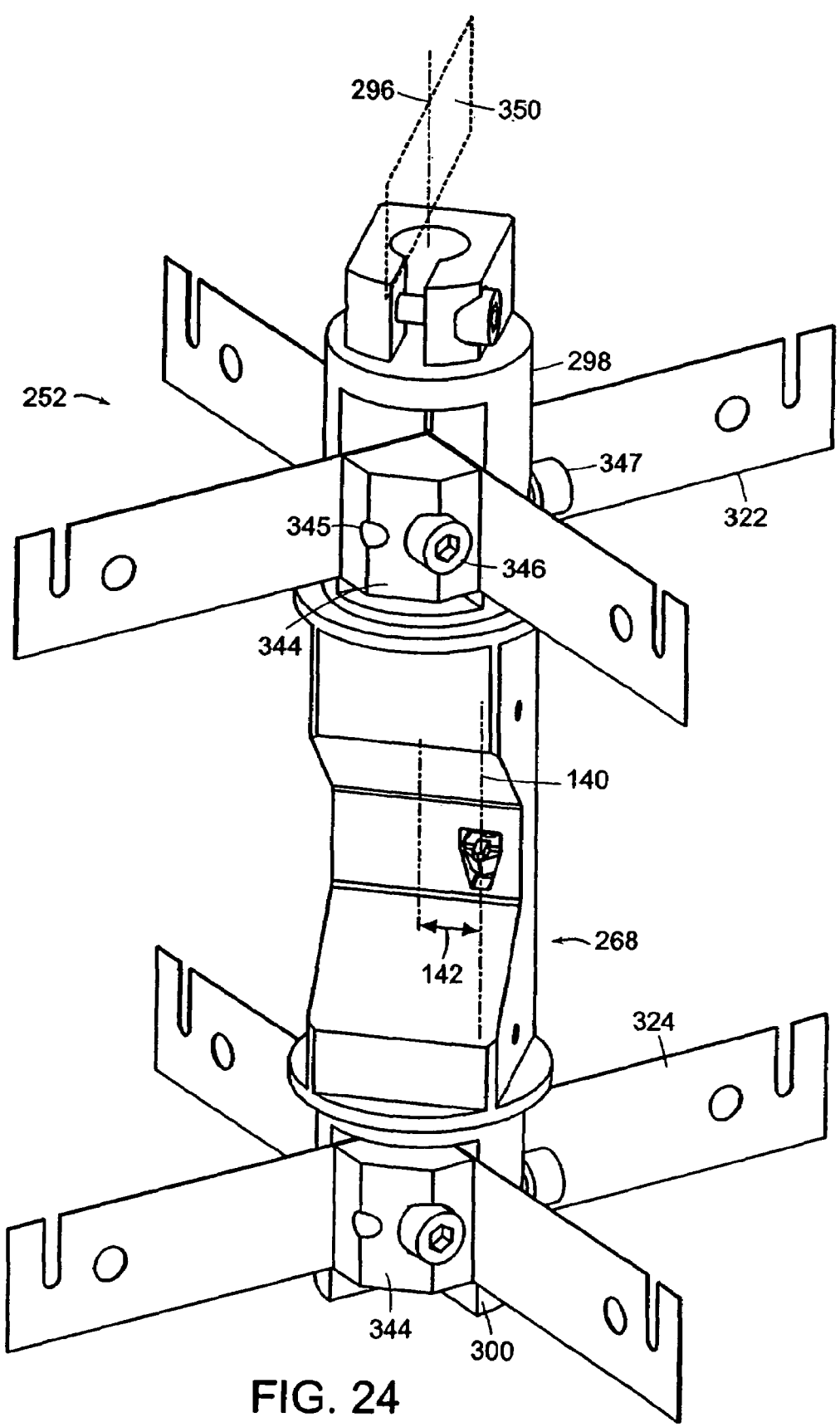
FIG. 24 is a front view of the swing arm showing a clamp mechanism for the pair of flexures in accordance with a preferred embodiment of the present invention.

FIG. 24 shows a front perspective view of the swing arm 268 with the upper pair of flexure blades 322 secured to the upper hub 298 and the lower pair of flexure blades 324 secured to the lower hub 300. The swing arm assembly 252 has a pair of blocks 344 associated with each of the upper hub 298 and the lower hub 300 for securing the respective flexure blades 322 and 324. A fastener 346 extends through the block 344 through a hole 348 in the flexure blade and into a threaded hole 349 in the hub, and a fastener 347 extends through a clearance hole in the hub into a threaded hole 345 in the block 344 as seen in FIG. 23, for securing the flexure blades 322 or 324 between the block 344 and the surface of the sector groove of the hub.

The swing arm 268 has a right/left plane of symmetry 350 that contains the swing arm axis of rotation 296 and is perpendicular to the front/back plane 302 as shown in FIG. 22. The right/left plane of symmetry 350 is analogous to the right/left plane of symmetry 136 as shown in FIG. 5. The slot 138, 139 in the swing arm 268 that receives the cutting tool 90 has a plane of symmetry 140 that divides the slot into a right half and a left half portion. The slot 138, 139 is located in the swing arm 268 approximately midway between the upper hub 298 and the lower hub 300. The slot plane of symmetry 140 is parallel to the right/left plane of symmetry 350 and is offset from the swing arm axis of rotation 296 by a distance equal to the offset radius 142. The center point on the cutting tool (analogous to the center point 98 in FIG. 2C) is in the plane of symmetry 140 of the slot 138, 139 and therefore offset from the swing arm right/left plane of symmetry 350 by a distance equal to this offset radius 142.

Figure 25:
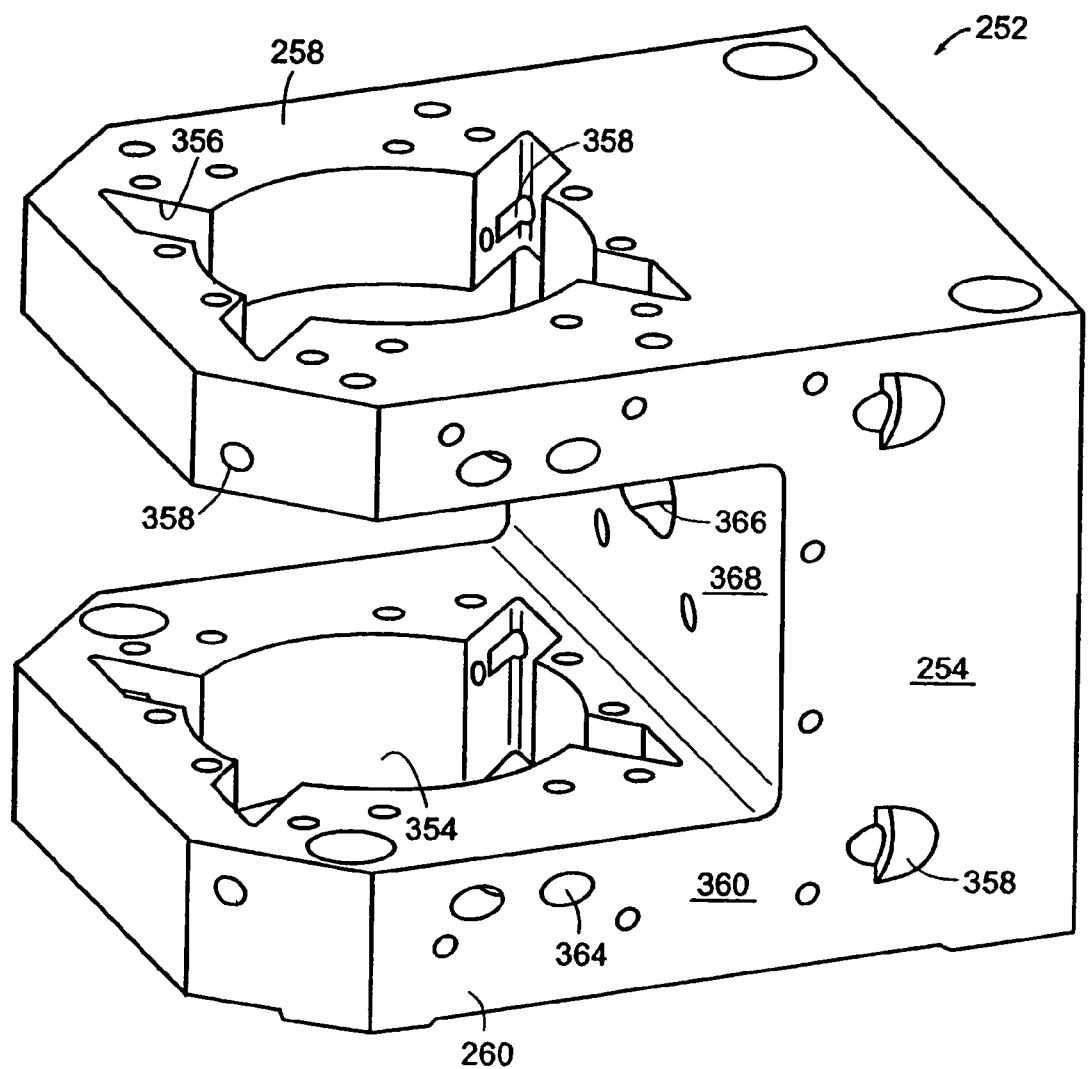
FIG. 25 is a perspective view of the base of the rotary fast tool in accordance with a preferred embodiment of the present invention.

FIG. 25 is a perspective view of the base 254 of the fast tool servo system 250. The base 254 has the upper portion 258 and the lower portion 260 with a generally circular cutout 354 with additional portions cutout 356 for forming an "x" shape for receiving the ends of the flexure blades 322 and 324. The "x" shape is oriented to maximize the clearance between the base 254 and the workpiece 50. In a preferred embodiment the portions cutout 356 are oriented so that the flexure blades 322 and 324 are at a 45° angle from the surface-normal of a workpiece at the point of contact between the cutting tool 90 and workpiece 50.

Figure 26:
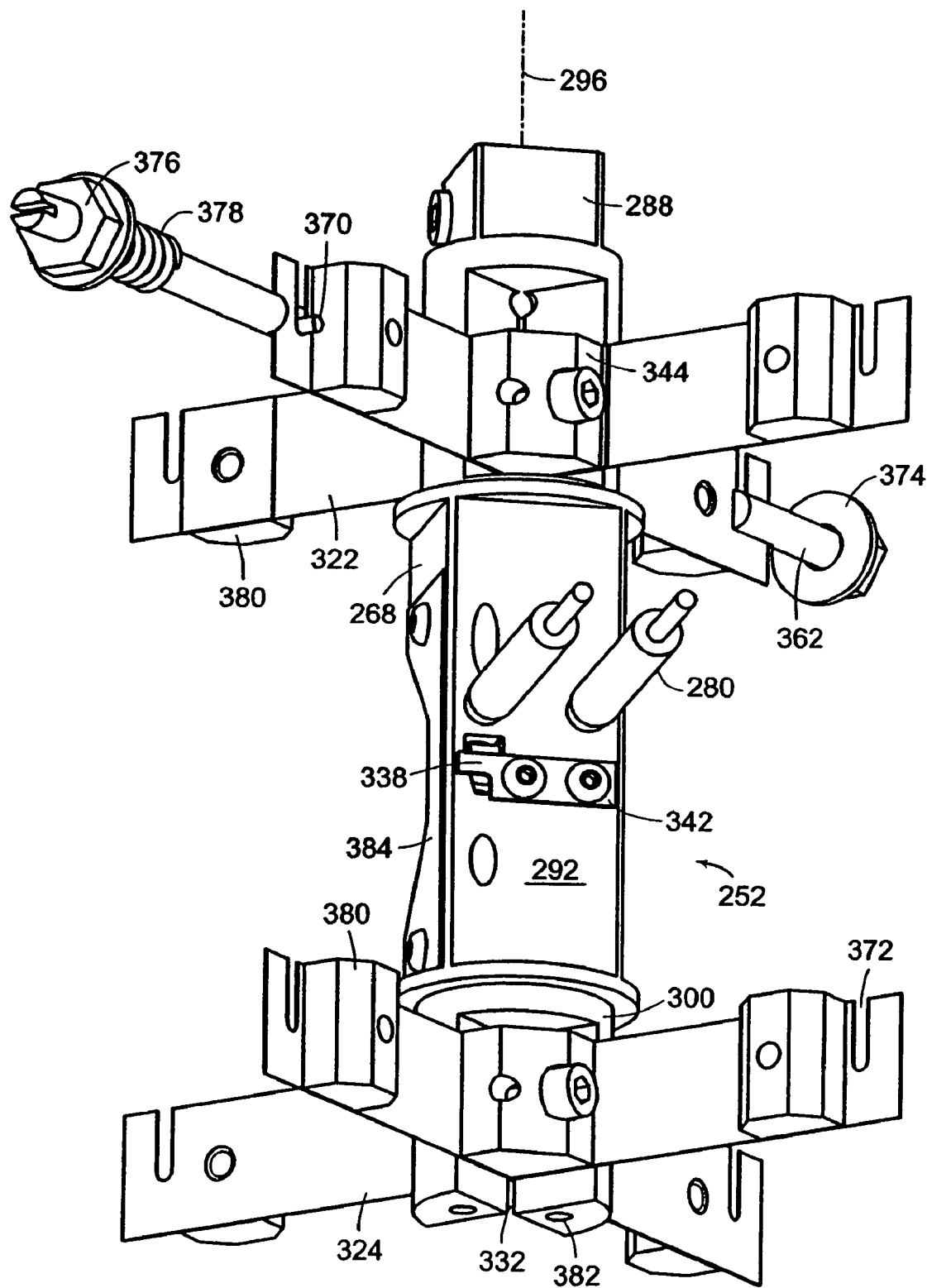
FIG. 26 is a back bottom perspective view of the swing arm with flexure blades, a tensioning device, and sensors in accordance with a preferred embodiment of the present invention.
Figure 27:
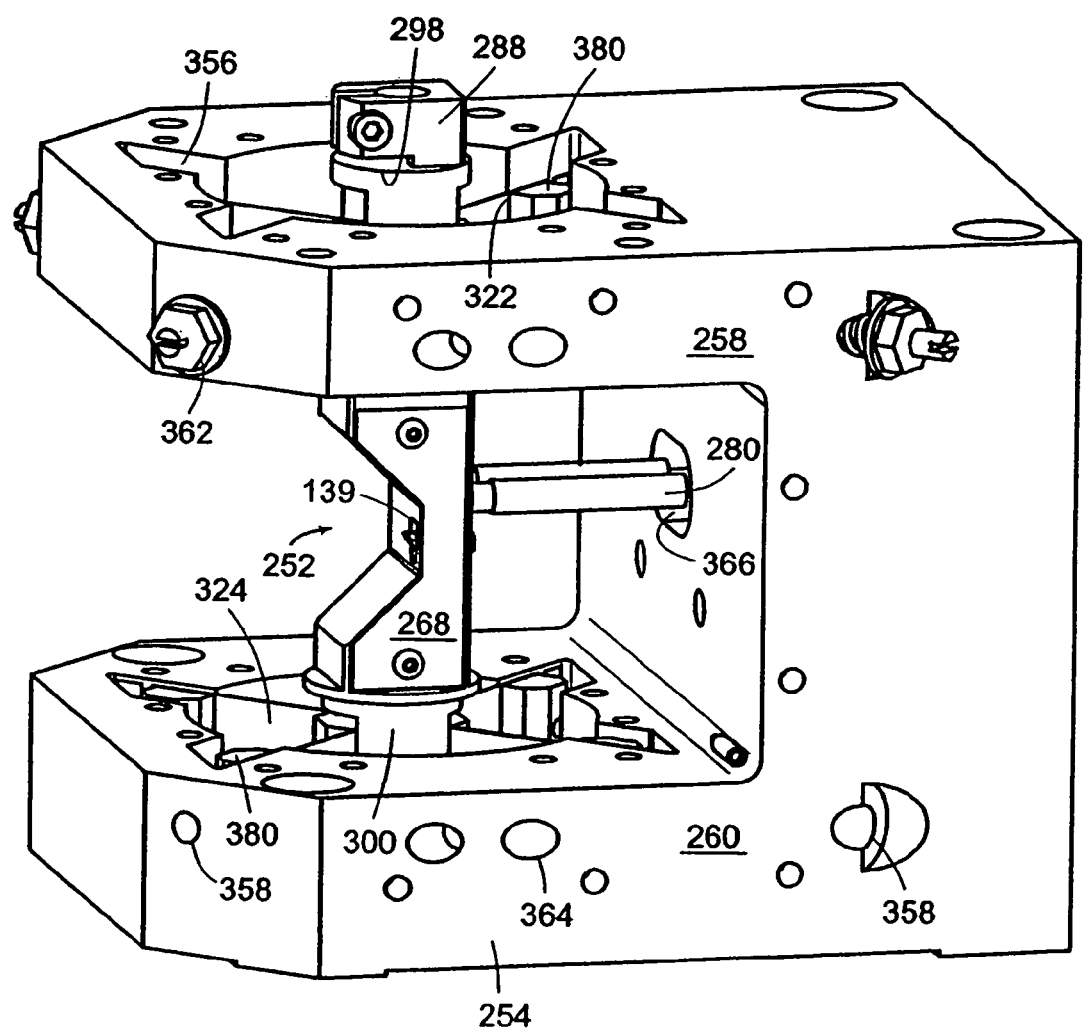
FIG. 27 is a side perspective view of the base with the swing arm in accordance with a preferred embodiment of the present invention.

A plurality of holes 358 extend from the cut-out portions 356 to the outer surfaces 360 of the upper and lower portions 258 and 260 of the base 254 to receive a plurality of tensioning rods 362 as shown in FIG. 26. Additional holes 364 extend from the cut-out portion 356 to the outer surface 360 of the base 254 in order to allow the flexure blades to be secured by a plurality of clamping blocks 380 after being properly tensioned as seen in FIG. 27. The base has an opening 366 on a back surface 368 behind the cylindrical cut-out 354 that is used in conjunction with mounting the sensors 280.

Referring to FIG. 26, a back bottom perspective view of the swing arm assembly 252 including the flexure blades 322 and 324 with one of the four tensioning devices is shown in accordance with a preferred embodiment of the present invention. Each of the upper and lower flexure blades are placed in tension prior to fixing the blades 322 and 324 to the base. One of the upper flexure blades 322 is shown with a pair of tensioning rods 362. Each tensioning rod 362 has a pin 370 that is received in a slot 372 in the flexure blade 322 or 324. The tensioning rod 362 has a washer 374 and a threaded nut 376 at the other end which engage the base 254 in pulling the ends of the flexure blades 322 away from each other (i.e., place the blade in tension). One of the tensioning rods 362 has a spring device 378 for providing a finely controlled tension force on the flexure blades 322 or 324 as the nut 376 is turned. Differentially adjusting the nuts 376 on a pair of tensioning rods 362 causes displacement of the swing arm axis of rotation 296, in a direction along the long axis of that pair of tensioning rods, relative to the base 254. By differentially adjusting each of the four pairs of tensioning rods 362 the orientation and location of the swing arm axis of rotation 296 can be adjusted relative to the base 254 before the outer ends of the flexure blades 322 and 324 are fixed to the base with the clamping blocks 380. The clearance hole in the flexure blade is large enough to accommodate this adjustment without interference.

Each flexure blade 322 has a pair of clamping blocks 380 mounted to the blade that are received within the cut-out portion 356 of the base 254. These blocks 380 each receive a fastener to secure the flexure blades 322 and 324 to the base 254 in tension after the swing arm axis of rotation 296 is aligned to the base 254 and the flexure blades are tensioned.

In addition, still referring to FIG. 26, the lower portion of the lower hub 300 has a pair of attachment holes 382 below where the lower flexure blades 324 are slid into position in the slot 332. If the damping plate 308 is attached, such as shown in FIG. 21, the damping plate 308 is attached to the lower hub 300 using these attachment holes 382.

On each side of the center portion of the swing arm 268 there are disposed a pair of plates 384, one shown in FIG. 26, for help in damping unwanted motion of the swing arm 268. The back 342 of the tool clamp flexure 338 is secured to the rear face 292 of the swing arm 268. In a preferred embodiment, the eddy current sensors 280 are shown engaging the rear face 292 of the swing arm 268.

Referring to FIG. 27, the swing arm assembly 252 is positioned in the base 254, the hubs 298 and 300 are located in their respective cylindrical cut-out 354 portion. The clamping blocks 380 for securing the swing arm assembly 252 to the base 254 are shown such that the flexure blades 322 and 324 are interposed between the blocks 380 and the wall of the additional cutout 356. The tensioning rods 362 are shown extending through the hole 358 in the upper portion 258 of the base 254. The additional holes 364 are used to secure fasteners to the clamping block 380 to retain the flexure blades 322 and 324.

The sensors 280 are shown extending from the opening 366 in the base 254 to the swing arm 268. The tensioning rods 262 are shown in the upper portion; similar rods are used in the lower portion but are not shown in this figure. After the flexure blades 322 and 324 are fixed to the base 254 by the clamping blocks 380, the tensioning rods 362 can be loosened by backing off nuts 376, although it is generally not necessary to do so. The cutting tool 90 is projecting from the slot 138, 139 in the swing arm 268.

Referring to FIG. 28, the upper chip shield 270 and the lower chip shield 272 are shown secured to the base 254. The swing arm 268 has a pair of annular rings or skirts 390 that interact with the shields 270 and 272 as described with respect to the first embodiment.

The swing arm assembly 252 has a plurality of hard stops 392. The hard stops 392 are retained by the upper chip shield 270. The hard stops 392 prevent excessive rotation of the swing arm 268 that can damage the flexure blades 322 and 324, and work identically as described and shown in the embodiment illustrated in FIG. 14. Referring to FIG. 14, a small gap 213 between an end of each hard stop 392 (212) and the swing arm 268 (102) allows normal rotation of the swing arm. The hard stops 392 (212) act in pairs to limit the rotation angle of the swing arm 268 (102) to prevent damage to the upper and lower pairs of flexure blades 322 and 324. Excessive rotation of the swing arm 268 (102) causes closure of a pair of gaps 213 that limits rotation of the swing arm.

The sensors 280 are shown in a mounting block 394 mounted to the back face or back surface 368 of the base 254. The output shaft 286 of the actuator 256 is held by the clamp 288 to connect the actuator 256 to the swing arm assembly 252. It is recognized that a flexible coupling can be used between the output shaft 286 and the swing arm assembly 252 to accommodate misalignment, between the output shaft of the actuator and the swing arm assembly.

Figure 29:
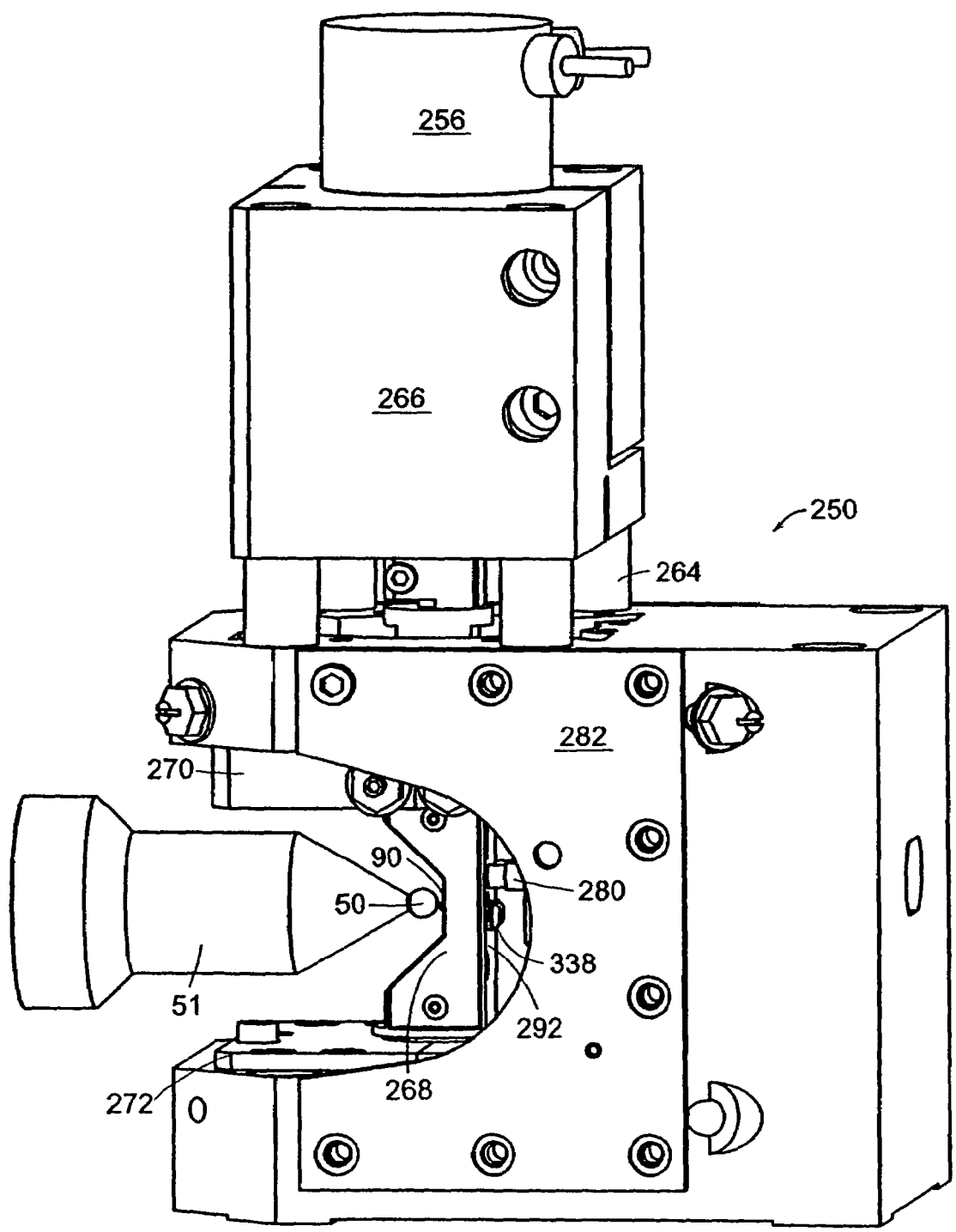
FIG. 29 is a side perspective view of the rotary fast tool servo showing an enclosure encircling the actuator and a side stiffener on the base in accordance with a preferred embodiment of the present invention.

FIG. 29 is a side view of the fast tool servo system 250 in accordance with a preferred embodiment of the present invention and is a view similar to that of FIG. 20. The cutting tool 90 is shown engaging the working piece 50 retained on the workpiece holder 51. The upper chip shield 270 and the lower chip shield 272 protect the upper flexure blades 322 and the lower flexure blades 324, as seen in FIG. 27 from chips and debris that are produced during machining. The sensor 280 is shown engaging the rear face 292 of the swing arm 268. In addition, the tool clamp flexure 338 is shown secured to the swing arm.

The thermal insulating spacers 264 restrict the flow of heat from the actuator 256 into the base 254. The enclosure 266 encircles the actuator 256 to allow controlled removal of heat. The side stiffeners 282 stiffen the base 254.

In a preferred embodiment, the system for a high bandwidth rotary fast tool servo establishes the swing arm axis of rotation 296 and 46 in a vertical direction. Other preferred embodiments of the system can establish the swing arm axis of rotation 296 in a horizontal direction, or any other direction, depending on the intended application of the fast tool servo.

In operation, the fast tool servo 250 is used in conjunction with the machine tool 240, for example, a precision lathe, as shown in FIG. 18. The spindle 243 rotates about a horizontal axis whereas the rotating table 242 rotates about a vertical axis. In addition, one of the units moves in the cross-slide direction that is in and out of the page with respect to FIG. 18 whereas the other one is capable of moving into the in-feed slide position that is in a left and right direction. The position and velocity of the cross-slide and in-feed slide are measured within a precision lathe controller 412. In addition, the rotation position and velocity of the workpiece 50 and the auxiliary spindle (rotary table) 242 can be measured with sensors located in the machined tool 240.

Figure 31:
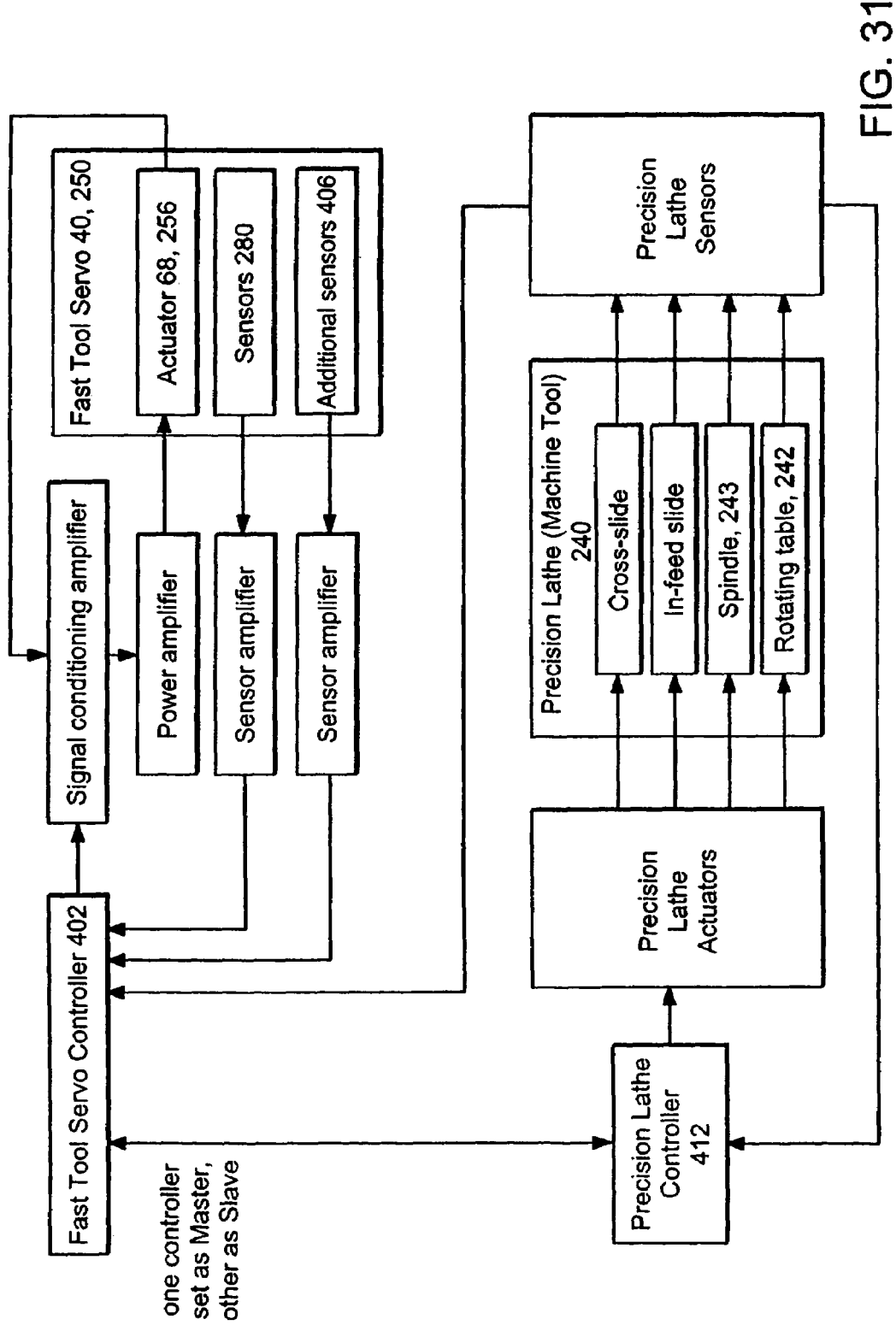
FIG. 31 is a schematic of a control system in accordance with a preferred embodiment of the present invention.

FIG. 31 shows a schematic diagram of the inter-relationship in control of the fast tool servo system 250 with that of a precision lathe or machine tool 240. The machine tool 240 with rotating table 242 such as shown in FIGS. 18, 19, or 32A-C has sensors to determine the position of the workpiece spindle 243 and therein the workpiece 50. The spindle 243 is held by a base unit which is capable of moving in at least one direction. The position of the base unit, the rotational speed and position of the workpiece spindle 243 form inputs into a precision lathe controller 412. The rotating table 242, on which the fast tool servo 250 is mounted, is capable of being moved in a controlled fashion in a direction perpendicular to the direction of the base unit in addition to rotating about a vertical axis. The translational and rotational positions of the rotating table are likewise input into the precision lathe controller 412. In addition to the sensors within the precision lathe 240, the fast tool servo 250 has a plurality of sensors 280 and 406. With respect to the base 254, the position of the swing arm 268 is detected. With sensors such as, for example, sensors 280 as shown in FIG. 29, the rotation position and translation of the swing arm 268 in a direction perpendicular to its front/back plane 118, 302 is detected.

The fast tool servo controller 402 uses feedback information via the sensor amplifiers from the sensors 280 and additional sensors 406 to compute the position and velocity of the tool 90, and produces a command signal for the fast tool servo actuator 256. The command signal from the fast tool servo controller 402 to the actuator 256 is modified by a signal conditioning amplifier that uses feedback from the actuator 256, and the signal indicative of the modified command forms an input to a power amplifier that drives the actuator 256. The fast tool servo controller 402 may synthesize angular velocity information for the swing arm 268 from the position sensors. In an alternate embodiment, a velocity sensor such as, for example, a tachometer is disposed on the actuator.

In a preferred embodiment, the fast tool servo controller 402 is the master controller and the precision lathe controller 412 is the slave controller. Sensors associated with the precision lathe 240 may provide feedback information regarding the position and velocity of the cross-slide, in-feed slide, spindle, and rotating table to both the precision lathe controller 412 and the fast tool servo controller 402. The fast tool servo controller 402 uses the precision lathe sensor information and the fast tool servo sensor information 280 and 406 to compute the spatial relationship between the workpiece 50 and the tool 90. The fast tool servo controller 402 compares the computed relationship between the workpiece 50 and the tool 90 to the desired relationship between the workpiece and the tool, and generates commands to the precision lathe controller 402 to position and orient the cross-slide, in-feed slide, spindle, and rotating table, and also generates commands to the fast tool servo controller to position the tool 90. The precision lathe controller uses feedback information from the precision lathe sensors to compute signals that are issued to the precision lathe actuators to affect the commanded positions and orientations of the cross-slide, in-feed slide, spindle, and rotating table. The fast tool servo controller 402 uses feedback information via the sensor amplifiers from the sensors 280 and additional sensors 406 to compute the position and velocity of the tool 90, and generates a command signal for the fast tool servo actuator 256. The command signal from the fast tool servo controller 402 to the actuator 256 is modified by a signal conditioning amplifier that uses feedback from the actuator 256, and the signal indicative of the modified command forms an input to a power amplifier that drives the actuator 256.

In a preferred embodiment, the fast tool servo system can be a computer numeric control (CNC) machine tool system. A preferred embodiment of the present invention can include a programmable computer.

In an alternate embodiment the precision lathe controller 412 is the master controller and the fast tool servo controller 402 is the slave controller. In this embodiment the fast tool servo controller 402 is responsible for local control of the tool 90 as described with respect to the previous embodiment, and the precision lathe controller 412 is responsible for local control of the precision lathe 240 as described hereinbefore. In this embodiment, the fast tool servo controller 402 may provide the precision lathe controller 412 with information on the position and velocity of the tool 90. The precision lathe controller 412 treats the fast tool servo system 250 as an additional machine axis under its command and synchronizes the position and velocity of the tool 90 with the position and velocity of the cross-slide, in-feed slide, spindle, and rotating table in accordance with the desired relationship between the tool 90 and workpiece 50.

In a preferred embodiment, the fast tool servo controller 402 with an actuator 256 having the capability of two-thousand movements per second and a range of travel of ±0.14 degrees, sensors 280, and an offset radius 142 of 5 mm allows the fast tool servo 250 to develop a tool tip acceleration in excess of 25 g's following a 5 micron peak to valley sinusoidal surface with 50 nm accuracy at 2 kHz.

Figure 30:
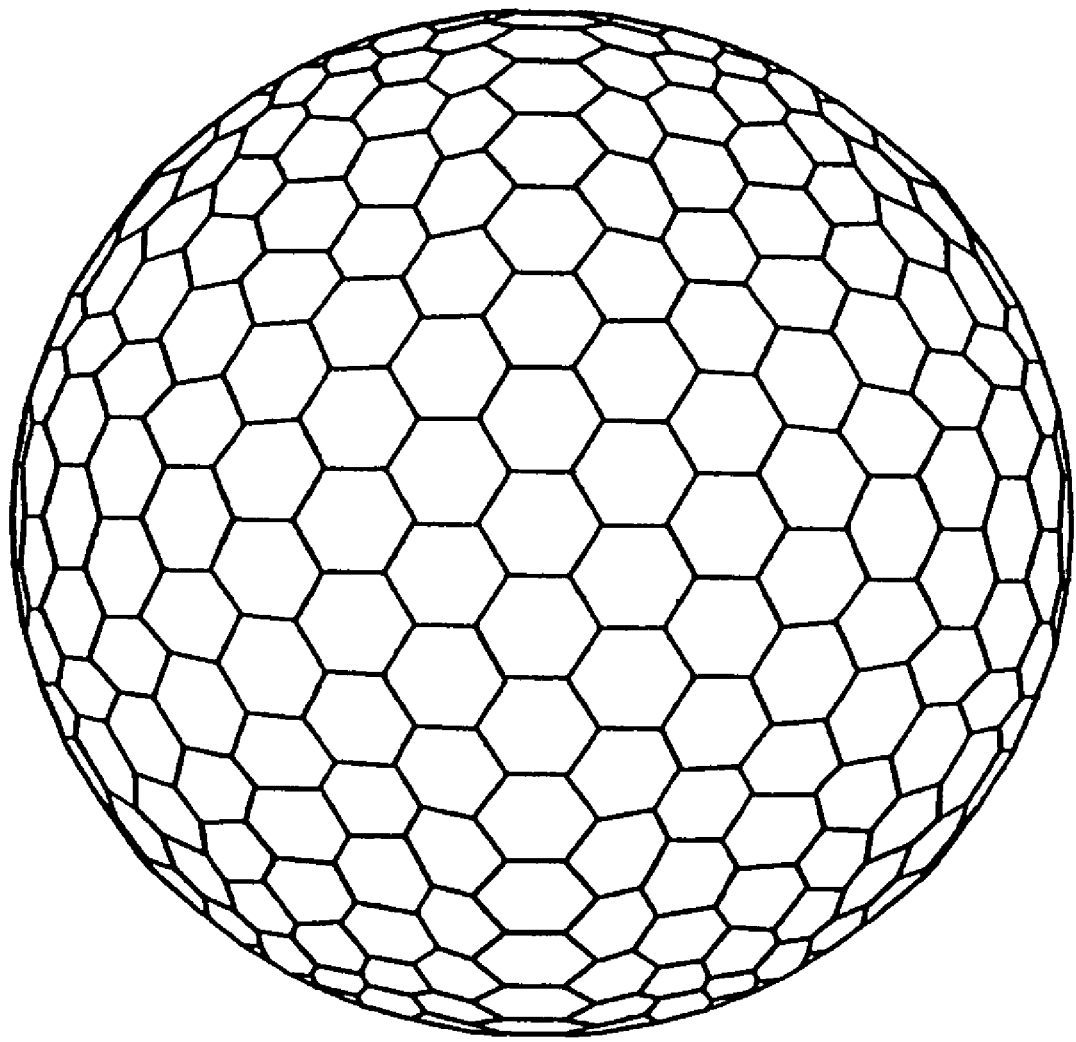
FIG. 30 is a front view of an exemplary workpiece in accordance with a preferred embodiment of the present invention.

The cutting edge 72 on the cutting tool 90 is spaced from the axis of rotation 46, 296 by an offset radius 142 as shown in FIGS. 5 and 24. Rotation of the swing arm 102, 268 caused by the actuator 68 causes a controlled rapid movement of the cutting edge into and out of engagement with the workpiece as the spindle rotates therein, allowing the production of workpieces with complex shapes. For example, referring to FIG. 30, a stasphere shape having a plurality of icosahedron or multiside polyhedron features such as, for example, depressions or dimples with smooth or abrupt transitions between surfaces is produced by the rotation of the workpiece on the spindle as the cutting edge is moved into and out of engagement with the material while the rotating table 242 carries the fast tool servo 40, 250 from the pole of the workpiece to its equator. In addition, the applications of the preferred embodiments include production of lenses for telescopes or ophthalmics.

Figure 32A:
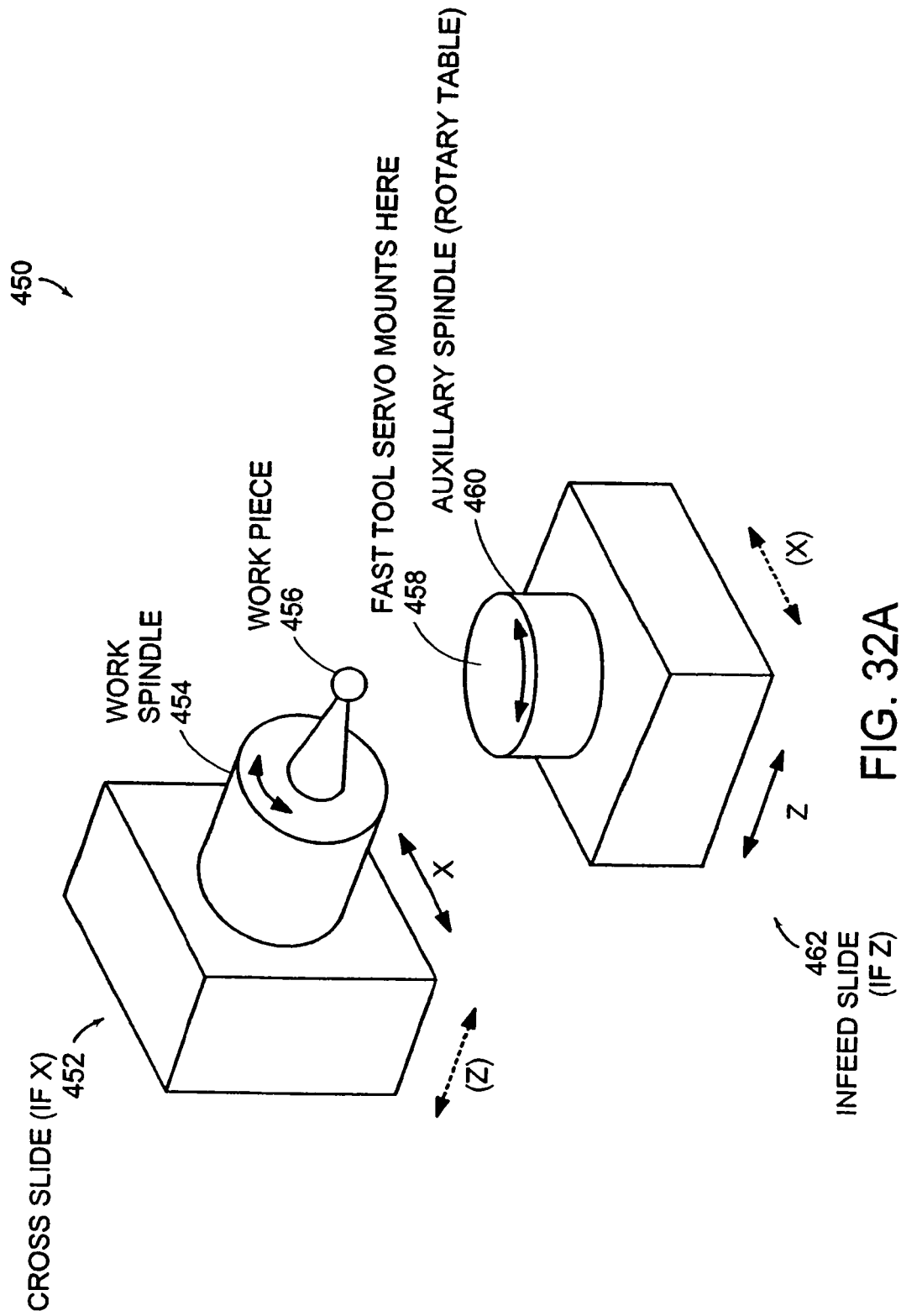
FIG. 32A is a perspective view of a lathe with a workpiece and an auxiliary rotary table without the fast tool servo in accordance with a preferred embodiment of the present invention.
Figure 32B:
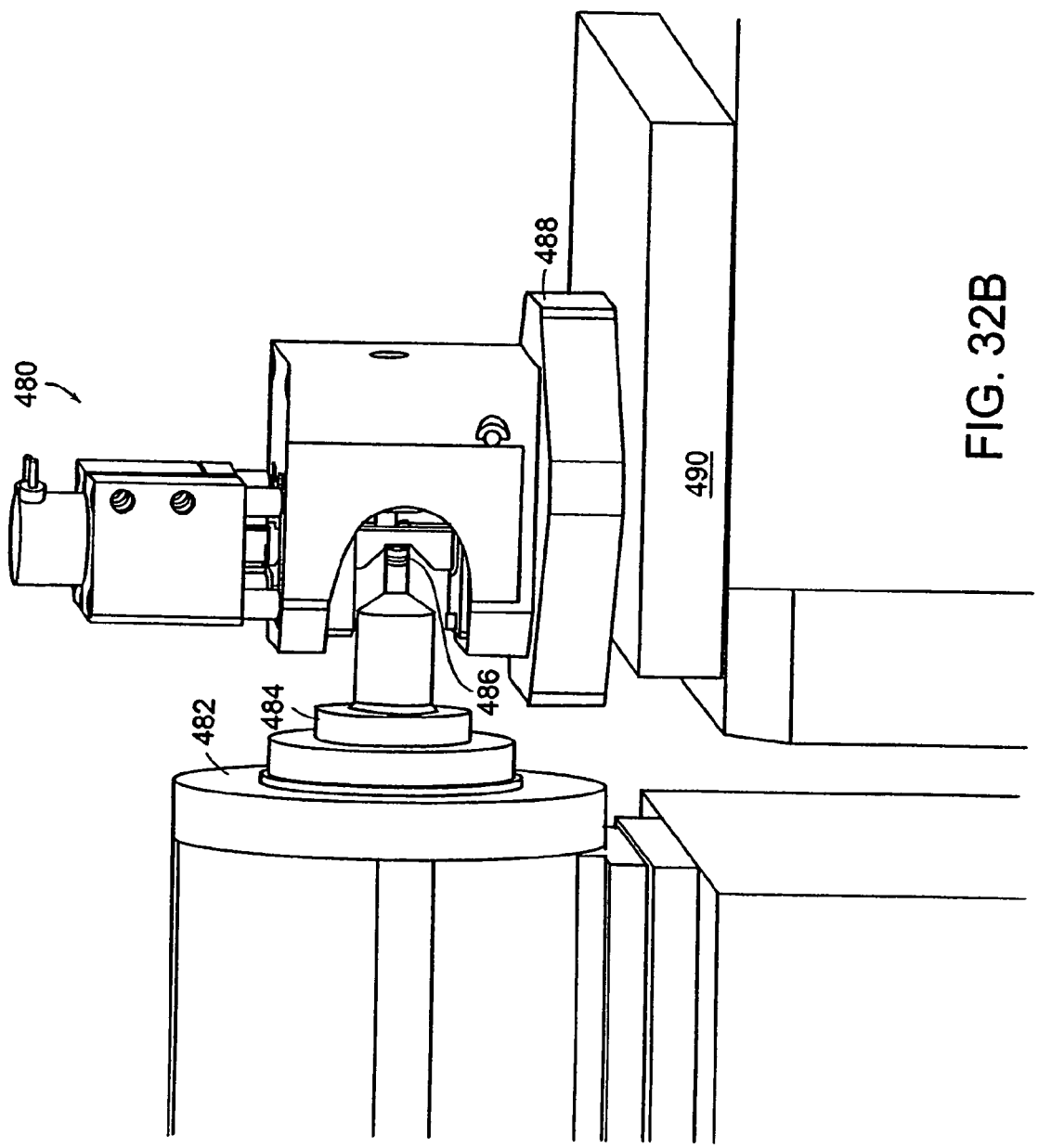

FIGS. 32B and 32C illustrate views of a precision lathe having a workpiece 486 and a fast tool servo system in accordance with a preferred embodiment of the present invention. These figures illustrate enlarged views of the fast tool servo system which is placed on a rotary table 488, in relation to the workpiece 486, the cross-slide 452 and in-feed slide 462 described hereinbefore.

Figure 33B:
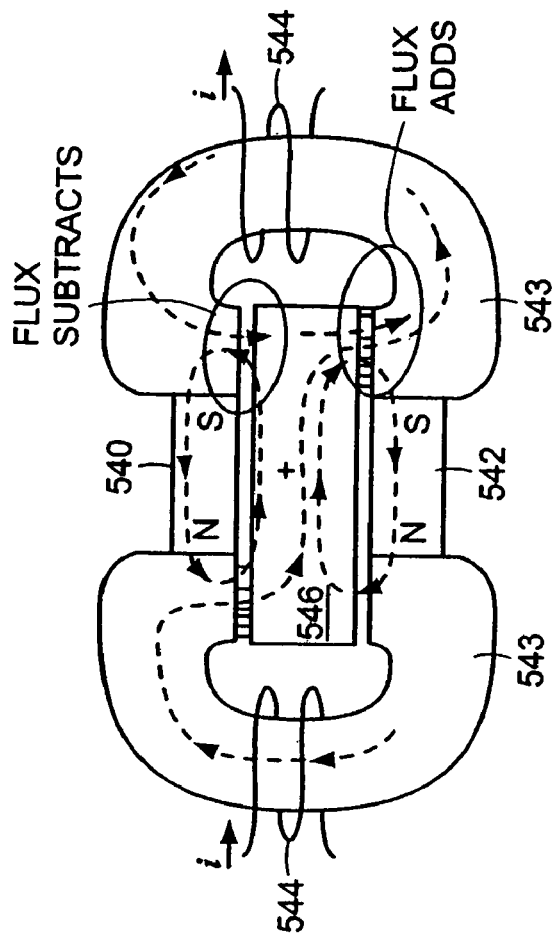
FIGS. 33A and 33B are schematic diagrams of a variable reluctance actuator and swing arm assembly in accordance with a preferred embodiment of the present invention.
Figure 33A:
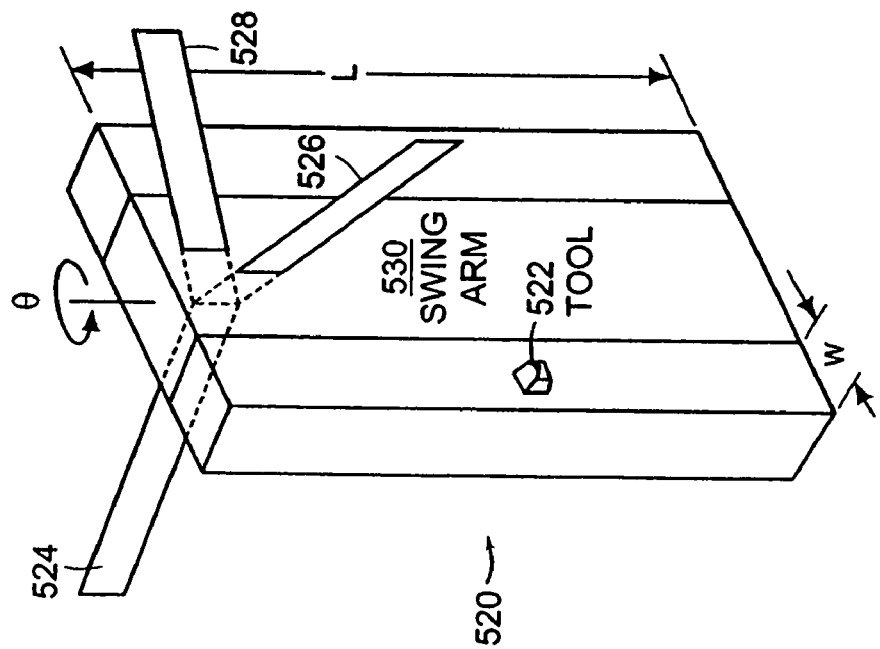

FIGS. 33A and 33B are schematic diagrams of a variable reluctance actuator in accordance with a preferred embodiment of the present invention. In a preferred embodiment the actuator and swing arm are an integral unit. This embodiment includes a normal-direction variable reluctance rotary actuator for an approximately 10 kHz and higher rotary fast tool servo system. Two pairs of actuators provide back and forth rotation of a swing arm 530 that holds a tool 522 at a location spaced from the axis of rotation, creating a tool motion towards and away from a workpiece. In a preferred embodiment, using a flux density of approximately 1.5 Tesla, a 1000 g's of tool acceleration required to follow a 5 micron peak to valley sinusoidal surface at, for example, 10 kHz can be achieved. This alternate preferred embodiment operates using the principle of variable reluctance wherein a force is generated between two components in a magnetic circuit as it naturally attempts to reduce the overall reluctance of the magnetic circuit. In the present embodiment, reducing one or more of the air gaps between the movable rotor 546 and the stator 543 reduces the reluctance of the magnetic circuit. The permanent magnets 540 and 542 provide magnetic flux biasing so that the magnetic flux generated by the current (i) in the coils 544 causes rotation of the rotor 546. For the direction of the current (i) shown in FIG. 33B the magnetic flux generated by the coils 544 is steered by the permanent magnets 540 and 542 from the upper left corner of the rotor 546 to the lower right corner of the rotor causing clockwise rotation of the rotor. Reversing the direction of the current (i) shown in FIG. 33B causes the magnetic flux generated by the coils 544 to be steered by the permanent magnets 540 and 542 from the lower left corner of the rotor 546 to the upper right corner of the rotor causing counter-clockwise rotation of the rotor. A normal-direction variable reluctance actuator is an electromagnet that closes the gap between itself and a target. The attractive force increases with the inverse of the gap squared and can thus provide a small stroke actuator with a high force density. FIG. 33B illustrates stators having windings 544 which can be formed out of various coils. A permanent magnet system 540, 542, is disposed between the stators. A rotor 546 is disposed in the center of the permanent magnets. The system induces a force that provides for the back and forth rotation of the rotating swing arm 530 that holds the tool 522. The geometry of the flexures 524, 526, 528 is optimized to provide the necessary guidance and support of the swing arm.

Figure 34:
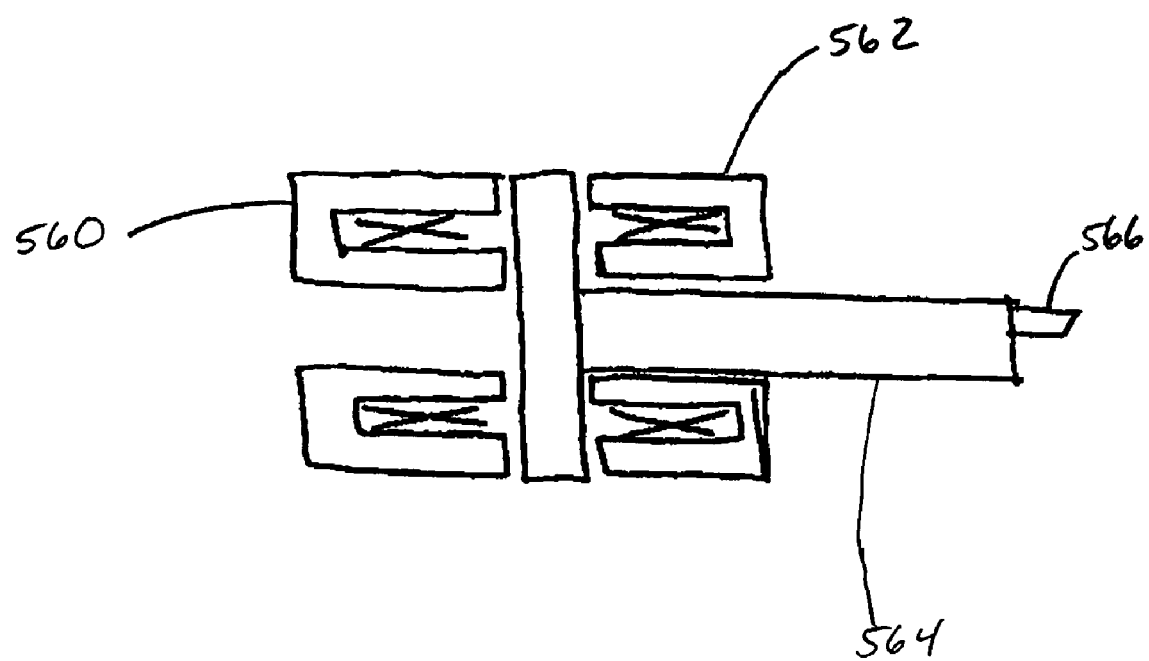
FIG. 34 illustrates an embodiment of a variable reluctance actuator.

FIG. 34 illustrates a variable reluctance fast tool servo employing an armature 564, tool 566, first actuator 560 and second actuator 562. The servo may be used in a biased manner to facilitate linear operation or it may be operated in an unbiased configuration. Armature 564 may be supported on flexures or air, oil, or on plain or rolling element bearings.

Figure 35A:
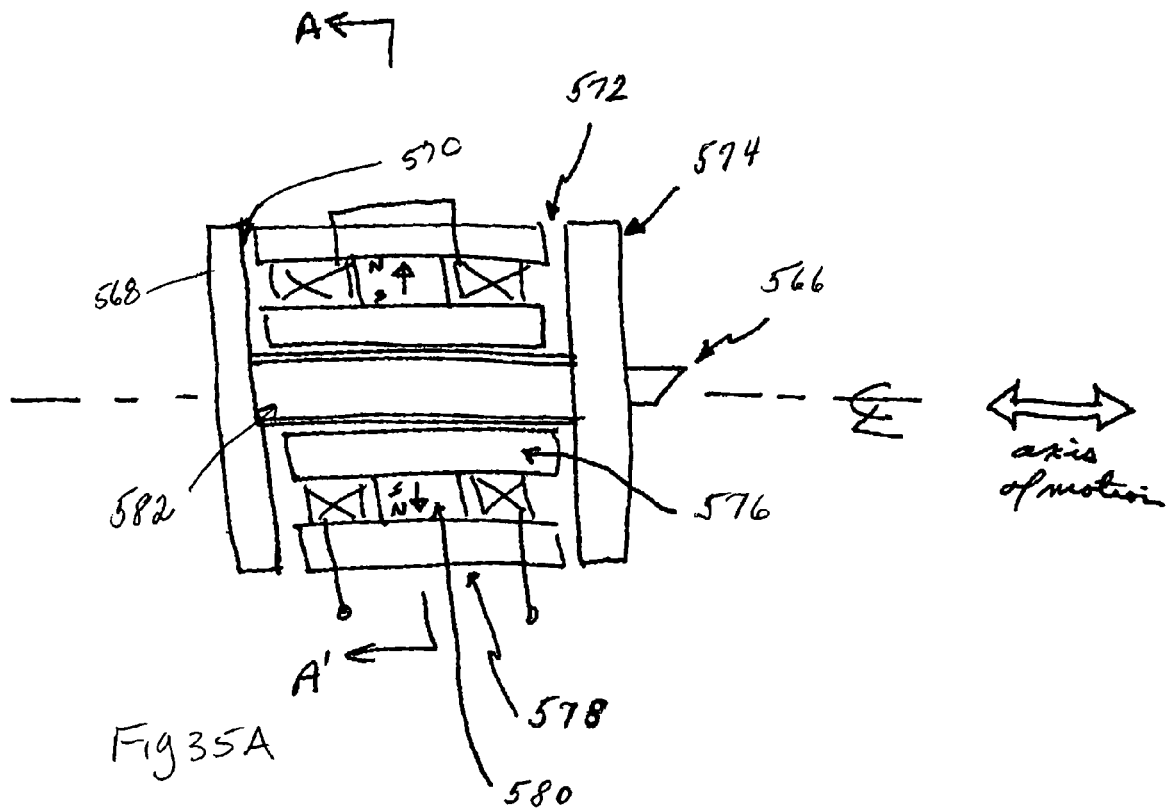
FIGS. 35A and 35B illustrate a variable reluctance actuator for use in fast tool servo applications.

FIG. 35A illustrates a variable reluctance actuator comprising a tool 566, a backside endplate 568, a bias side air gap 570, a tool side air gap 572, a tool side endplate 574, an inner magnetic shell 576, an outer magnetic shell 578, a permanent magnet 580 and a tubular backbone 582. The actuator of FIG. 35A has an axis of motion across the page (i.e. left to right) and has the tool 566 mounted on the centerline of the actuator.

Figure 35B:
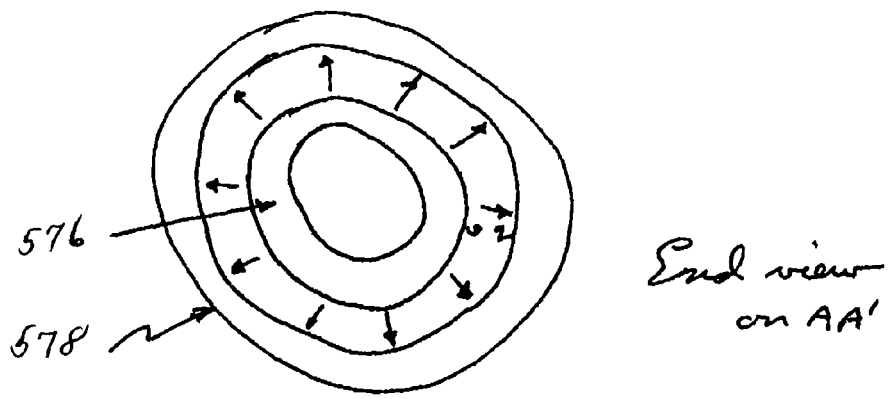

FIG. 35B illustrates an end view of the variable reluctance actuator taken along line A-A' showing the inner magnetic shell 576, the outer magnetic shell 578 and the direction of the magnetic flux radiating outward.

Figure 36A:
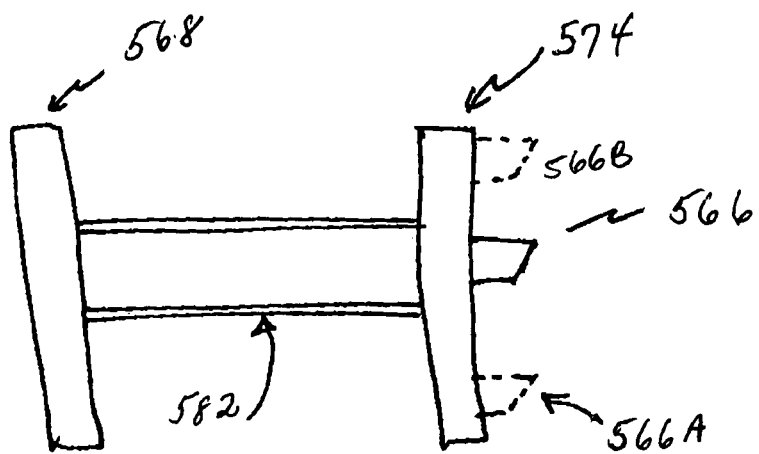
FIGS. 36A and 36B illustrate the armature and stator, respectively, of the actuator in FIGS. 35A and 35B.

FIG. 36A illustrates the armature of FIG. 35A and shows the magnetic backside endplate 568, the magnetic tool side endplate 574, and the non magnetic tubular backbone 582. FIG. 36A also illustrates tool 566 mounted along the centerline as well as showing alternative tool mounting locations 566A and 566B proximate to the outer edges of tool side endplate 574.

Figure 36B:
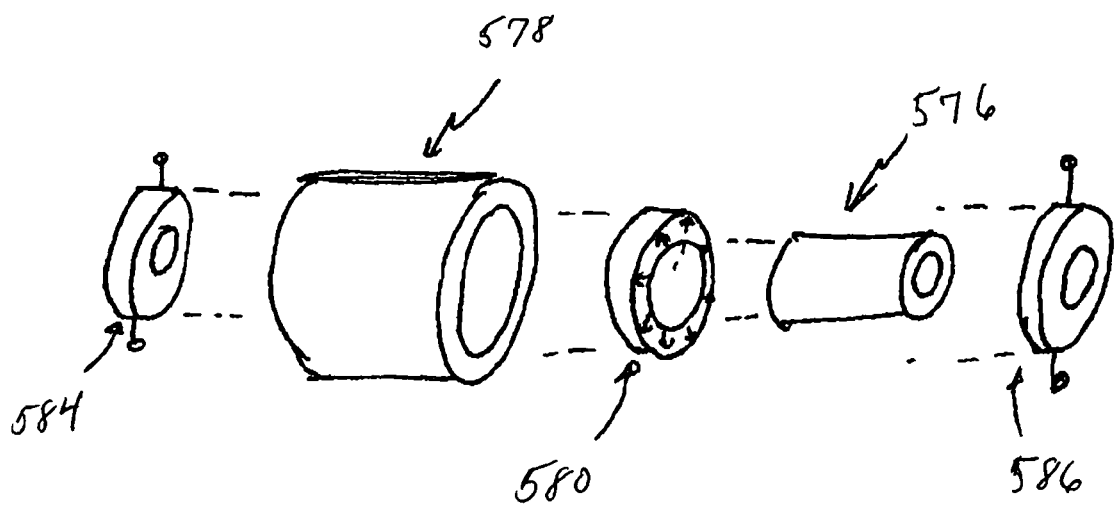

FIG. 36B illustrates an exploded view of the stator of FIG. 35A. The stator is comprised of a backside coil 584, a magnetic outer shell 578, a permanent magnet 580 for providing radial magnetization, a magnetic inner shell 576 and a tool side coil 586.

Figure 37:
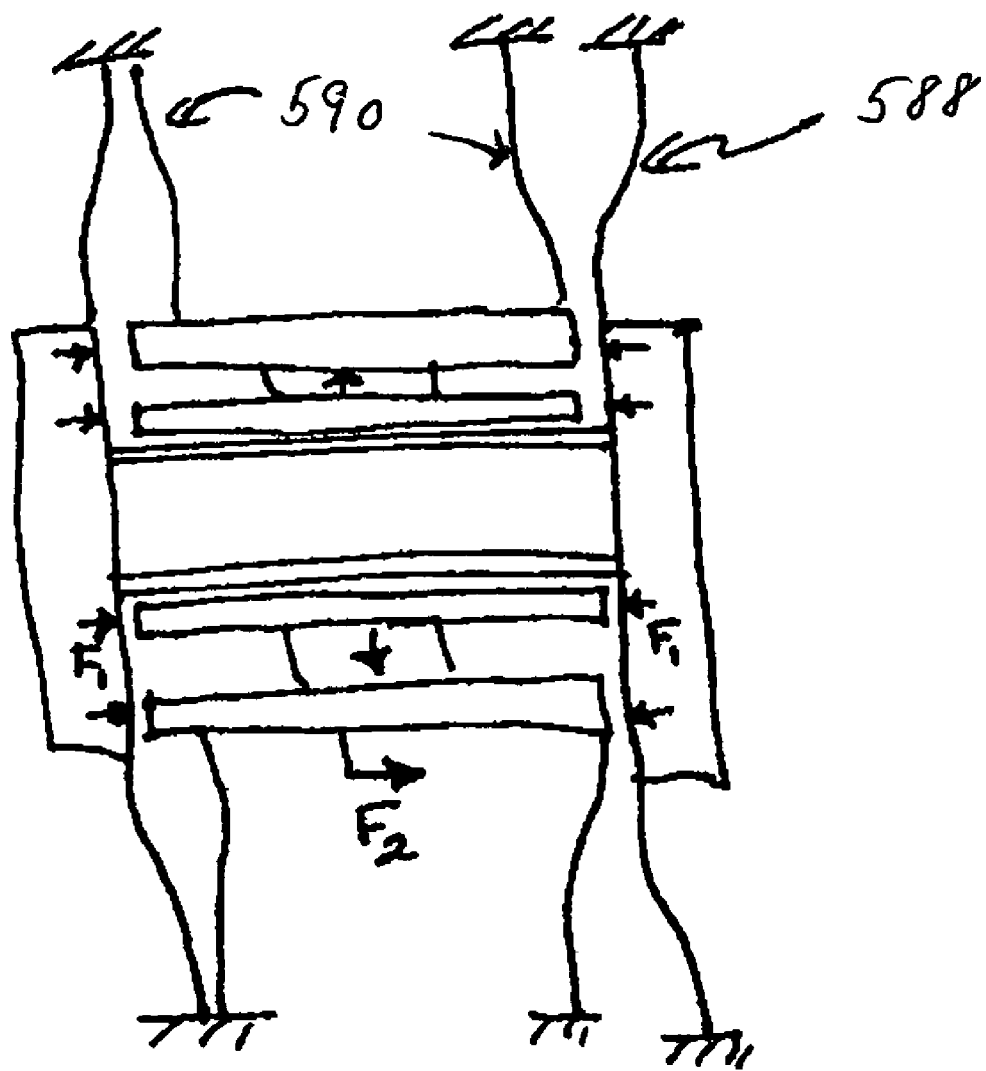
FIG. 37 illustrates an embodiment of a fast tool servo having the armature and stator supported on flexures.

FIG. 37 illustrates an embodiment where the armature and stator (optionally) can be supported on flexures and bearings, or air bearings, or fluid hydrostatic bearings to constrain motion to only axial motion. If the stator is suspended on bearings, it can serve as a reaction mass. The stator can also use air or fluid for cooling and/or clamping. The embodiment of FIG. 37 employs two stator flexures 590 and two armature flexures 588.

Figure 38A:
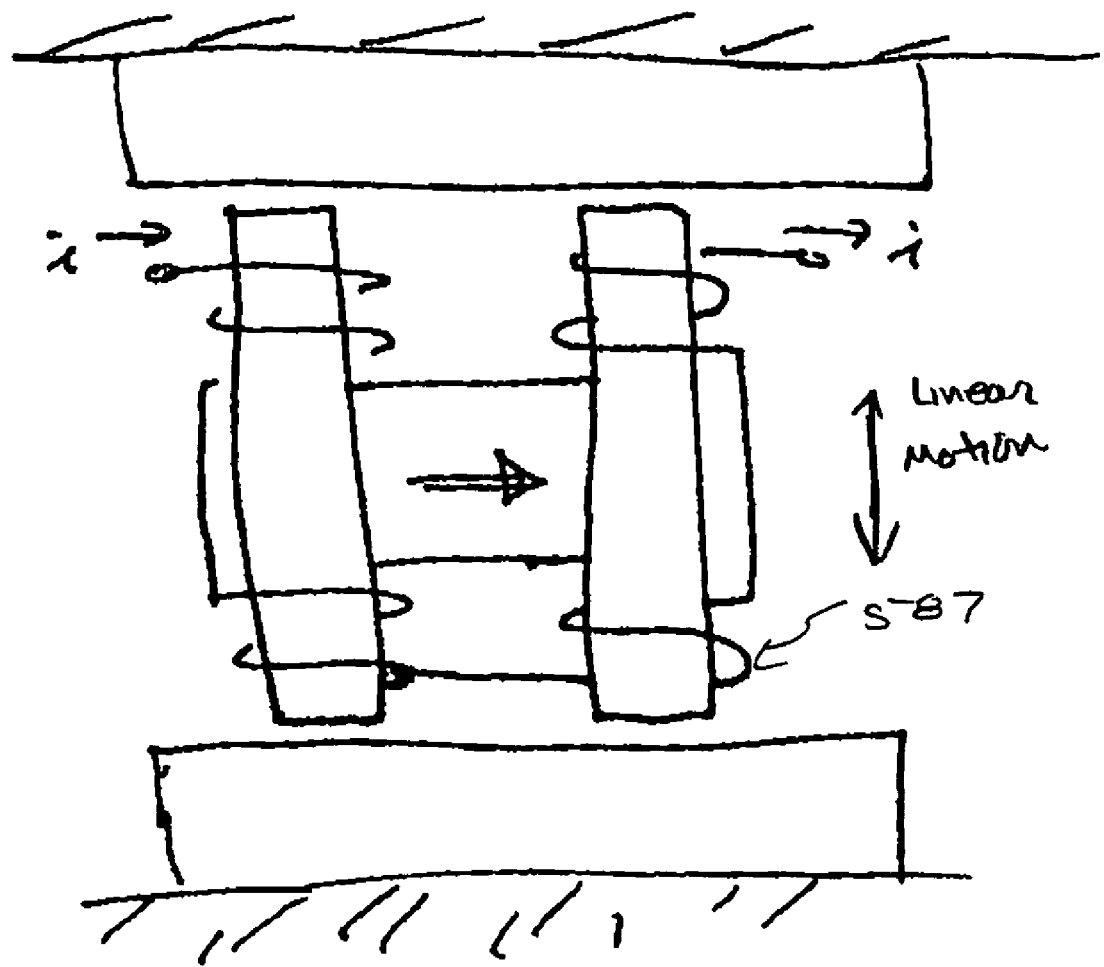

FIG. 38A illustrates a permanent magnet biased actuator employing a single winding 587 for producing a linear motion in the vertical plane (top to bottom in the plane of the page).

FIG. 38B illustrates an embodiment of a permanent magnet biased rotary actuator as used in general scanning applications. The rotary actuator of FIG. 38B comprises a magnetic left yoke 592 having a left winding, a magnetic right yoke 594 having a right winding, an armature 595, and a permanent magnet 596. The axis of rotation 598 about the center of the armature of the rotary actuator of FIG. 38B is counter clockwise in the plane of the page.

Figure 39A:
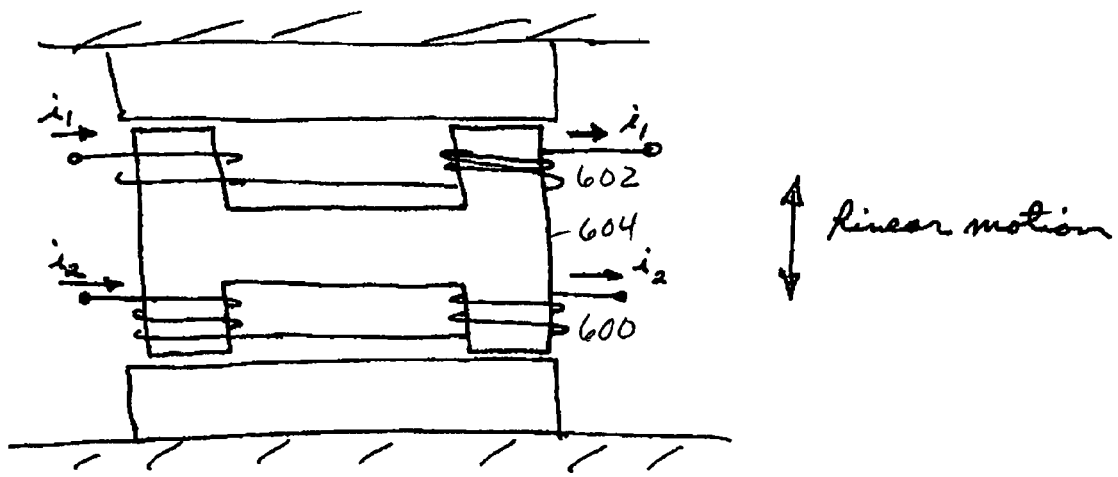
FIGS. 39A and 39B illustrate a two coil and four coil current biased actuator, respectively, for producing linear motion and rotary motion.
Figure 39B:
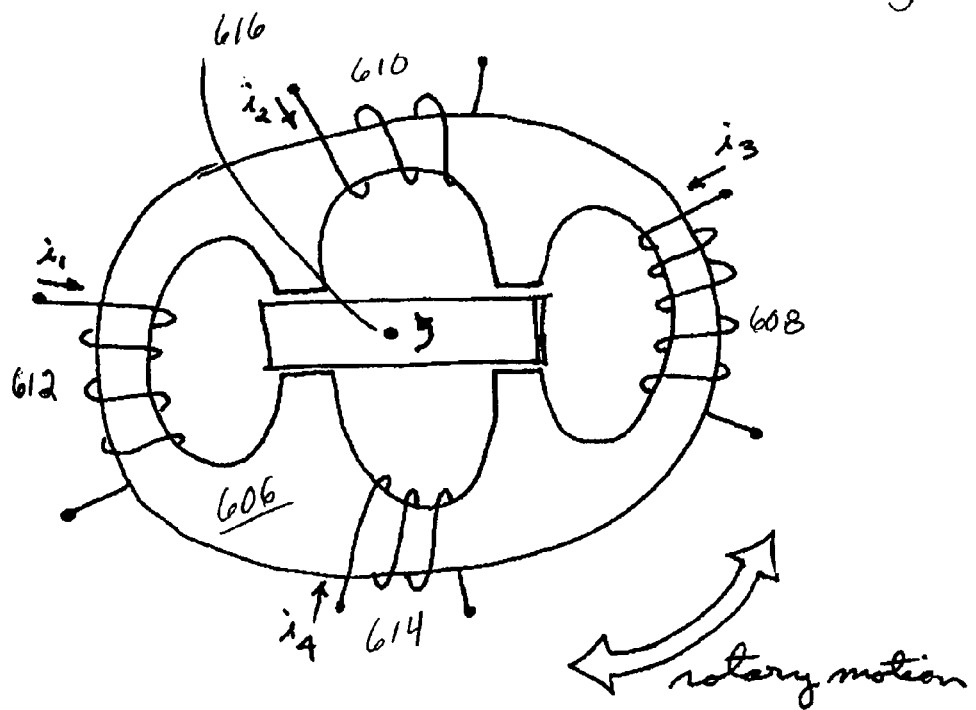

FIGS. 39A and 39B illustrate current biased actuator configurations. The current biased configurations can use bias current to replace permanent magnets. Using current allows adjustable bias levels; however, it requires more power dissipation due to the current in the coils used for bias.

FIG. 39A illustrates a current biased actuator having linear motion in a vertical direction in the plane of the page. The actuator comprises a first coil 602 and second coil 600 wound around an "H" shaped core 604.

FIG. 39B illustrates a four coil configuration of a current biased actuator having rotary motion in a counter clockwise direction 616 in the plane of the page. The actuator of FIG. 39B comprises a first coil 608, a second coil 610, a third coil 612, a fourth coil 614 and a core 606.

Linear fast tool servos are one configuration that can be used to make ophthalmic lenses, and these have the advantage that they are easier to measure and calibrate. However, they have significant reaction forces if high accelerations are used. For example, if the tool is moved in a sinusoid of 5 μm peak-to-peak amplitude, then the motion can be described as:

$$x(*) = 2.5 \times 10^{-6} \sin \omega t \text{ meters}$$

where ω is the frequency of oscillation. More generally, for a peak-to-peak amplitude of A, the motion is described by:

$$x(*) = \frac{A}{2} \omega^2 \sin \omega t$$

and the peak acceleration is $$\frac{A}{2}\omega^2.$$

If we choose A=2.5×10$^{-6}$ m, and ω=2π×10$^4$ (10 kHz), then we find:

$$\ddot{x}_{max} = \frac{2.5 \times 10^{-6}}{2} \cdot (2\pi \times 10^4)^2 \cong 5000 \text{ m/sec}^2 = 500 \text{ G's}$$

This high acceleration can result in very significant forces. For example, if the moving mass is 10 gm, the resulting force is $$F = ma = 0.01 \cdot 5000 = 50N.$$

Figure 40:
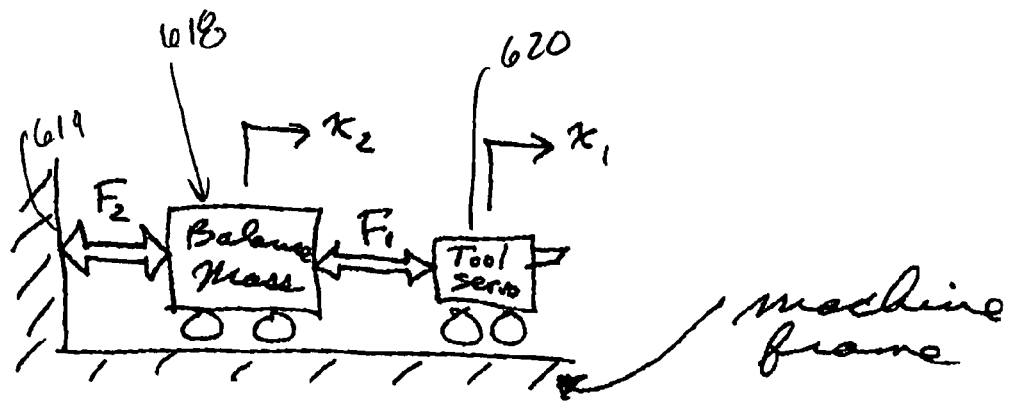
FIG. 40 illustrates the relationship excess acceleration forces and reaction forces in the fast tool servo system.

FIG. 40 provides an illustration showing the relationship between these forces. Such a large force can shake the precision machine which carries that fast tool servo. Thus in some cases, it will be necessary to use a balance or reaction mass to absorb these forces. By way of example, a force $F_1$ is used to provide the driving force to the fast tool servo 620. The majority of this force is applied to the balance mass 618, resulting in its acceleration. Thereby, the large FTS forces do not need to be applied to the machine frame 619. The force $F_2$ (termed the "drift force") prevents the assembly from drifting out of range, by applying a corrective action to keep the average balance mass position at the center of travel.

Such a reaction mass configuration is shown in FIG. 37. Here $F_1$ is the force on the tool servo, and the stator serves as a balance mass by moving independently on the indicated flexures. Force $F_2$ is generated by any conventional means such as, for example, coils, magnets, electromagnets, and the like to control drift.

It is also possible to design analogous balance masses for rotational fast tool servos. However, it is usually easier to have a machine frame tolerate reaction torques, since the moment of inertia for a mass increment dM scales as dMR and since plates are stiffer in shear than in bending.

The movement of the tool servo can be constrained in translation (linear FTS) or in rotation (rotary FTS) by any of the bearing technologies used in precision motion control systems. These include flexures, rolling element bearings, air bearings, hydrostatic bearings, or magnetic bearings.

It may also be desirable to introduce controlled gaps filled with air, oil, ferrofluid, or other appropriate damping material, such as, for example, Sorbothane, etc., in order to introduce controlled damping for the FTS motions.

Figure 41:
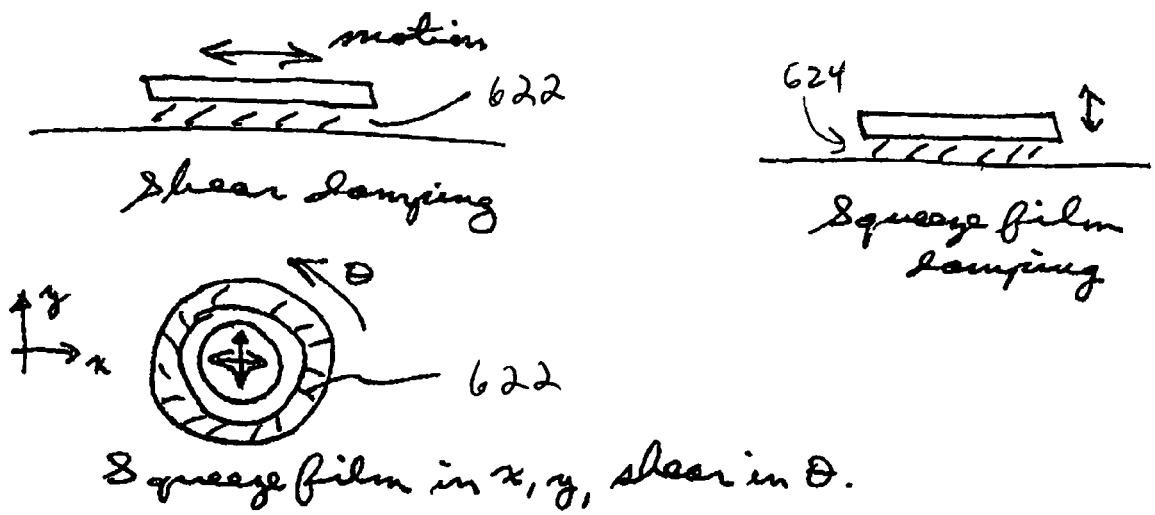
FIG. 41 illustrates relative motions associated with oil damping means.

FIG. 41 illustrates a schematic diagram showing the forces applied in a FTS. In particular, FIG. 41 shows motion in a right/left direction on the page in relation to shear damping using oil 622, shows motion in an up/down direction in relation to the page using a squeeze film damping 624 and angular motion in a counter-clockwise direction in relation to the page using oil 622 as a squeeze film in the xy plane. The magnetic cores in FTS's will be laminated, or made of metallic glass, or made of sintered material in order to reduce the effects of eddy currents and thereby preserve high bandwidth.

The nonlinear effects of the variable reluctance actuators can be addressed by some combination of the following techniques. Permanent magnet or coil-based biasing lowers the effect of nonlinearities. The actuator nonlinearities can be modeled and an inverse nonlinear model implemented in the computer control system, typically on a digital computer. For example, if the actuator force varies as $$F = C\left(\frac{i}{g}\right)^2,$$

then the calculation $$i_s = g\sqrt{\frac{Fd}{c}}$$

results in linearity. Here F is the actuator force, I is the coil current, g is the actuator gap, C is a constant, Fd is a desired force in the controller, and $i_s$ is a current setpoint to a current controlled amplifier. Flux sensing can be implemented either via the use of a flux sensor in or adjacent to the gap (Hall cell, magneto resistive, etc.) or via flux sensing coils wound on the actuator pole faces.

Figure 42A:
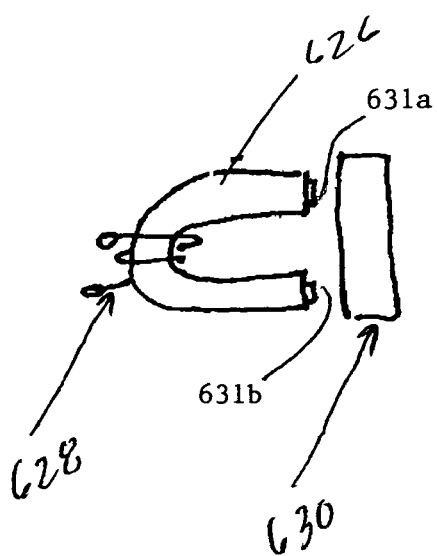
FIGS. 42A and 42B illustrate embodiments of actuators using Hall cells or sensing coils, resptectively.
Figure 42B:
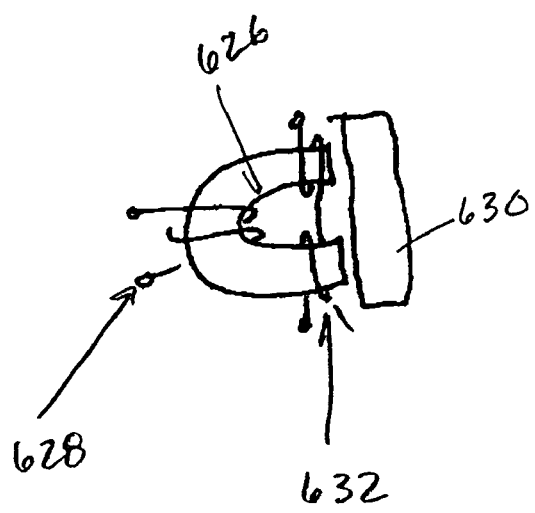

FIG. 42A illustrates an actuator having a coil 628, stator 626, armature 630 and Hall cells 631a and 631b. Alternatively, FIG. 42B shows an actuator in which the cells are replaced by flux sensing coils 632.

Figure 43:
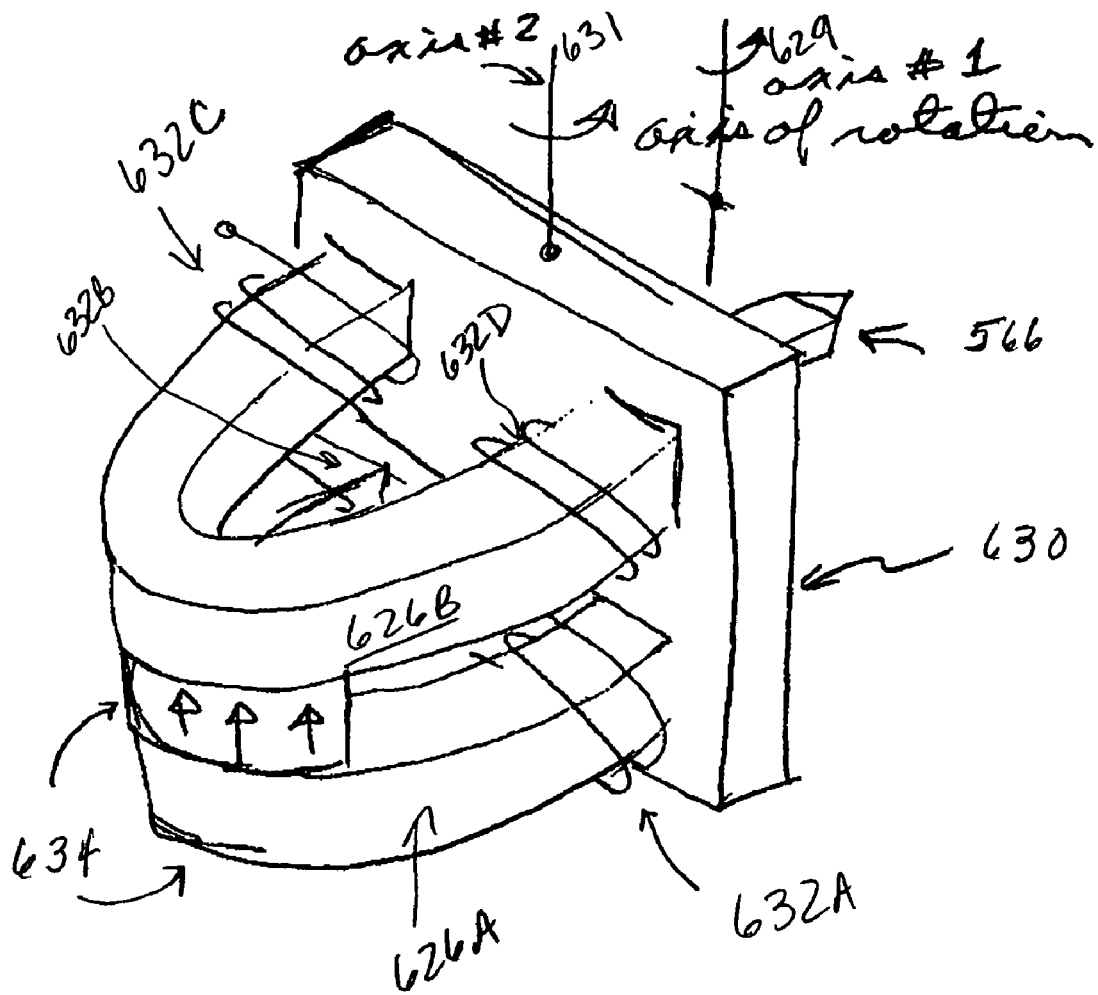
FIG. 43 illustrates an embodiment of an actuator derived from a Hall cell.

FIG. 43 illustrates an actuator for rotary motion which can Also employ flux sensing coils or Hall cells. The embodiment of FIG. 43 facilitates motion about a vertical axis. Rotation may be about a first axis 629 forming a vertical plane touching the tip of tool 566 or rotation may be about a second axis passing through armature 630. The embodiment of FIG. 43 comprises an armature 630, a tool 566, a lower stator 626A, having two legs, an upper stator 626B, having two legs, a permanent magnet biasing member 634, a lower first coil 632A, a second lower coil 632B, a first upper coil 632C and a second upper coil 632D. The permanent magnet biases the 4 legs forcing the armature. The coils 632A-D on the legs steer the flux to create a torque on the armature 630. Armature 630 may be suspended on some form of bearing to constrain motion to rotation. Flexures, rolling element, air, oil hydrostatic restraint and other means may alternatively be employed to constrain motion.

Figure 44A:
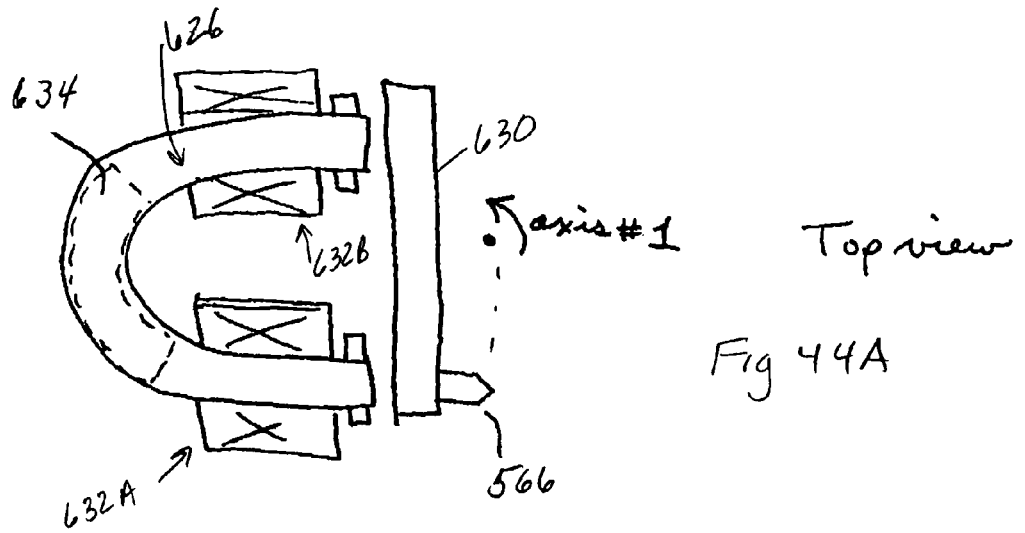
FIGS. 44A, 44B and 44C illustrate a top view, a side view and a face view of the actuator shown in FIG. 43.
Figure 44B:
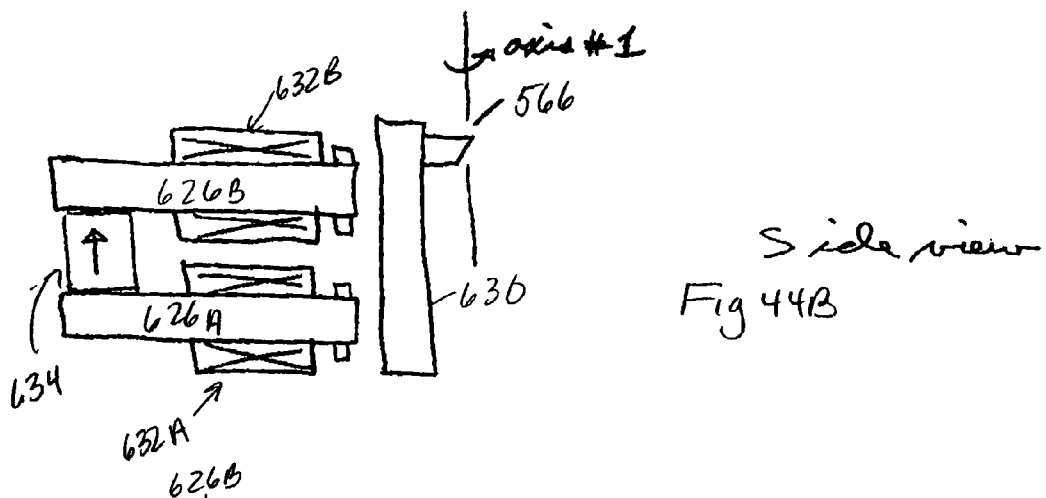
Figure 44C:
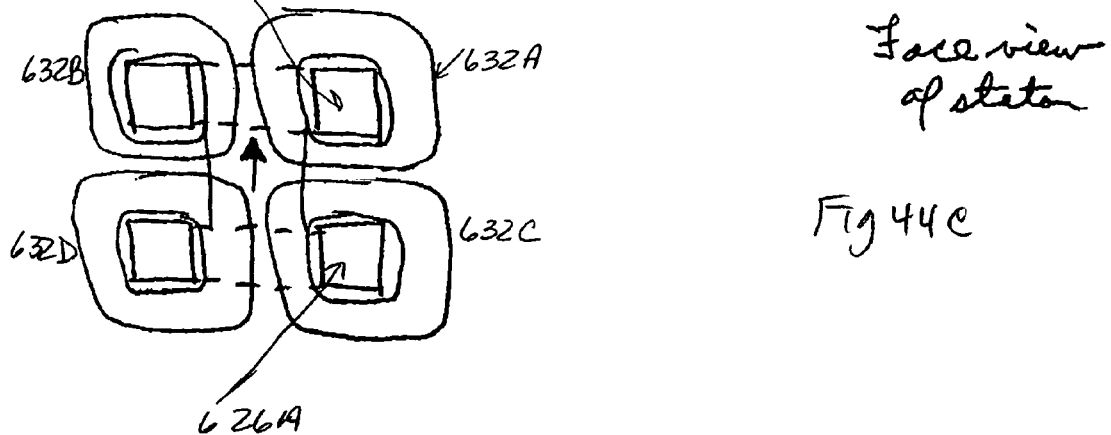

FIG. 44A presents top view of the embodiment shown in FIG. 43, FIG. 44B presents a side view of the embodiment of FIG. 43 and FIG. 44C presents a face view of the embodiment of FIG. 43.

Figure 45A:
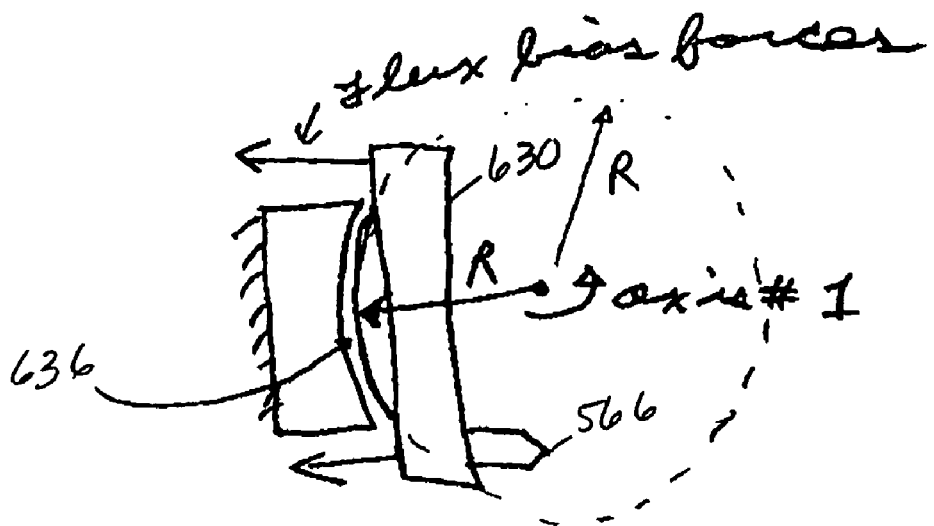
FIGS. 45A and 45B illustrate embodiments of an actuator employing bias flux to provide preload force for pressurized air or oil hydrostatic bearings.
Figure 45B:
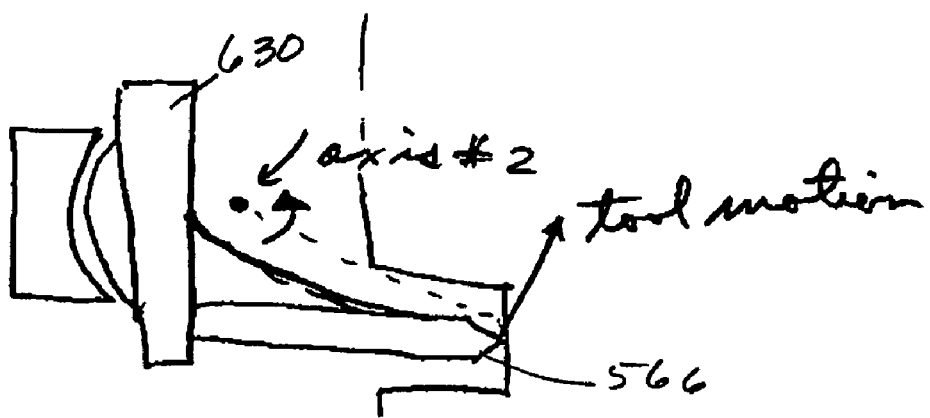

FIGS. 45A and 45B illustrate embodiments of an actuator employing bias flux from permanent magnets to provide preload force for pressurized air or oil hydrostatic bearings 636. Oil film or air film in a bearing provides compressive and shear damping. In some situations it may not be possible to use axis #1 (long reach tool), in which case, an alternate axis can be used. FIG. 45B illustrates axis #2 being employed as the axis of rotation.

Figure 46:
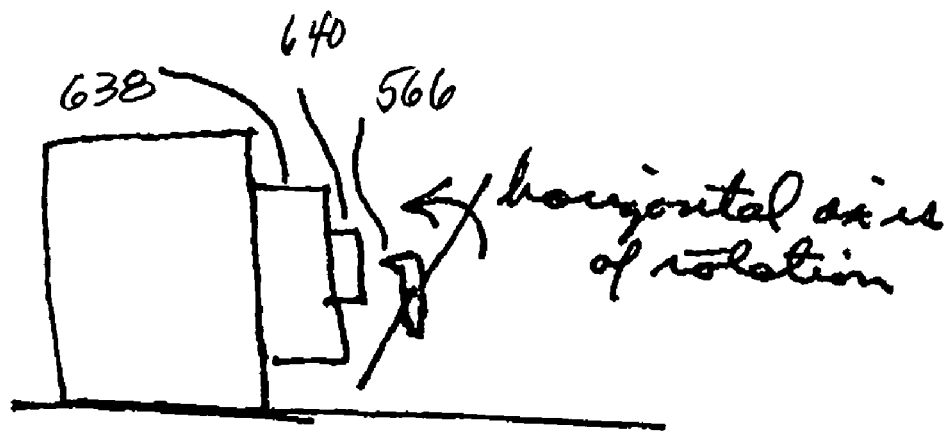
FIGS. 46A and 46B illustrate embodiments of rotational fast tool servos having a horizontal axis of motion (FIG. 46A) or a vertical axis of rotation (FIG. 46B)
Figure 46:
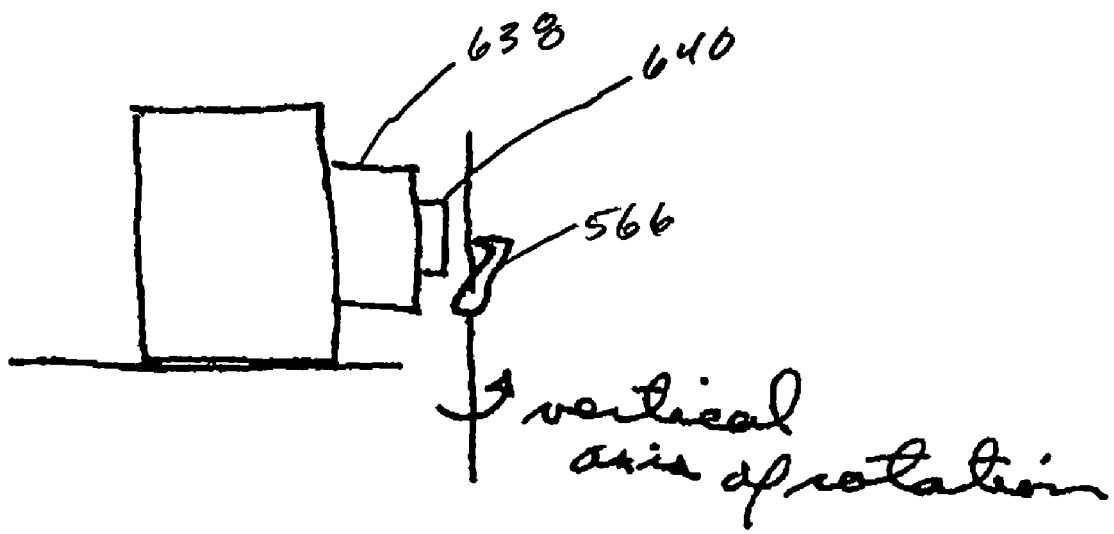

FIGS. 46A and 46B illustrate rotational fast tool servos that can have an axis of rotation oriented either vertically (FIG. 46B) or horizontally (FIG. 46A). FTS motion can be sensed by precision motion sensors such as capacitive displacement probes, inductive displacement probes, optical probes, or other means. The embodiment of FIG. 46A comprises a spindle 638, post 640 and tool 566.

Figure 47B:
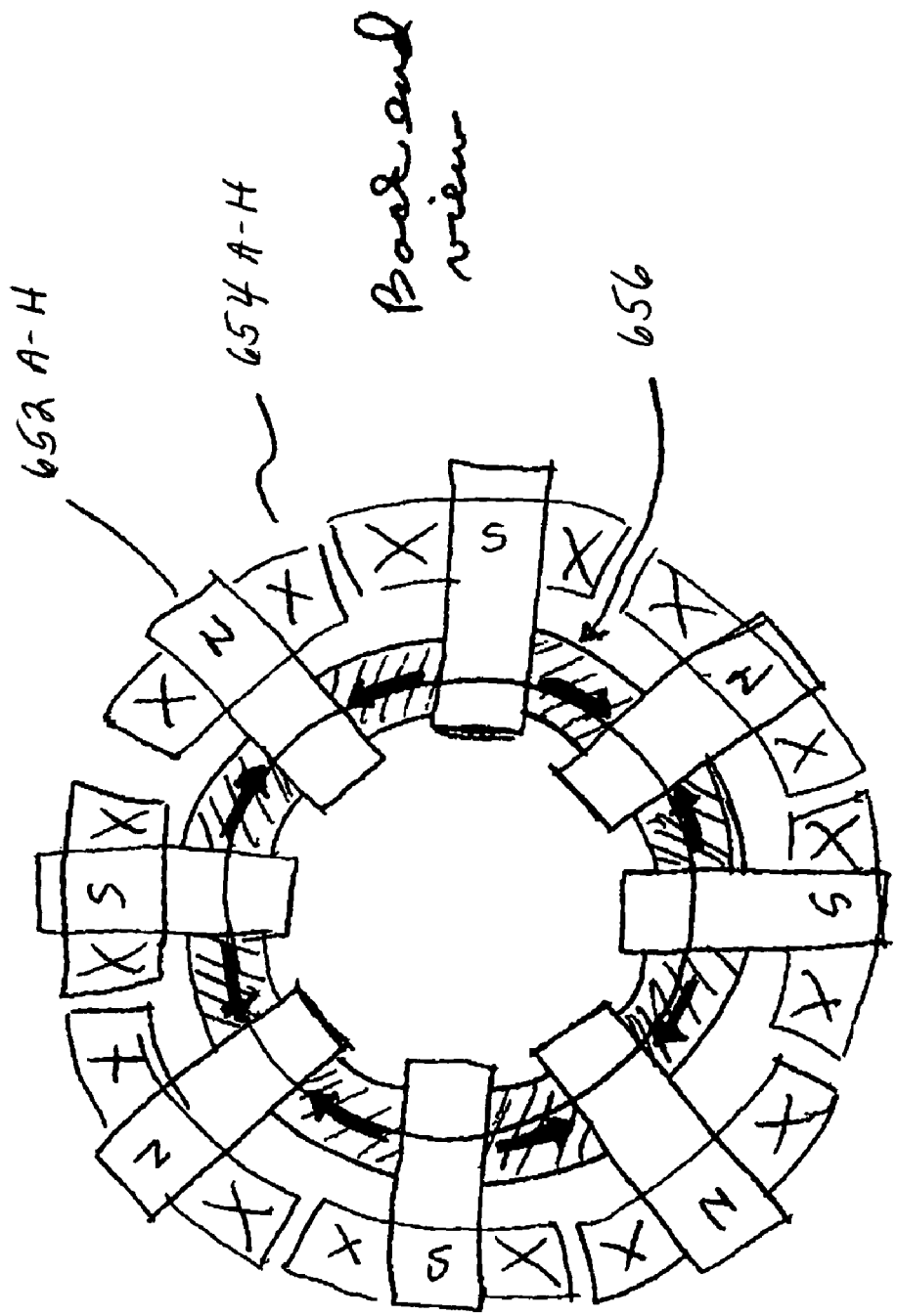

FIGS. 47A and 47B illustrate a radial configuration of flux-biased coils capable of steering flux from front to back side of armature, and thereby creating axial thrust. The embodiment of FIG. 47A comprises cores 642A and 642B radially disposed around an armature 648 and employing bias magnets 650A and 650B. In addition, the embodiment of FIG. 47A comprises coils 644A, 644B and 644C, a mechanical structural backbone 646 and a tool 566. Motion is left/right with respect to the page for the embodiment of FIG. 47A. FIG. 47B illustrates a back end view of the embodiment of FIG. 47A and comprises eight cores 652A-H, eight coils 654A-H and eight bias, permanent magnets 656A-H.

Figure 48:
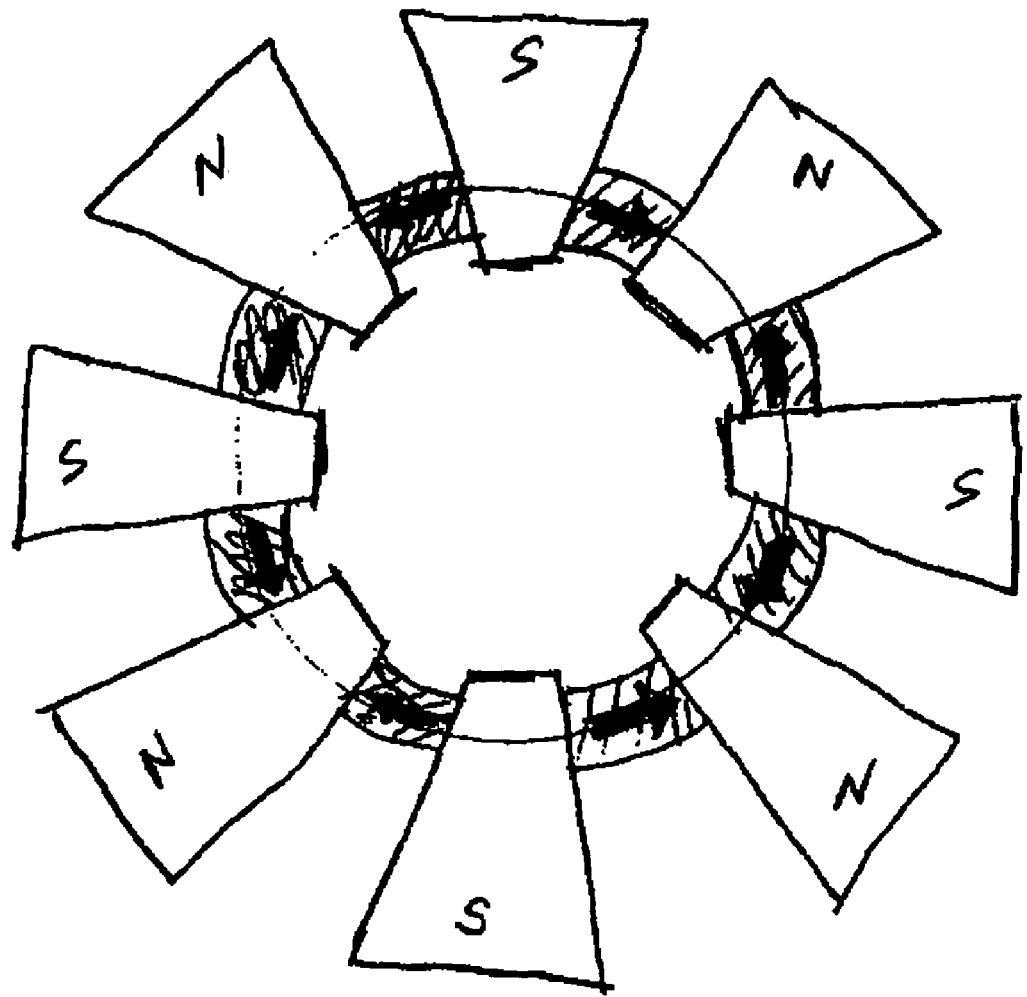
FIG. 48 illustrates an embodiment of a core having a wedge shape which can be used in embodiments of the invention.

FIG. 48 illustrates a core having a wedge-shape which reduces or eliminates the occurrence of back-iron saturation.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the diagrams. While various elements of the preferred embodiments have been described as being implemented in software, other embodiments in hardware or firmware implementations may alternatively be used, and vice-versa.

It will be apparent to those of ordinary skill in the art that methods involved in the fast tool servo system may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

An operating environment for the fast tool servo system can include a processing system with at least one high speed processing unit and a memory system. In accordance with the practices of persons skilled in the art of computer programming, the present invention is described with reference to acts and symbolic representations of operations or instructions that are performed by the processing system, unless indicated otherwise. Such acts and operations or instructions are sometimes referred to as being "computer-executed," or "processing unit executed."

It will be appreciated that the acts and symbolically represented operations or instructions include the manipulation of electrical signals by the processing unit. An electrical system with data bits causes a resulting transformation or reduction of the electrical signal representation, and the maintenance of data bits at memory locations in the memory system to thereby reconfigure or otherwise alter the processing unit's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the processing unit. The computer readable medium includes cooperating or interconnected computer readable media, which exist exclusively on the processing system or is distributed among multiple interconnected processing systems that may be local or remote to the processing system.

It is to be understood that the above-described embodiments are simply illustrative of the principles of the invention. Various and other modifications and changes may be made by those skilled in the art which will embody the principles of the invention and fall within the spirit and scope thereof. The claims should not be read as limited to the described order or elements unless stated to that effect. Therefore, all embodiments that come within the scope and spirit of the following claims and equivalents thereto are claimed as the invention.

What is claimed:

1. A micropositioner, comprising:
   an outer magnetic shell;
   an inner magnetic shell located within said outer magnetic shell;
   at least one permanent magnet located between said inner magnetic shell and said outer magnetic shell; and
   at least one coil located between said inner magnetic shell and said outer magnetic shell, wherein said at least one coil is capable of directing magnetic flux between said inner magnetic shell and said outer magnetic shell.

2. The micropositioner of claim 1, wherein said at least one permanent magnet is located between a first coil and a second coil.

3. The micropositioner of claim 1, wherein said at least one coil is located between a first permanent magnet and a second permanent magnet.

4. The micropositioner of claim 1, further comprising:
   a backside endplate and a frontside endplate, wherein said inner magnetic shell, said outer magnetic shell, said at least one permanent magnet, and said at least one coil are located between said backside endplate and said frontside endplate.

5. The micropositioner of claim 4, wherein said backside endplate and/or said frontside endplate carries a payload.

6. The micropositioner of claim 5, wherein said payload is a cutting tool.

7. The micropositioner of claim 4, further comprising a structure for connecting said backside endplate to said frontside endplate.

8. The micropositioner of claim 7, wherein said structure is a tubular backbone located within said inner magnetic shell.

9. The micropositioner of claim 8, further comprising a first series of flexures supporting said tubular backbone, said backside endplate, and said frontside endplate, and/or a second series of flexures supporting said outer magnetic shell, said inner magnetic shell, said permanent magnet, and said at least one coil.

10. The micropositioner of claim 7, wherein said structure is an outer structural shell located outside of said outer magnetic shell.

11. The micropositioner of claim 10, further comprising a guiding element located between said outer structural shell and said outer magnetic shell.

12. The micropositioner of claim 8, further comprising a guiding element located between said tubular backbone and said inner magnetic shell.

13. The micropositioner of claim 11 and claim 12, wherein said guiding element is selected from the group consisting of a flexure, a metallic bearing, a rubber bearing, a laminated rubber bearing, an oil bearing, an air bearing, a fluid bearing, a hydrostatic bearing, a rolling element bearing, a bushing, and a composite bearing.

14. The micropositioner of claim 1, wherein said at least one coil has a slowly varying bias current and a rapidly varying control current.

15. The micropositioner of claim 1, further comprising an armature, wherein said micropositioner comprises a plurality of opposed magnets and a plurality of said coils positioned concentrically around said armature.

16. The micropositioner of claim 1, further comprising a balance mass for receiving a reaction force.

17. The micropositioner of claim 1, wherein motion of said micropositioner is controlled by a damping element capable of providing shear damping or squeeze film damping.

18. The micropositioner of claim 1, further comprising:
   a stator comprising said outer magnetic shell, said inner magnetic shell, said at least one permanent magnet, and said at least one coil; and
   an armature located adjacent said stator, wherein relative movement of said armature is controlled by said stator.

19. The micropositioner of claim 18, wherein said stator and/or said armature is supported by a guiding element for constraining motion of said stator and/or said armature into an axis for actuation of relative motion between said stator and said armature.

20. The micropositioner of claim 19, wherein said guiding element is selected from the group consisting of a flexure, a metallic bearing, a rubber bearing, a laminated rubber bearing, an oil bearing, an air bearing, a fluid bearing, a hydrostatic bearing, a rolling element bearing, a bushing, and a composite bearing.

21. The micropositioner of claim 18, wherein said armature and/or said stator is cooled using a member selected from the group consisting of air and fluid.

22. The micropositioner of claim 18, further comprising at least one flux sensing device located on said stator.

23. The micropositioner of claim 22, wherein said flux sensing device is selected from the group consisting of a flux sensing coil, a Hall cell, and a magnetoresistive sensor.

24. The micropositioner of claim 1, further comprising:
a housing;
a cutting surface; and
a holder positioned with said housing, said holder being operable by reciprocating motion relative to a longitudinal axis, said cutting surface being positioned with said holder relative to said longitudinal axis,
wherein said holder is capable of moving relative to said longitudinal axis to move said cutting surface into and out of engagement with a workpiece.

25. A micropositioner, comprising:
a stator comprising:
at least one first magnetic shell;
at least one second magnetic shell;
at least one permanent magnet located between said first magnetic shell and said second magnetic shell; and
at least one steering coil located within said stator; and
an armature located adjacent to said stator, relative movement of said armature being controlled by said stator.

26. The micropositioner of claim 25, further comprising at least one flux sensing device located on said stator.

27. The micropositioner of claim 26, wherein said flux sensing device is selected from the group consisting of a flux sensing coil, a Hall cell, and a magnetoresistive sensor.

28. The micropositioner of claim 25, wherein said armature further comprises a proximate end and a distal end, said micropositioner further comprising:
a series of said first and second magnetic shells;
a series of said permanent magnets, wherein one permanent magnet of said series of permanent magnets is located between two magnetic shells of said series of first and second magnetic shells; and
a series of said steering coils, wherein a shell selected from the group consisting of said first magnetic shell and said second magnetic shell has at least one of said steering coils situated there-around, and wherein each steering coil is capable of directing magnetic flux from said proximate end of said armature to said distal end of said armature.

29. The micropositioner of claim 25, wherein said stator and/or said armature is supported by a guiding element for constraining motion of said stator and/or said armature into an axis for actuation of relative motion between said stator and said armature.

30. The micropositioner of claim 29, wherein said guiding element is selected from the group consisting of a flexure, a metallic bearing, a rubber bearing, a laminated rubber bearing, an oil bearing, an air bearing, a fluid bearing, a hydrostatic bearing, a rolling element bearing, a bushing, and a composite bearing.

31. The micropositioner of claim 25, wherein said armature and/or said stator is cooled using a member selected from the group consisting of air and fluid.

32. The micropositioner of claim 25, further comprising a balance mass for receiving a reaction force.

33. The micropositioner of claim 25, wherein said at least one steering coil is located on at least one of said first magnetic shell and said second magnetic shell.

34. The micropositioner of claim 25, wherein said at least one steering coil is located between said first magnetic shell and said second magnetic shell.

35. The micropositioner of claim 25, wherein said at least one steering coil has a slowly varying bias current and a rapidly varying control current.

36. The micropositioner of claim 25, further comprising:
a backside endplate and a frontside endplate, wherein said at least one first magnetic shell, said at least one second magnetic shell, said at least one permanent magnet, and said at least one steering coil are located between said backside endplate and said frontside endplate.

37. The micropositioner of claim 36, wherein said backside endplate and/or said frontside endplate carries a payload.

38. The micropositioner of claim 37, wherein said payload is a cutting tool.

39. The micropositioner of claim 36, further comprising a structure for connecting said backside endplate to said frontside endplate.

40. The micropositioner of claim 39, wherein said structure is a tubular backbone located within at least one of said first magnetic shell and said second magnetic shell.

41. The micropositioner of claim 40, further comprising a first series of flexures supporting said tubular backbone, said backside endplate, and said frontside endplate, and/or a second series of flexures supporting said at least one first magnetic shell, said at least one second magnetic shell, said at least one permanent magnet, and said at least one steering coil.

42. The micropositioner of claim 39, wherein said structure is an outer structural shell located outside of said magnetic shell.

43. The micropositioner of claim 25, further comprising a guiding element located between said armature and said stator.

44. The micropositioner of claim 40, further comprising a guiding element located between said tubular backbone and at least one of said first magnetic shell and said second magnetic shell.

45. The micropositioner of claim 43, further comprising a guiding element located between said outer structural shell and one of said magnetic shells.

46. The micropositioner of claims 43, 44, and 45 wherein said guiding element is selected from the group consisting of a flexure, a metallic bearing, a rubber bearing, a laminated rubber bearing, an oil bearing, an air bearing, a fluid bearing, a hydrostatic bearing, a rolling element bearing, a bushing, and a composite bearing.

47. The micropositioner of claim 25, wherein motion of said micropositioner is controlled by a damping element capable of providing shear damping or squeeze film damping.

48. The micropositioner of claim 25, further comprising:
a housing;
a cutting surface; and
a holder positioned with said housing, said holder being operable by reciprocating motion relative to a longitudinal axis, said cutting surface being positioned with said holder relative to said longitudinal axis,
wherein said holder is capable of moving relative to said longitudinal axis to move said cutting surface into and out of engagement with said workpiece.

49. A micropositioner, comprising:
a stator comprising:
at least one first magnetic shell;
at least one second magnetic shell; and at least one coil-based bias source located between said first magnetic shell and said second magnetic shell and said second magnetic shell; and an armature located adjacent to said stator, wherein relative movement of said armature is controlled by said stator.

50. The micropositioner of claim 49, wherein said coil-based bias source further comprises:
a core; and
a series of biasing and steering coils configured about said core, wherein said series of biasing and steering coils allow for adjusting bias levels within said micropositioner.

51. The micropositioner of claim 49, wherein said stator and/or said armature is supported by a guiding element for constraining motion of said stator and/or said armature into an axis for actuation of relative motion between said stator and said armature.

52. The micropositioner of claim 51, wherein said guiding element is selected from the group consisting of a flexure, a metallic bearing, a rubber bearing, a laminated rubber bearing, an oil bearing, an air bearing, a fluid bearing, a hydrostatic bearing, a rolling element bearing, a bushing, and a composite bearing.

53. The micropositioner of claim 49, further comprising:
a backside endplate and a frontside endplate, wherein said at least one first magnetic shell, said at least one second magnetic shell, and said at least one coil-based bias source are located between said backside endplate and said frontside endplate.

54. The micropositioner of claim 53, wherein said backside endplate and/or said frontside endplate carries a payload.

55. The micropositioner of claim 54, wherein said payload is a cutting tool.

56. The micropositioner of claim 53, further comprising a structure for connecting said backside endplate to said frontside endplate.

57. The micropositioner of claim 56, wherein said structure is a tubular backbone.

58. The micropositioner of claim 57, further comprising a first series of flexures supporting said tubular backbone, said backside endplate, and said frontside endplate, and/or a second series of flexures supporting said at least one first magnetic shell, said at least one second magnetic shell, and said at least one coil based bias source.

59. The micropositioner of claim 56, wherein said structure is an outer structural shell located outside of said at least one first magnetic shell and said at least one second magnetic shell.

60. The micropositioner of claim 49, wherein motion of said micropositioner is controlled by a damping element capable of providing shear damping or squeeze film damping.

61. The micropositioner of claim 49, wherein said at least one coil based bias source has a slowly varying bias current and a rapidly varying control current.

62. The micropositioner of claim 49, further comprising a balance mass for receiving a reaction force.

63. The micropositioner of claim 49, wherein said armature and/or said stator is cooled using a member selected from the group consisting of air and fluid.

64. The micropositioner of claim 49, further comprising at least one flux sensing device located on said stator.

65. The micropositioner of claim 64, wherein said flux sensing device is selected from the group consisting of a flux sensing coil, a Hall cell, and a magnetoresistive sensor.

66. The micropositioner of claim 49, further comprising:
a housing;
a cutting surface; and
a holder positioned with said housing, said holder being operable by reciprocating motion relative to a longitudinal axis, said cutting surface being positioned with said holder relative to said longitudinal axis,
wherein said holder is capable of moving relative to said longitudinal axis to move said cutting surface into and out of engagement with said workpiece.

* * * * *